United States Patent [19]
Yajima et al.

[11] Patent Number: 5,764,804
[45] Date of Patent: Jun. 9, 1998

[54] DATA ENCODING AND DECODING SYSTEM

[75] Inventors: Akihiko Yajima; Noboru Ninomiya; Akinari Todoroki; Yoshiyuki Ono, all of Suwa, Japan

[73] Assignee: Seiko Epson Corporation, Tokyo, Japan

[21] Appl. No.: 323,090

[22] Filed: Oct. 14, 1994

[30] Foreign Application Priority Data

| Oct. 14, 1993 | [JP] | Japan | 5-257290 |
| Oct. 25, 1993 | [JP] | Japan | 5-266460 |

[51] Int. Cl.$^6$ .................. G06K 9/36; G06K 9/46
[52] U.S. Cl. .............. 382/238; 382/131; 382/238; 382/245; 382/247; 348/642; 348/27; 348/38; 358/261.1; 358/261.2; 358/539; 358/500; 359/563; 380/54; 409/165
[58] Field of Search ............... 358/261.1, 500, 358/539; 348/27, 38, 39, 43, 642; 359/563; 340/347; 382/131, 238, 245, 247; 409/165

[56] References Cited

U.S. PATENT DOCUMENTS

| Re. 33,632 | 7/1991 | Nakamura | 358/261.1 |
| 4,344,086 | 8/1982 | Mizuno | 358/539 |
| 4,652,856 | 3/1987 | Mohiuddin et al. | 341/60 |
| 4,905,297 | 2/1990 | Langdon, Jr. et al. | 382/247 |
| 4,934,882 | 6/1990 | Phillips | 409/165 |
| 5,140,412 | 8/1992 | Shishido et al. | 258/539 |
| 5,317,428 | 5/1994 | Osawa et al. | 358/539 |

FOREIGN PATENT DOCUMENTS

| 62-185413 | 8/1987 | Japan |
| 63-74323 | 4/1988 | Japan |
| 63-74324 | 4/1988 | Japan |
| 63-76525 | 4/1988 | Japan |

OTHER PUBLICATIONS

Ikuro UENO et al., A Study on Markov Model Coding Of Palette Images Using Arithmetic Code, Apr. 1994, pp. 29-36.

"One Image Encoding Standard JBIG;" International Standard ISO/IEC11544/1993; pp. 26-50.

*Primary Examiner*—Jose L. Couso
*Assistant Examiner*—Daniel G. Mariam
*Attorney, Agent, or Firm*—Oliff & Berridge, PLC

[57] ABSTRACT

A data encoding system for encoding input color pixel data and outputting encoded data. The data encoding system includes a reference pixel generating device which outputs reference pixel data corresponding to the input color pixel data to be encoded; a predictor having a color order table which sets the color ranks of color codes for every reference pixel pattern, reads and outputs the color rank of the corresponding color code from the color order table on the basis of the color pixel data to be encoded and its reference pixel data; and an entropy encoding device which converts the color ranking data into encoded data and outputs the encoded data.

36 Claims, 56 Drawing Sheets

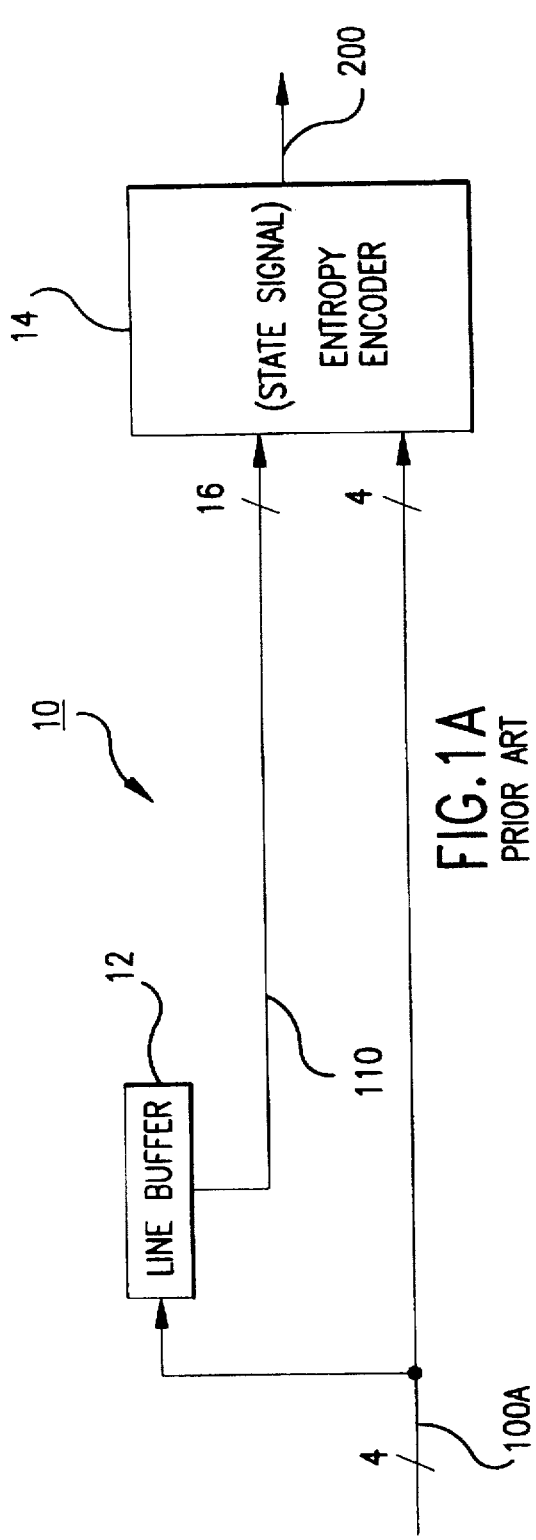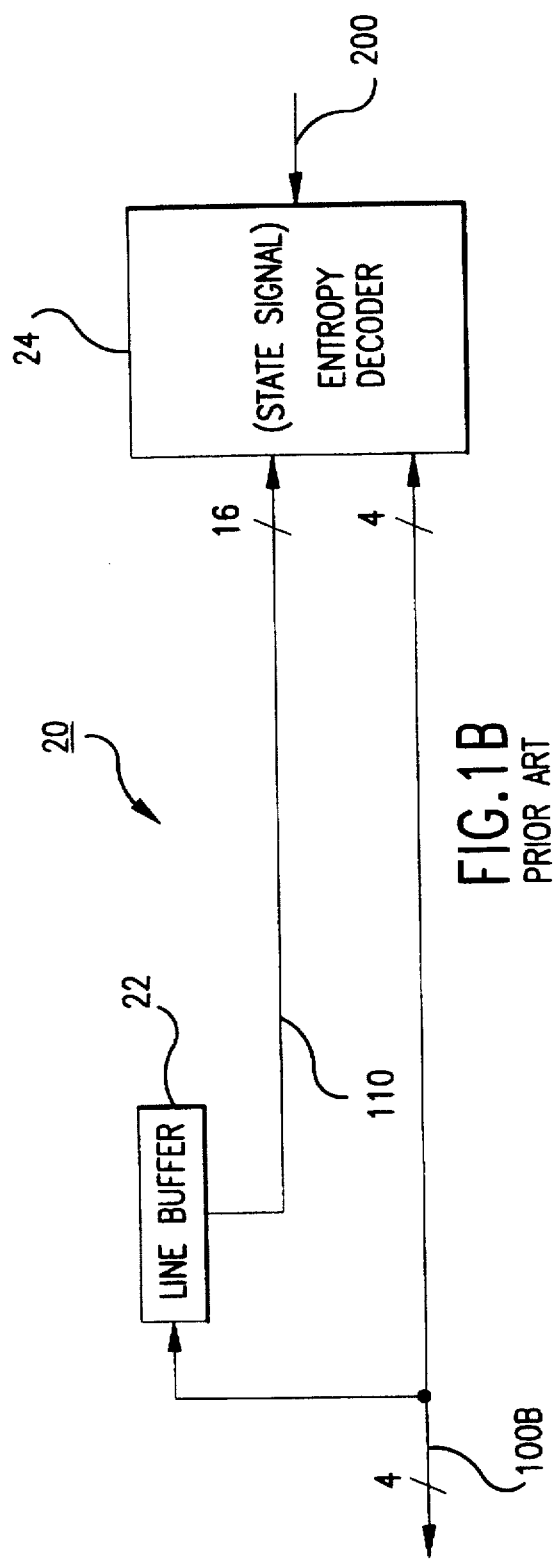

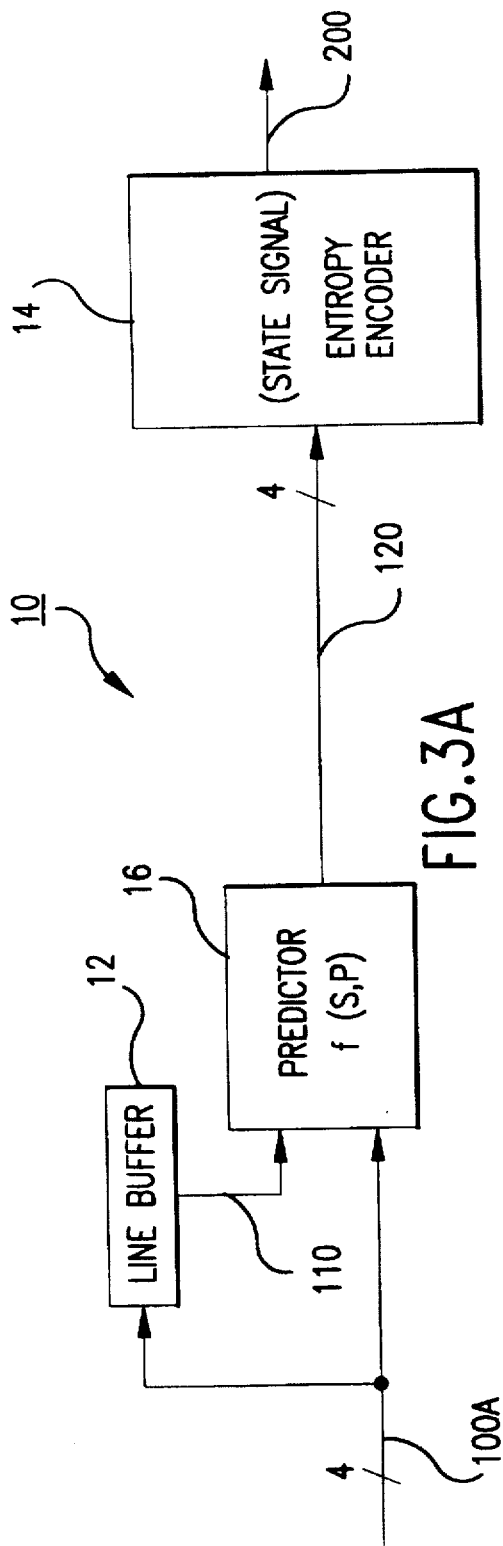
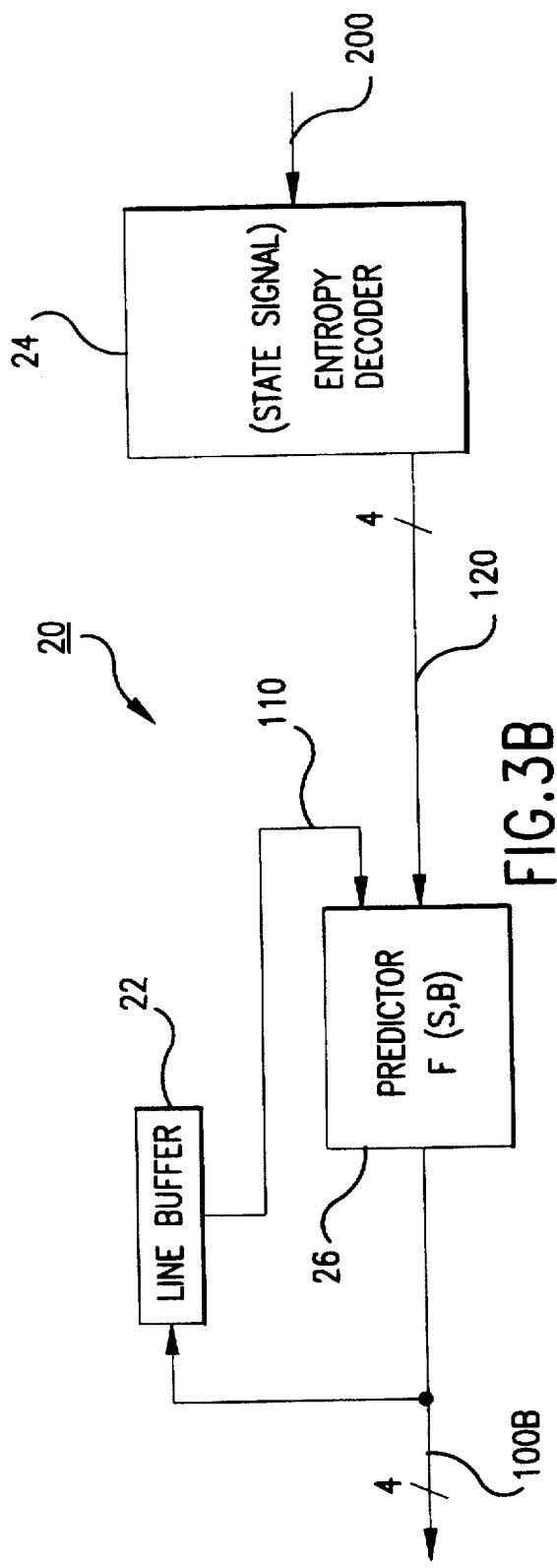

an~dn: REFERENCE PIXELS
xn: PIXEL TO BE ENCODED

| INDEX | COLOR RANKS OF COLOR CODES | | | | | | |
|---|---|---|---|---|---|---|---|
| | A | B | C | D | E | ... | P |
| 0 | 1 | 3 | 2 | 4 | 5 | | 10 |
| 1 | 8 | 1 | 3 | 2 | 7 | | 12 |
| 2 | 1 | 3 | 2 | 8 | 5 | | 12 |
| 3 | 2 | 16 | 1 | 12 | 13 | | 14 |
| 4 | 3 | 1 | 2 | 12 | 14 | | 12 |
| REFERENCE PIXEL PATTERN 65,535 | 7 | 3 | 2 | 10 | 8 | | 1 |

A,B,C,···P: COLOR CODES

FIG.6

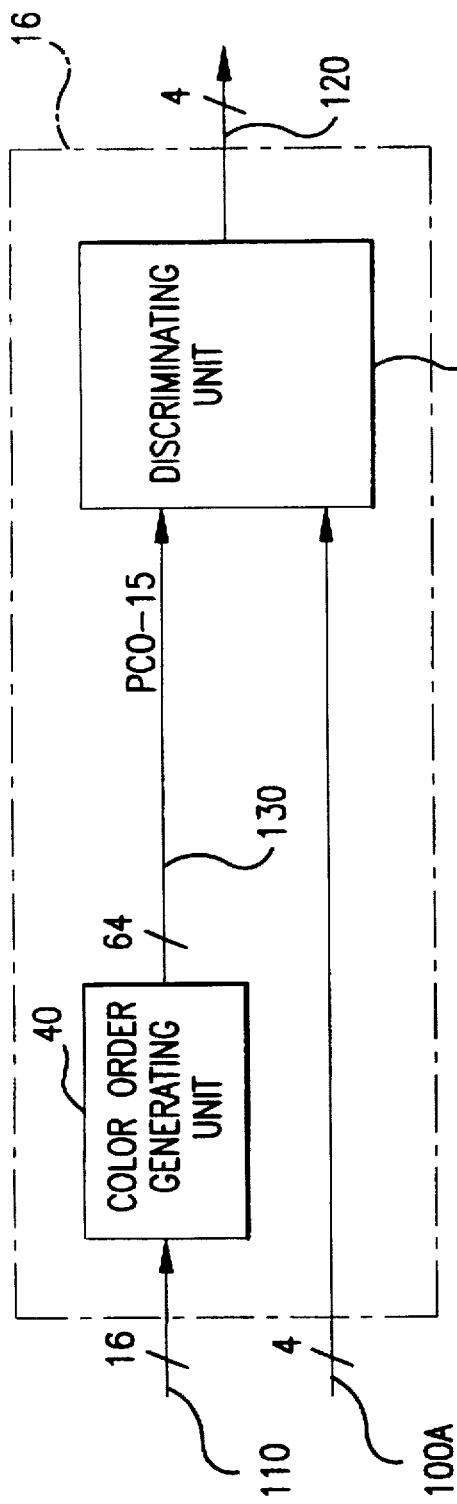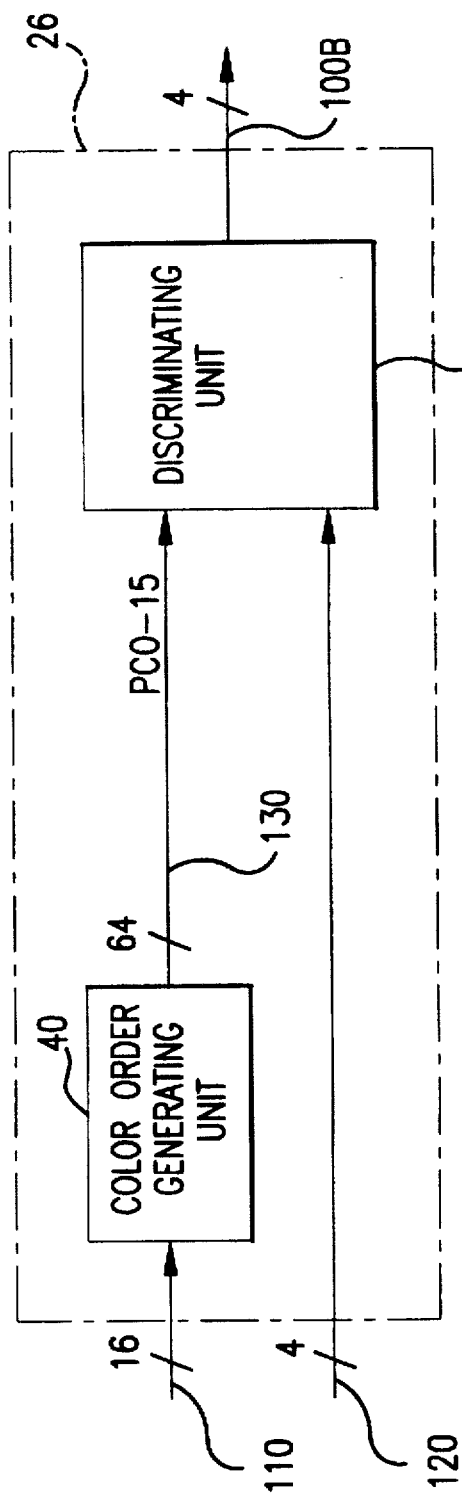

| TABLE NO. (SELECTED BY TABLE SELECTOR) | ENTRY (ADDRESS) | ENCODED WORD |
|---|---|---|
| 0 | 0 | 0 0 |
|   | 1 | 0 1 0 |
|   | 2 | 0 1 1 |
|   | 3 | 1 0 0 |
|   | 4 | 1 0 1 |
|   | 5 | 1 1 1 0 |
|   | 6 | 1 1 1 1 0 |
|   | 7 | 1 1 1 1 1 0 |
| 1 | 0 | 0 0 |
|   | 1 | 0 1 |
|   | 2 | 1 0 |
|   | 3 | 1 1 0 |
|   | 4 | 1 1 1 0 |
|   | 5 | 1 1 1 1 0 |
|   | 6 | 1 1 1 1 1 0 |
|   | 7 | 1 1 1 1 1 1 0 |

1100-1 (table 0), 1100-2 (table 1)

FIG.12

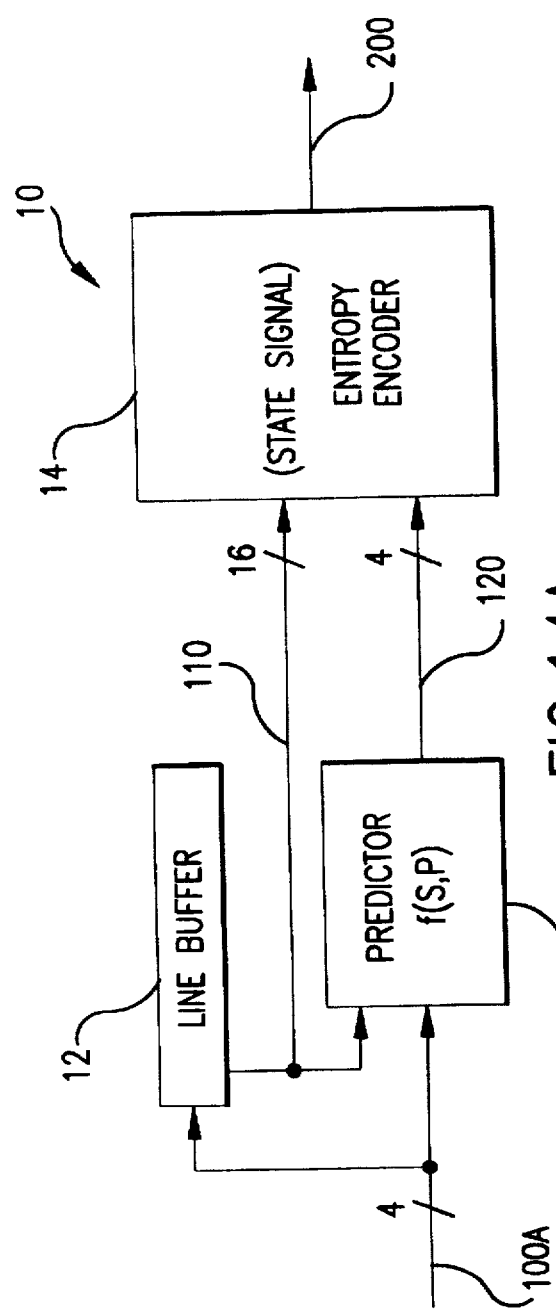
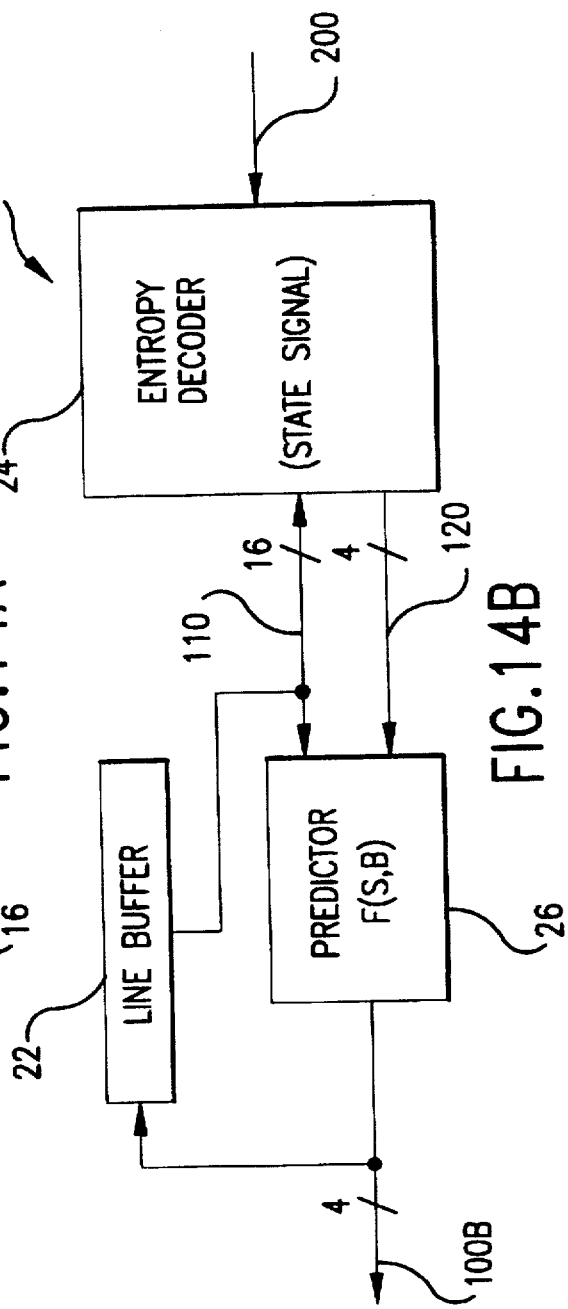
FIG.14A
FIG.14B

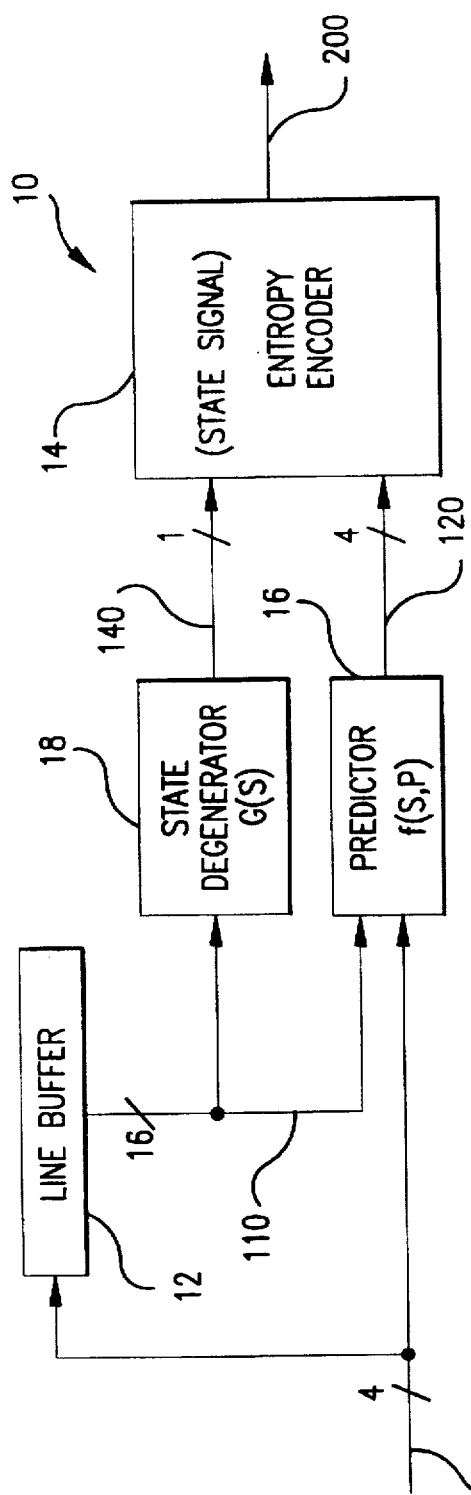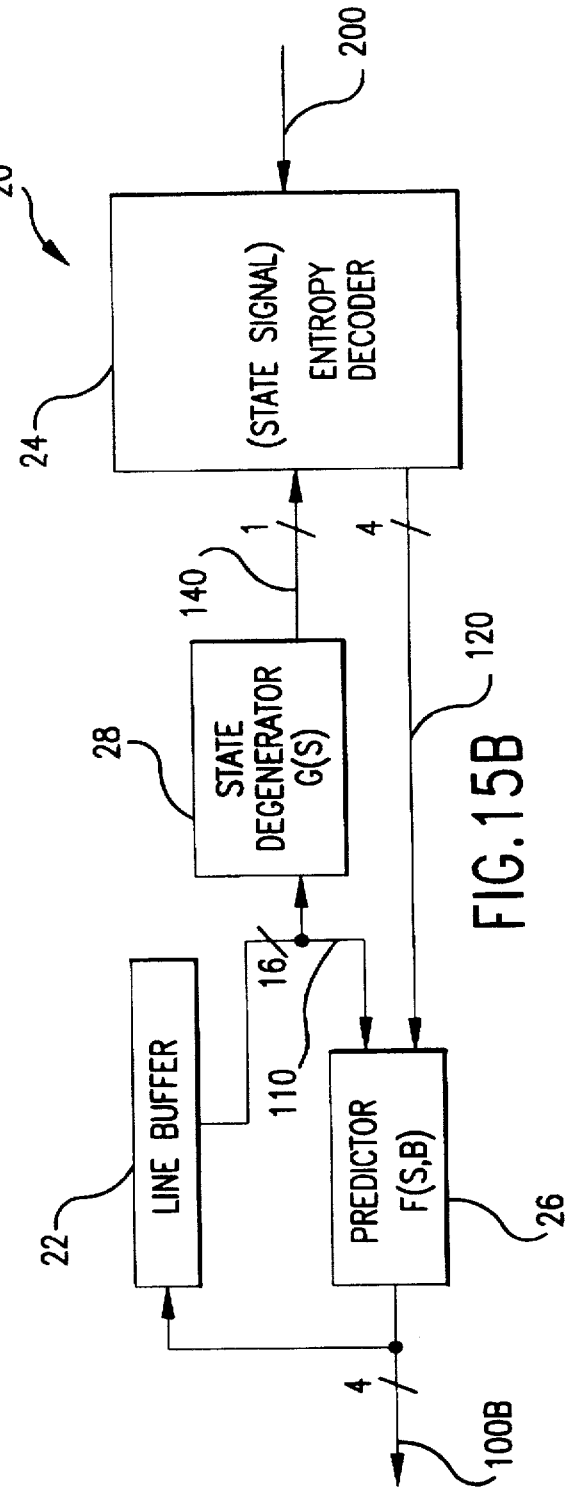

| INDEX | FREQUENCY OF REFERENCE PIXEL PATTERNS | | | | P | TOTAL FREQUENCY | ENTROPY | BIT |
|---|---|---|---|---|---|---|---|---|
| | A | B | C | | | | | |
| (Sx=0) 0 | 20,349 | 15,394 | 11,390 | | 1,699 | 96,694 | 1,567 | 151,519 |
| 1 | | | | | | | | → 0 |
| (Sx=1) 2 | 460 | 1,499 | 5,974 | | 24,648 | 36,659 | 2,091 | 76,654 |
| 3 | | | | | | | | → 0 |
| ⋮ | | | | | | | | |
| 65,535 | | | | | | | | → 2 |

REFERENCE PIXEL PATTERN

FIG.16

| INDEX | FREQUENCY OF REFERENCE PIXEL PATTERNS | | | | | P | TOTAL FREQUENCY | ENTROPY | BIT |
|---|---|---|---|---|---|---|---|---|---|
| | A | B | C | | | | | | |
| 0 | 10,936 | 5,882 | 6,320 | | | 634 | 52,394 | 0.934 | 48,936 |
| 1 | 2,553 | 6,214 | 0 | | | 16 | 18,864 | 1.637 | 30,880 |
| 2 | 230 | 590 | 3,125 | | | 2,123 | 10,368 | 3.349 | 34,722 |
| 3 | 800 | 54 | 23 | | | 7 | 5,234 | 2.367 | 12,389 |
| | | | | | | | | | |
| 65,535 | 0 | 2 | 18 | | | 12,958 | 20,384 | 1.036 | 21,118 |

| INDEX | REFERENCE PIXEL PATTERN | | | FREQUENCY OF REFERENCE PIXEL PATTERNS | | | P | TOTAL FREQUENCY | ENTROPY | BIT |
|---|---|---|---|---|---|---|---|---|---|---|
| | | | | A | B | C | | | | |
| 0 | | | | 10,936 | 5,882 | 6,320 | 634 | 52,394 | 0.934 | 48,936 |
| 1 | | | | 2,553 | 6,214 | 0 | 16 | 18,864 | 1.637 | 30,880 |

FIG.19B

| INDEX | REFERENCE PIXEL PATTERN | | | FREQUENCY OF REFERENCE PIXEL PATTERNS | | | P | TOTAL FREQUENCY | ENTROPY | BIT |
|---|---|---|---|---|---|---|---|---|---|---|
| | | | | A | B | C | | | | |
| 0 | | | | 13,489 | 12,096 | 6,320 | 650 | 71,258 | 1.236 | 88,074 |
| 1 | | | | | | | | | | ←0 |

X: PIXEL TO BE ENCODED
A,B,C: REFERENCE PIXELS

| CONDITION | Sx |
|---|---|
| A = B = C | S1 |
| A = B ≠ C | S2 |
| A = C ≠ B | S3 |
| A ≠ B = C | S4 |
| A ≠ B ≠ C | S5 |

FIG.21

| REFERENCE PIXEL PATTERN | COLOR RANKS (FREQUENCY) | | | | | | | |
|---|---|---|---|---|---|---|---|---|
| | FREQUENCY OF REFERENCE PIXEL PATTERNS | 1 | 2 | 3 | 4 | ... | 15 | 16 |
| 0 | LARGE | K | E | M | P | ... | C | H |
| 1 | MIDDLE | D | I | C | J | ... | A | O |
| 2 | SMALL | G | A | K | L | ... | M | B |
| 3 | 0 | E | H | N | B | ... | F | J |
| 4 | LARGE | P | G | M | J | ... | D | E |
| ... | ... | ... | ... | ... | ... | ... | ... | ... |
| 65,535 | MIDDLE | A | F | M | B | ... | P | J |

FIRST COLOR ORDER TABLE (UPPER)

| REFERENCE PIXEL PATTERN | COLOR RANKS (FREQUENCY) | | | |
|---|---|---|---|---|
| | 1 | 2 | 3 | 4 |
| 0 | K | E | M | P |
| 1 | D | I | C | J |
| 2 | G | A | K | L |
| 3 | E | H | N | B |
| 4 | P | G | M | J |
| ... | | | | |
| 65,535 | A | F | M | B |

A,B,C,····P: COLOR CODES

FIG.25

SECOND COLOR ORDER TABLE (LOWER)

| REFERENCE PIXEL PATTERN | COLOR RANKS (FREQUENCY OF ALL PATTERNS) | | | | | | ... | | |
|---|---|---|---|---|---|---|---|---|---|
| | 1 | 2 | 3 | 4 | 5 | 6 | | 15 | 16 |
| 0~65,535 | H | L | O | A | M | D | | I | E |

A,B,C,····P: COLOR CODES

FIG.26

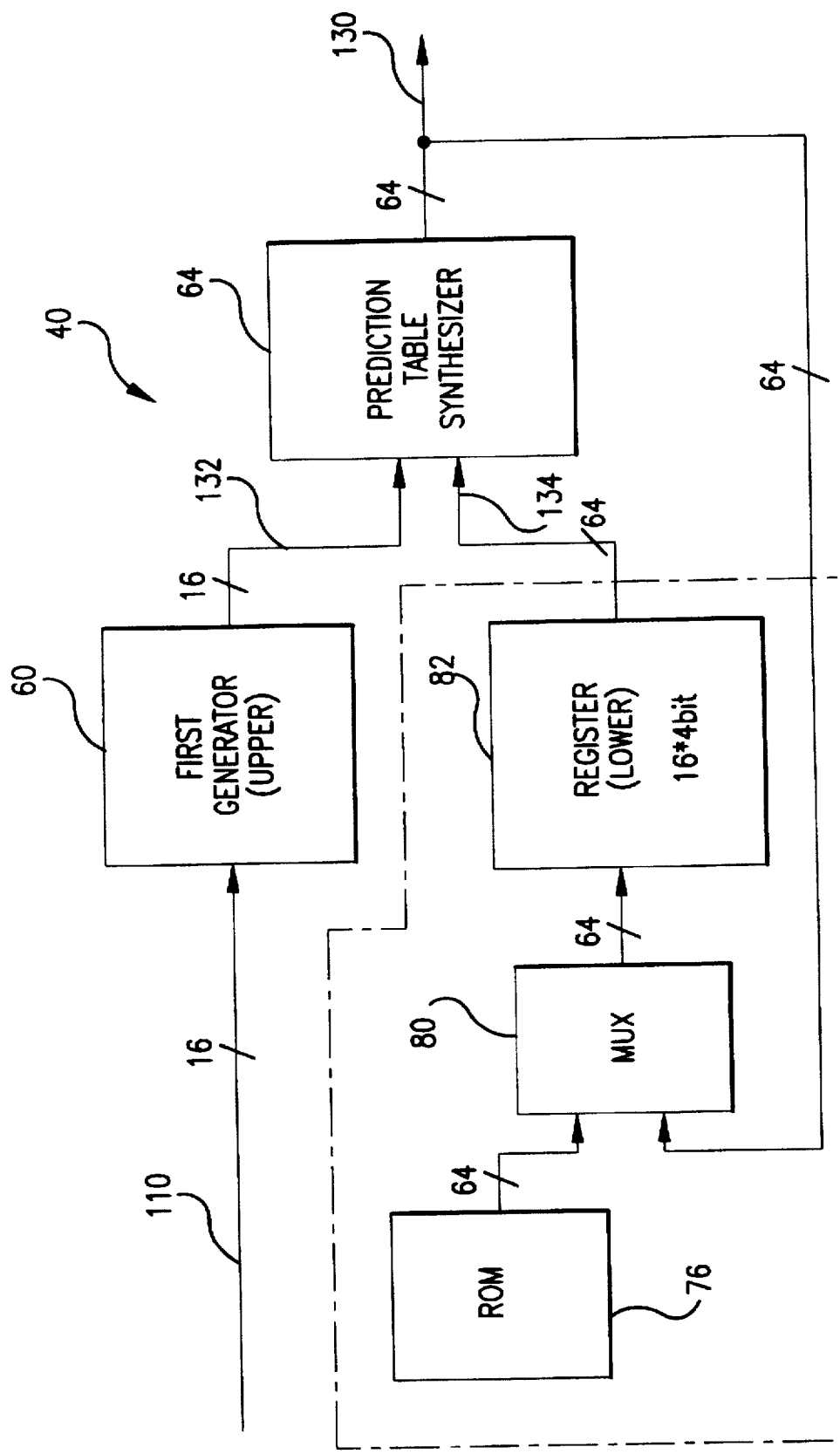

FIRST COLOR ORDER TABLE

| | | COLOR RANKS (FREQUENCY) | | | | | | |
|---|---|---|---|---|---|---|---|---|
| | FREQUENCY OF REFERENCE PIXEL PATTERNS | 1 | 2 | 3 | 4 | ... | 15 | 16 |
| 0 | LARGE | K | E | M | P | | C | H |
| 1 | MIDDLE | D | I | C | J | | A | O |
| 4 | LARGE | P | G | M | J | | D | E |
| 7 | LARGE | N | C | K | E | | G | H |
| 11 | MIDDLE | A | K | O | D | | B | P |
| ... | | | | | | | | |
| 65,535 | MIDDLE | A | F | M | B | | P | J |

REFERENCE PIXEL PATTERN

A,B,C,·····P: COLOR CODES

FIG.33

FIRST COLOR ORDER TABLE

| REFERENCE PIXEL PATTERN | FREQUENCY OF REFERENCE PIXEL PATTERNS | COLOR RANKS (FREQUENCY) | | | |
|---|---|---|---|---|---|
| | | 1 | 2 | 3 | 4 |
| 0 | LARGE | K | E | M | P |
| 1 | MIDDLE | D | I | C | J |
| 4 | LARGE | P | G | M | J |
| 7 | LARGE | N | C | K | E |
| 11 | MIDDLE | A | K | O | D |
| ⋮ | | | | | |
| 65,535 | MIDDLE | A | F | M | B |

A,B,C,······,P: COLOR CODES

FIG.34

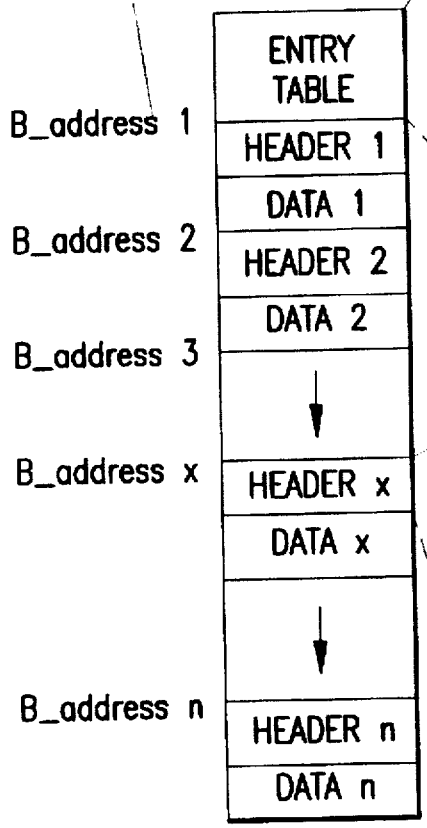

FIG.36A
FIRST COLOR ORDER TABLE

FIG.36B

| Block No. | Block Address |
|---|---|
| 1 | B_address 1 |
| 2 | B_address 2 |
| 3 | B_address 3 |
| 4 | B_address 4 |
| ↓ | ↓ |
| n | B_address n |

FIG.36C

| | HEADER INFORMATION PART |
|---|---|
| 1 | A1 A2 A3 A4 A5 A6 A7 A8 |
| 2 | A9 — — — — — — A16 |
| 3 | A17 — — — — — — A24 |
| ↓ | ↓ |
| j | — — — — Ay — — — — |
| ↓ | ↓ |
| h | Am·7 — — — — — — Am |

NUMBER OF REFERENCE PIXEL PATTERNS $S_n = 2^{a*b} = n*m$ a: NUMBER OF PLANES b: NUMBER OF REFERNCE PIXELS $S_i = m*x + y$
$x = INT\ (S_i/m)$
$y = MOD\ (S_i/m)$

Ay=1: DATA IS PRESENT IN FIRST COLOR ORDER TABLE

Ay=0: DATA IS NOT PRESENT IN FIRST COLOR ORDER TABLE

FIRST COLOR ORDER TABLE (CORRELATION)

| REFERENCE PIXEL PATTERN | REFERENCE PIXEL CORRELATION | COLOR RANKS (FREQUENCY) | | | | | | |
|---|---|---|---|---|---|---|---|---|
| | | 1 | 2 | 3 | 4 | ... | 15 | 16 |
| 0 | STRONG | K | E | M | P | | C | H |
| 2 | STRONG | G | A | K | L | | M | B |
| 5 | AVERAGE | I | G | M | P | | D | F |
| 7 | STRONG | B | C | O | E | | A | H |
| 12 | AVERAGE | K | H | O | D | | B | N |
| ... | | | | | | | | |
| 65,535 | AVERAGE | A | F | M | B | | P | J |

A,B,C,......P: COLOR CODES

FIG.38

FIRST COLOR ORDER TABLE
(CORRELATION, UPPER)

| REFERENCE PIXEL PATTERN | REFERENCE PIXEL CORRELATION | COLOR RANKS (FREQUENCY) | | | |
|---|---|---|---|---|---|
| | | 1 | 2 | 3 | 4 |
| 0 | STRONG | K | E | M | P |
| 2 | STRONG | G | A | K | L |
| 5 | AVERAGE | I | G | M | P |
| 7 | STRONG | B | C | O | E |
| 12 | AVERAGE | K | H | O | D |
| 65,535 | AVERAGE | A | F | M | B |

A,B,C, · · · · · ·P: COLOR CODES

FIG.39

Cn: COLOR CODE

UPDATED APPEARANCE TABLE

| RANKS | COLOR CODE |
|---|---|
| FIRST | C4 |
| SECOND | C2 |
| THIRD | C0 |
| FOURTH | C8 |
| ⋮ | ⋮ |
| SIXTEENTH | Cn |

FIG.45C ⟩
↳136

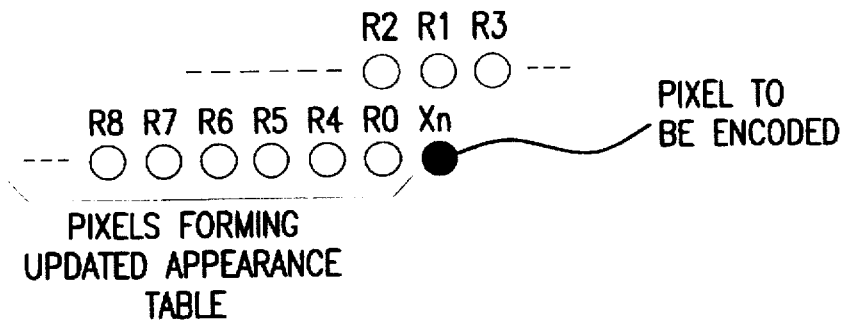
PRIORITY OF REFERENCE PIXELS
NO LEARNING: R0,R1,R2 · · · · R9 · · · (ALL FIXED PIXEL)
LEARNING: R0,R1,R2,R3,   R4,R5, · · · · R9 · · · ·
VARIABLE BY LEARNING          FIXED
FIG.48A
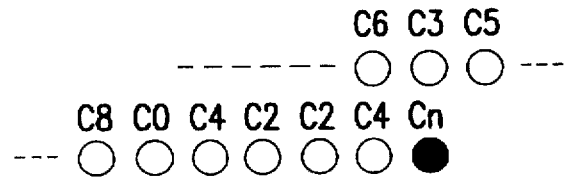
Cn: COLOR CODE
FIG.48B
UPDATED APPEARANCE TABLE
| RANKS | COLOR CODE |
|---|---|
| FIRST | C4 |
| SECOND | C3 |
| THIRD | C6 |
| FOURTH | C5 |
| FIFTH | C2 |
| SIXTH | C0 |
| SEVENTH | C8 |
| ⋮ | ⋮ |
| SIXTEENTH | Cn |
FIG.48C
130

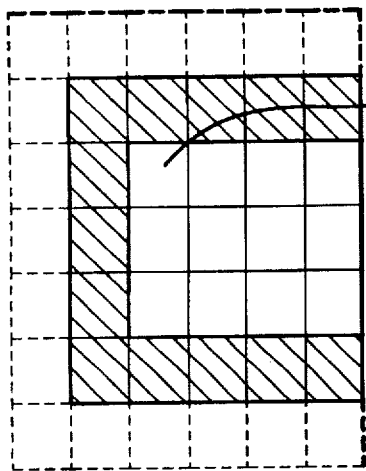
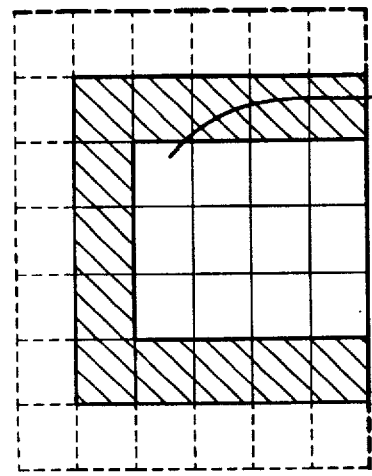
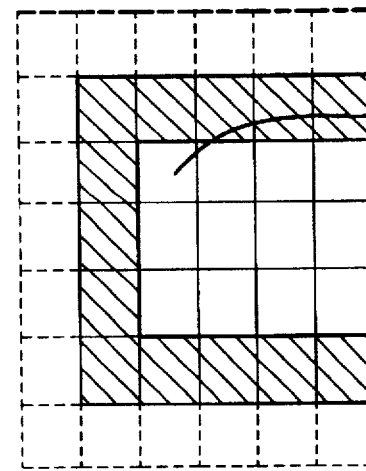
FIG.56A
FIG.56B

DATA ENCODING AND DECODING SYSTEM

BACKGROUND OF THE INVENTION

1. Field of the Invention

The present invention relates to data encoding and decoding systems particularly improved with respect to color pixel data.

2. Technical Background

In general, image data contains a great amount of information. If such an image data is to be processed as it is, it is not practical since an increased capacity of memory must be used with reduction of communication speed. Therefore, the compression of data is very important. The prior art have developed and practically used various data compression techniques.

One of the data compression techniques being recently attracted is the use of entropy encoder and decoder. One of the entropy encoding and decoding techniques may be of an arithmetic type as described in Japanese Patent Laid-Open Nos. Sho 62-185413, Sho 63-74324 and Sho 63-76525, for example.

FIG. 1 shows data encoding and data decoding systems 10, 20 which are constructed according to such a technique in the prior art.

The data encoding system 10 comprises a line buffer 12, and an entropy encoder 14. A color image data 100 stream is input to the line buffer 12 and entropy encoder 14 along scanning lines as pixel data, as shown in FIG. 2.

The line buffer 12 functions as a reference pixel generating means for generating reference pixels $a_n$, $b_n$, $c_n$ and $d_n$ or a pixel to be encoded $X_n$ from the input image data stream 100. More particularly, the line buffer 12 has stored color pixel data of n lines when an image is scanned. Each time color pixel data 100A of the pixel to be encoded $X_n$ is input into the line buffer 12, the latter outputs reference pixel data 110 toward the entropy encoder 14, the reference pixel data being a series of pixel data which include the immediately previous pixel $d_n$ and the surrounding pixels $a_n$, $b_n$ and $c_n$.

The entropy encoder 14 may be either of an arithmetic or other encoder. The entropy encoder 14 uses the reference pixel data 110 as a state signal to convert the color pixel data 100A into encoded pixel data 200.

The data decoding system 20 comprises a line buffer 22 and an entropy decoder 24. The line buffer and entropy decoder 22, 24 are arranged such that they decode and output the input encoded pixel data 200 in a completely reverse manner as in the line buffer and entropy encoder 12, 14 of the arithmetic encoder 10.

More particularly, the line buffer 22 is adapted to store decoded pixel data of n lines as in the line buffer 12, and to output the reference pixel data $a_n$, $b_n$, $c_n$ and $d_n$ for color pixel data 100B to be next decoded toward the entropy decoder 24.

The entropy decoder 24 may be either of an arithmetic or other decoder and uses the reference pixel data 110 as a state signal to decode and output the input encoded pixel 200 as decoded color pixel data 100B.

Thus, the data encoding and data decoding systems 10, 20 use their own algorithms completely opposite to each other to encode the color pixel data 100A into the encoded pixel data 200 and also to decode the encoded pixel data 200 into the color pixel data 100B which is in turn output therefrom. Therefore, these systems can be used over a broad range of applications.

For example, the data encoding system 10 shown in FIG. 1A may be used to convert color pixel data stream 100 into an encoded pixel data stream. The encoded pixel data stream is then transmitted to the data decoding system 20 shown in FIG. 1B by any transmission means, in which the encoded pixel data stream will be decoded. Thus, a high-precision color image data transmission and reception system may be constructed which can be applied to a broad range of applications such as TV telephone, facsimile and other communications.

The data encoding system 10 shown in FIG. 1A may also be used to convert the color pixel data stream 100 into the encoded pixel data stream which can be stored in an IC chip or other. For example, if the data decoding system 20 shown in FIG. 1B is mounted in a vehicle navigation system, map data encoded by the use of the system shown in FIG. 1A may be written into any storage means such as IC chips which are in turn sold commercially. The map data may particularly contains a great amount of image data over a broad range of areas. When the map data is effectively compressed by the encoding system, the map data for large area may be written into an IC chip having a limited storage capacity and reproduced by the navigation system into which the decoding system shown in FIG. 1B is incorporated.

The system shown in FIG. 1A can compress not only static picture image data, but also dynamic picture image data. The system of FIG. 1A can compress commercial images to be reproduced through several seconds to several minutes, the images being then written into an IC chip or other means. An display system comprising the system of FIG. 1B can be then used to reproduce these commercial images on a display. If a new product begins to be sold, the old chip including the commercial images of the previous product may only be replaced by a new IC chip which contains commercial image relating to the now product.

As described, the systems use the reference pixel data as the state signals for the entropy encoder and decoder 14, 24. Therefore, the rate of data compression can be increased if the number of states, that is, the number of reference pixels is increased.

However, the entropy encoder and decoder 14, 24 require an encoding and decoding parameter table corresponding in number to the states in the reference pixel data. As the number of reference pixels is increased to increase the rate of compression, the encoding and decoding parameter table is correspondingly enlarged. This raises a problem in that the entropy encoder and decoder 14, 24 are increased in size and cost.

It is now assumed that the color pixel data comprises four-bit data per pixel while the number of pixels in the reference pixel data 110 is equal to four. In such a case, the number of bits in the encoding and decoding parameter table will be four pixels×four bits=16 bits, and the number of state will be $2^{16}$. Therefore, parameter table having number of state equal to $2^{16}$=65,535 must be provided. From this fact, it is to be understood that the encoding and decoding parameter table will become extremely enlarged at each time when one reference pixel is added, leading to increase of the hardware dimensions in the entropy encoder and decoder 14, 24.

SUMMARY OF THE INVENTION

It is therefore an object of the present invention to provide data encoding and decoding systems each of which has a small-sized hardware and can encode or decode the color pixel data while increasing the data compressionm rate.

To this end, the present invention provides a data encoding system for encoding color pixel data to be input and outputting the encoded data, comprising:

reference pixel generating means which outputs reference pixel data for said color pixel data to be input on the basis of previously input color pixel data;

predictor means having a color order table which sets color ranks of color codes for every reference pixel pattern, reads and outputs color ranking data of a color code corresponding to said color pixel data to be input and said reference pixel data from said color order table; and entropy encoding means which converts said color ranking data into encoded data, and outputs said encoded data.

The present invention also provides a data decoding system for decoding encoded data to be input into color pixel data with an algorithm reverse to that of said data encoding system according to claim 1, and outputting the color pixel data, comprising:

reference pixel generating means which outputs reference pixel data for successive color pixel data to be decoded on the basis of previously decoded color pixel data;

entropy decoding means which converts said encoded data to be input into color ranking data, and outputs said color ranking data; and predictor means having a color order table which sets the color ranks of color codes for every reference pixel pattern, reads and outputs color pixel data representing a color code which corresponds to said color ranking data and said reference pixel data from said color order table.

The present invention further provides a method of encoding color pixel data to be input and outputting encoded data, comprising the steps of:

outputting reference pixel data for said color pixel data to be input on the basis of previously input color pixel data;

reading the color ranking data of a color code corresponding to the input color pixel data and the reference pixel data from a color order table which sets color ranks of color codes; and entropy encoding which converts the color ranking data into encoded data and outputs the encoded data.

The present invention still further provides a method of decoding input encoded data into color pixel data with an algorithm reverse to the data encoding method in accordance with claim 41, and outputting said color pixel data, comprising the steps of:

outputting reference pixel data for successive color pixel data to be decoded on the basis of previously decoded color pixel data;

entropy decoding the input encoded data into color ranking data and outputting the color ranking data;

reading a color code corresponding the input color ranking data and the reference pixel data as color pixel data from a color order table which Sets the color ranks of color codes.

When the entropy encoding means is used to encode data and data to be input into the entropy encoding means has a wide range of generative probability of color code data, it is generally known that the data compression rate can be improved.

The present invention uses the color order table to convert the color pixel data to be input into color ranking data corresponding to the predicting color order of color code. In other words, the color order table is used to convert data in such a manner that data having higher color order will be generated with higher generative probability while data having lower color order will be generated with lower generative probability. Therefore, it is possible to provide a big difference in the generative probability to data input into the entropy decoding means, and realize high data compression.

Even if the number of states in the entropy encoding means is very small, the present invention can realize an increased efficiency of data compression. Therefore, hardware can be reduced in size and manufacturing cost.

The data decoding system of the present invention decodes and outputs the encoded data into the original color pixel data with the algorithm which is reverse to that of the data encoding system of the present invention.

Therefore, even if the number of states in the entropy decoding means is small, the data decoding system of the present invention can decode data well. This can reduce hardware in size and cost.

It is Preferred that the predictor means in the data encoding system comprises, color order generating means which stores the color order table, uses input reference pixel data as an index to read the color order table data of said index from said color order table, and outputs said color order table data; and discriminating means which outputs color ranking data corresponding to color code of input color pixel data, on the basis of said color order table data output from said color order generating means.

It is also preferred that the predictor means in the data decoding system comprises, color order generating means which stores said color order table, uses input reference pixel data as an index to read the color order table data of said index from said color order table, and outputs said color order table data; and discriminating means which outputs a color code corresponding to input color ranking data as color pixel data, on the basis of said color order table data output from said color order generating means.

In such an arrangement, the color order generating means uses input reference pixel as an index to output color order table data having the corresponding index from the color order table.

The discriminating means determines the ranks of the color codes of the input color pixel data in the color order table data output from said color order generating means. The discriminating means then outputs color ranking data corresponding to color codes.

This enables a circuit for converting the color pixel data into the color ranking data to be constructed simply.

Particularly, the color ranking data uses each reference pixel pattern as an index to set the rank of frequency of each color code as color ranking data for every index. Thus, the color codes predicted by the reference pixel pattern interrelate more strongly with the color pixel data to be input. This can increase the data compression rate.

The color order generating means may comprise, an external memory which stores said color order table; and a memory interface which uses the input reference pixel data as an index to read the color order table data of said index from said external memory, and outputs the color order table data.

When the color ranking data has been stored in the external memory in such a manner, the color order tables can be changed from one to another. As a result, the optimum setting of color order table can be carried out depending on data to be encoded or decoded.

In the data encoding system, it is preferred that said color order generating means comprises:

first generator means which stores upper color order table data for each index in said color order table as a first color order table, and uses the input reference pixel data as an index to read and output first data representing the relationship between each color code and its color rank from said first color order table;

second generator means which stores color order table data representing the rank of frequency of each color code in a given image area as a second color order table, and outputs the data of said second color order table as second data each time color pixel data is input; and prediction table synthesizer means which uses said first data as an upper color order data and data obtained by removing the color code data in said first data from said second data as lower color order data to synthesize and output color order table data representing the relationship between each color code and its color ranking data.

In the data decoding system, it is preferred that the color order generating means comprises:

first generator means which stores upper color order table data for each index in said color order table as a first color order table, and uses the input reference pixel data as an index to read and output a first data representing the relationship between each color code and its color rank from said first color order table;

second generator means which stores color order table data representing the rank of frequency of each color code in a given image area as a second color order table, and outputs the data of said second color order table as a second data each time color ranking data is input; and prediction table synthesizer means which uses said first data as upper color order data and data obtained by removing the color code data in said first data from said second data as lower color order data to synthesize and output color order table data representing the relationship between each color code and its color ranking data.

In other words, the color order table using each reference pixel pattern as an index sets the color rank of a generated color code as table data for every index. As the number of possible reference pixel patterns increases, the table size will correspondingly be increased.

The present invention uses only table data of the upper color order as a first color order table for each index. As for table data of the lower color order, second color order table data which is common to the reference pixel patterns is used. The second color order table is set as color ranking data representing the rank of frequency of each color code in a given image area.

Thereafter, the final color order table data is synthesized and output from the first data read by the reference pixel data as an index and the second data read from the second color order table in synchronism with the first color order data. At this point, the first data is used as upper color order table data and data obtained by removing the color code data in the first data from the second data is used as lower color order data. By combining such data, the final color order table data is synthesized and output.

In such an arrangement, the table size for the color order table in use can be reduced to save the memory. This can further reduce the entire system in size and cost.

The table size can be reduced with a technique different from the aforementioned techniques.

In the data encoding system of the present invention, the color order generating means may comprise:

first generator means which stores color order table data of at least one index in said color order table whose frequency is equal to or higher than a given level as a first color order table, reads first data representing the relationship between each color code and its color ranking data from said first color order table, and outputs said first data when an index corresponding to input reference pixel data is present in said first color order table;

second generator means which stores color order table data representing the rank of frequency of each color code in a given image area as a second color order table, and outputs the second color order table data as second data each time the color pixel data is input; and prediction table synthesizer means which uses the first data as data representing the relationship between each color code and its color ranking data when said first data is output, and said second data as data representing the relationship between each color code and its color ranking data when said first data is not output, in order to synthesize and output color order table data representing each color code and its color ranking data.

In the data decoding system of the present invention, the color order generating means may comprise:

first generator means which stores color order table data of at least one index in said color order table whose frequency is equal to or higher than a given level as a first color order table, reads first data representing the relationship between each color code and its color ranking data from said first color order table, and outputs said first data when an index corresponding to input reference pixel data is present in said first color order table;

second generator means which stores color order table data representing the rank of frequency of each color code in a given image area as a second color order table, and outputs the second color order table data as second data each time the color ranking data is input; and prediction table synthesizer means which uses the first data as data representing the relationship between each color code and its color ranking data when said first data is output, and said second data as data representing the relationship between each color code and its color ranking data when said first data is not output, in order to synthesize and output color order table data representing each color code and its color ranking data.

In such a manner, the first color order table is set only when the color ranking data has its index in which the frequency of reference pixel in the color order table is equal to or higher than a given level. Therefore, the table size in use can be reduced with reduction of the manufacturing cost in the entire system.

At this point, the first color order table in use can further be degenerated to reduce its table size.

In such a case, the first generator means stores the upper color order table data for every index as a first color order table, reads first data representing the relationship between each color code and its color ranking data from said first color order table on the basis of input reference pixel data, and outputs said first data in said color order table:

said prediction table synthesizing means uses the first data as upper color order data and data obtained by removing the color code data in the first data from the second data as lower color order data when the first data is output, in order to synthesize and output color order table data representing the relationship between each color code and its color ranking data.

Further, the first generator means of the data decoding system according to the present invention may be adapted to store the upper color order table data for every index as a first color order table, reads first data representing the relationship between each color code and its color ranking data from said first color order table on the basis of input reference pixel data, and outputs said first data in said color order table;

said prediction table synthesizing means uses the first data as upper color order data and data obtained by removing the color code data in the first data from the second data as lower color order data when the first data is output, in order to synthesize and output color order table data representing the relationship between each color code and its color ranking data.

Thus, the first color order table is formed by deleting the table data having its index in which the frequency of reference pixel is lower from the color order table and also by deleting the lower color order table data from the table data of the remaining index. The table size in use can be reduced with reduction of the manufacturing cost in the entire system.

The technique with which the color order table is degenerated to form the first color order table may be responsive to the degree of correlation of the reference pixel pattern to degenerate the color order table to form the first color order table, other than the technique in which the table is degenerated on the basis of frequency of index to be referred in the color order table.

More particularly, the color order generating means of the data encoding system according to the present invention may comprise:

first generator means which stores color order table data of at least one index corresponding to a reference pixel pattern whose correlation degree is equal to or higher than a given level as a first color order table in said color order table, in order to read and output first data representing the relationship between each color code and its color ranking data from the first color order table when the index corresponding to the input reference pixel data is present in the first color order table;

second generator means which stores color order table data representing the rank of frequency of each color code in a given image area as a second color order table, and outputs the data of said second color order table as second data in synchronism with the input of said color pixel data; and prediction table synthesizing means which uses the first data as data representing the relationship between each color code and its color ranking data when the first data is output and the second data as data representing the relationship between each color code and its color ranking data when said first data is not output, in order to synthesize and output color order table data representing the relationship between each color code and its color ranking data.

In the data decoding system of the present invention, the color order generating means may comprise:

first generator means which stores color order table data of at least one index corresponding to a reference pixel pattern whose correlation degree is equal to or higher than a given level as a first color order table in said color order table, in order to read and output first data representing the relationship between each color code and its color ranking data from the first color order table when the index corresponding to the input reference pixel data is present in the first color order table;

second generator means which stores color order table data representing the rank of frequency of each color code in a given image area as a second color order table, and outputs the data of said second color order table as second data in synchronism with the input of said color ranking data; and prediction table synthesizing means which uses the first data as data representing the relationship between each color code and its color ranking data when the first data is output and the second data as data representing the relationship between each color code and its color ranking data when said first data is not output, in order to synthesize and output color order table data representing the relationship between each color code and its color ranking data.

Also by forming the first color order table in such a manner, the color order table in use can be reduced in size to reduce the entire system in size and cost.

The table size of the first color order table can further be reduced through the following technique:

Namely, the first generator means stores upper color order table data for each index in the color order table as a first color order table in said color order table, and reads and outputs first data representing the relationship between each color code and its color ranking data from the first color order table on the basis of input reference pixel data; and said prediction table synthesizing means uses the first data as upper color order data and data obtained by removing the color code data in the first data from the second data as a lower color order data to synthesize and output color order table data representing the relationship between each color code and its color ranking data when the first data is output.

The first generator means of the data decoding system may store upper color order table data for each index in the color order table as a first color order table in said color order table, and reads and outputs first data representing the relationship between each color code and its color ranking data from the first color order table on the basis of input reference pixel data; and said prediction table synthesizing means uses the first data as upper color order data and data obtained by removing the color code data in the first data from the second data as a lower color order data to synthesize and output color order table data representing the relationship between each color code and its color ranking data when the first data is output.

By deleting the table data of the lower color order to form the first color order table in such a manner, the table size in use can further be degenerated to reduce the entire system in size and cost.

According to the present invention, furthermore, the second generator means may form the second color order table as a fixed table. Alternatively, the second color order table may be in the form of a table capable of updating the data if necessary, rather than the fixed table.

For example, the second generator means may be adapted to raise the color rank of the color code corresponding to the input color pixel data in the second color order table to the first rank each time the color pixel data is input.

Thus, the second color order table can reflect the characteristics of other images. Therefore, when such a table is used, the predicted error in the image can further be reduced to provide a better data compression.

Still further, the second generator means may update the data of the second color order table into data representing the relationship between each color code and its color ranking data, which is synthesized and output from the prediction table synthesizing means.

Also by updating the data of the second color order table sequentially into the table data value synthesized and output from the prediction table synthesizing means, the data of the second color order table can reflect the characteristics of other images.

The present invention further provides a data encoding system for encoding color pixel data to be input and for outputting encoded data, comprising:

predicting means having a color order table which sets the color ranks of color codes, reads and outputs the color ranking data of a color code corresponding to the input color pixel data from said color order table; and entropy encoding means which converts the color ranking data into encoded data and outputs the encoded data, said predicting means which raises the color rank of a color code corresponding to the input color pixel data in said color order table into the first rank each time the color pixel data is input.

The present invention further provides a data decoding system for decoding input encoded data into color pixel data for outputting the decoded data with an algorithm reverse to that of the data encoding system, comprising:

entropy decoding means which converts input encoded data into color ranking data and outputs the color ranking data; and predicting means having a color order table which sets the color ranks of color codes, reads a color code corresponding to input color ranking data as color pixel data from said color order table, and outputs said color code from said predicting means.

said predicting means which raises the color rank of a color code corresponding to the output color pixel data in said color order table into the first rank each time the color pixel data is output.

The present invention further provides a method of encoding color pixel data to be input and outputting encoded data, comprising the steps of:

reading color ranking data of a color code corresponding to the input color pixel data from a color order table which sets the color ranks of color codes;

entropy encoding the color ranking data into encoded data and outputting the encoded data; and raising the color rank of a color code corresponding to the input color pixel data in said color order table into the first rank each time the color pixel data is input.

The Present invention further provides a method of decoding input encoded data into color pixel data and outputting the color pixel data with an algorithm reverse to that of the data encoding method, comprising the steps of:

entropy decoding input encoded data into, color ranking data and outputting the color ranking data;

reading a color code corresponding to the input color ranking data as color pixel data from a color order table which sets color rank of color codes; and raising the color rank of a color code corresponding to the output color pixel data in said color order table into the first rank each time the color pixel data is output.

The color order table may be updated to raise the color rank of the color code corresponding to the color pixel data each time the color pixel data is put to the first rank.

In such an arrangement, the entire data of the color order table in use can always reflect the characteristics of other images. Therefore, the image data can be compressed more effectively.

Since the color order table can be set to such a size that the color ranking data corresponding to the generated color codes can be set, the table size can be reduced highly to cut the manufacturing cost of the entire system, unlike the table which uses the reference pixel pattern as an index to set the color rank of the color code array for each index.

If a one-dimensional color order table is used as said color order table, the predicting means may be formed in the following manner:

In the data encoding system, the predicting means may comprise:

one-dimensional color order generating means having a one-dimensional color order table which sets the color ranks of color codes, outputs the data of said color order table each time color pixel data is input, and also raises the color rank of a color code corresponding to input color pixel data in said one-dimensional color order table into the first rank; and discriminating means which outputs color ranking data corresponding to the color code of the input color pixel data, on the basis of the color order table data output from said one-dimensional color order generating means.

In the data decoding system, the predicting means may comprise:

one-dimensional color order generating means having a one-dimensional color order table which sets the color ranks of color codes, outputs the data of said color order table each time color ranking data is input and also raises the color rank of a color code corresponding to the decoded color pixel data in said one-dimensional color order table into the first order; and discriminating means which outputs a color code corresponding to the input color ranking data as color pixel data, on the basis of the color order table data output from said one-dimensional color order generating means.

In such a case, the data encoding system of the present invention comprises reference pixel generating means for outputting two-dimensional reference pixel data for said color pixel data to be input on the basis of previously input color pixel data and wherein said predicting means comprising:

one-dimensional color order generating means having a one-dimensional color order table which sets the color ranks of color codes, outputs the data of said color order table as second data each time color pixel data is input and also raises the color rank of a color code corresponding to the input color pixel data in said one-dimensional color order table into the first rank;

prediction table synthesizing means which sets color rank for the color codes of each of pixels defining the two-dimensional reference pixel data and which uses said color rank as first data for specifying an upper color order and data obtained by removing the color code data in the first data from the second data as third, data for specifying a lower color order, in order to combine said first and third data to synthesize and output two-dimensional color order table data representing the relationship between each color code and its color rank; and discriminating means which outputs the color ranking data corresponding to the color code of the input color pixel data, on the basis of the two-dimensional color order table data output from said prediction table synthesizing means.

The data decoding system comprises reference pixel generating means for outputting two-dimensional reference pixel data for the color pixel data on the basis of previously decoded color pixel data and wherein said predicting means comprising:

one-dimensional color order generating means having a one-dimensional color order table which sets The color ranks of color codes, outputs the data of said color order table as second data each time color ranking data is input, and also raises the color rank of a color code corresponding to the decoded color pixel data in said one-dimensional color order table into the first rank;

prediction table synthesizing means which sets color ranks for the color codes of each of pixels defining the two-dimensional reference pixel data and which uses said color ranks as first data for specifying an upper color order and data obtained by removing the color code data in the first data from the second data as third data for specifying a lower color order, in order to combine said first and third data to synthesize and output a two-dimensional color order table data representing the relationship between each color code and its color rank; and discriminating means which outputs the color code corresponding to the input color ranking data as color pixel data, on the basis of the two-dimensional color order table data output from said prediction table synthesizing means.

Thus, the two-dimensional reference pixel data output from the reference pixel generating means can be used as the first data for specifying the upper color order, and the one-dimensional color order table data output from the one-dimensional color order generating means can be used as the second data. The first and second data can be combined to synthesize and output the two-dimensional color order table data representing the relationship between each color code and its color rank.

In such a manner, the two-dimensional color order table data can reflect more strongly the characteristics of other images such that the data can be compressed more effectively.

At this point, it is preferred that the predicting means includes priority switching means responsive to a given switching command to change the color rank set for each of the pixels defining the two-dimensional reference pixel data.

When the color rank set at each of the pixels defining the two-dimensional reference pixel data is appropriately switched from one to another, it is possible to generate the two-dimensional color order table reflecting more strongly the characteristics of other images.

The data encoding system of the present invention is further characterized by that the entropy encoding means sets a conversion table for the color ranking data and encoded data for each of state parameters depending on the state of reference pixel data, and uses said conversion table for input reference pixel data to convert input color ranking data into encoded data and to output the encoded data.

It is further preferred that the entropy encoding means sets a conversion table representing the probability of color ranking data generation for each of state parameters depending on the state of reference pixel data, and uses said conversion table for input reference pixel data to convert input color ranking data into encoded data depending on its generative probability and to output the encoded data.

The data decoding system of the present invention is further characterized by that the entropy decoding means sets a conversion table for the color ranking data and encoded data for each of state parameters depending on the state of reference pixel data, and uses said conversion table for input reference pixel data to convert input encoded data into color ranking data and to output the color ranking data.

It is further preferred that the entropy decoding means sets a conversion table representing the probability of color ranking data generation for each of state parameters depending on the state of reference pixel data, and uses a conversion table for input reference pixel data to convert input encoded data into color ranking data and to output the color ranking data.

When reference pixel data is input into the entropy encoding and decoding means as a state signal to set the same number of states in the encoding and decoding parameter tables as in the prior art, the data compression rate can be increased more greatly than the prior art.

It is preferred that the data encoding system of the present invention comprises degenerating means for degenerating the input reference pixel data to output degenerated data and wherein said entropy encoding means sets a conversion table for each state parameter depending on the state of said degenerated data, and uses said conversion table for input degenerated data to convert input color ranking data into encoded data and to output the encoded data.

It is preferred that the data decoding system of the present invention comprises degenerating means for degenerating the input reference pixel data to output degenerated data and wherein the entropy decoding means sets a conversion table for each state parameter depending on the state of said degenerated data, and uses said conversion table for input degenerated data to convert input encoded data into color ranking data and to output the color ranking data.

According to the present invention, thus, the reference pixel data is degenerated by the degenerating means, the degenerated data being used as a state signal for the entropy encoding and decoding means. Therefore, the number of states in the entropy encoding and decoding means can be reduced while a higher efficiency of data compression can be realized.

It is preferred that the degenerating means includes a degeneracy table which performs conversion between the reference pixel data and the degenerated data, converts input reference pixel data into degenerated data and outputs the degenerated data, said degeneracy table being generated by arranging a preliminary table representing data obtained by statistically measuring the generative probability of a color code for every index using reference pixel patterns as indexes, and by classifying the indexes in the preliminary table into degenerated data having a predetermined number of degenerations to make the average amount of information about one color code minimum so that the relationship between each index and the degenerated data will be defined.

The degenerating means may be in the following form, other than the above-mentioned form.

The degenerating means may include a degeneracy table which performs conversion between a combined color code of reference pixel data and the degenerated data, converts a combined color code of the input reference pixel data into degenerated data and outputs the degenerated data.

In such a manner, the reference pixel data can be degenerated to compress the image data more efficiently.

If a reference pixel is out of an image frame and when the reference pixel is a fixed value, it raises a problem in that when the image data on the peripheral area of the image is to be encoded, the correlation between the reference pixel and the encoded data will be reduced to degrade the compression rate.

To overcome such a problem, the data encoding system of the present invention may preferably comprise:

an out-of-frame value determining means which determines a common out-of-frame value to N image data (wherein N is an integer number equal to or more than one) from the pixel values on the peripheral areas of the N image data;

an image buffer which accumulates the input N image data until the out-of-frame value is determined by said out-of-frame value determining unit; and a reference pixel synthesizing means which outputs the output data from said reference pixel generating means as reference pixel data, when all the reference pixels for color pixel data to be encoded are within the image frame, or outputting reference pixel data by combining said out-of-frame value which is used as the value of a reference pixel located out of the frame and the output data of said reference pixel generating means which is used as the value of a reference pixel located within the frame, when part or all of the reference pixels are out of the image frame, said out-of-frame value being output in correlation with said encoded data.

The data decoding system of the present invention is preferably constructed such that a reference pixel synthesizing means receives an output out-of-frame value, wherein the reference pixel synthesizing means outputs the output data from said reference pixel generating means as reference pixel data when all the reference pixels for color pixel data to be decoded are within the image frame, or outputs reference pixel data by combining said out-of-frame value which is used as the value of a reference pixel located out of the frame and the output data of said reference pixel generating means which is used as the value of a reference pixel located within the frame, when part or all of the reference pixels are out of the image frame.*such that it inputs output out-of-frame value and that a reference pixel synthesizing unit for outputting the output data from said reference pixel generating means as reference pixel data when all the reference pixels for color pixel data to be decoded are within the image frame, or outputs reference pixel data by combining said out-of-frame value as the value of a reference pixel located out of the frame when part or all of the reference pixels are out of the image frame and using the output data of said reference pixel generating means as the value of a reference pixel located within the frame in order to synthesize and output.

When the number of image data N handled by one out-of-frame value is selected to provide the maximum compression throughout the entire system, the image can effectively be encoded and decoded irrespectively of the number of pixels in the image data.

BRIEF DESCRIPTION OF THE DRAWINGS

FIGS. 1A and 1B are block diagrams of data encoding and decoding systems constructed in accordance with the prior art.

FIGS. 3A and 3B are block diagrams of the first embodiment of data encoding and decoding systems constructed

FIG. 6 is a color order table used in the first embodiment.

FIGS. 7A and 7B are block diagrams of a predictor used in the first embodiment.

FIG. 12 is a chart illustrating data set in the Huffman tables shown in FIGS. 10 and 11.

FIGS. 14A and 14B are block diagrams of the second embodiment of data encoding and decoding systems constructed in accordance with the present invention.

FIGS. 15A and 15B are block diagrams of the third embodiment of data encoding and decoding systems constructed in accordance with the present invention.

FIG. 16 is a degeneracy table used in the third embodiment.

FIG. 18 is a table used to generate the degeneracy table.

FIGS. 19A and 19B are charts illustrating the procedure of generating the degeneracy table.

FIG. 21 is a chart illustrating the relationship between the table data of the color order table and the appearance frequency of reference pixel pattern.

FIG. 25 is a chart illustrating a first color order table which is used in the fourth embodiment.

FIG. 26 is a chart illustrating a second color order table which is used in the fourth embodiment.

15

Figures 31A, 31B, 31C:
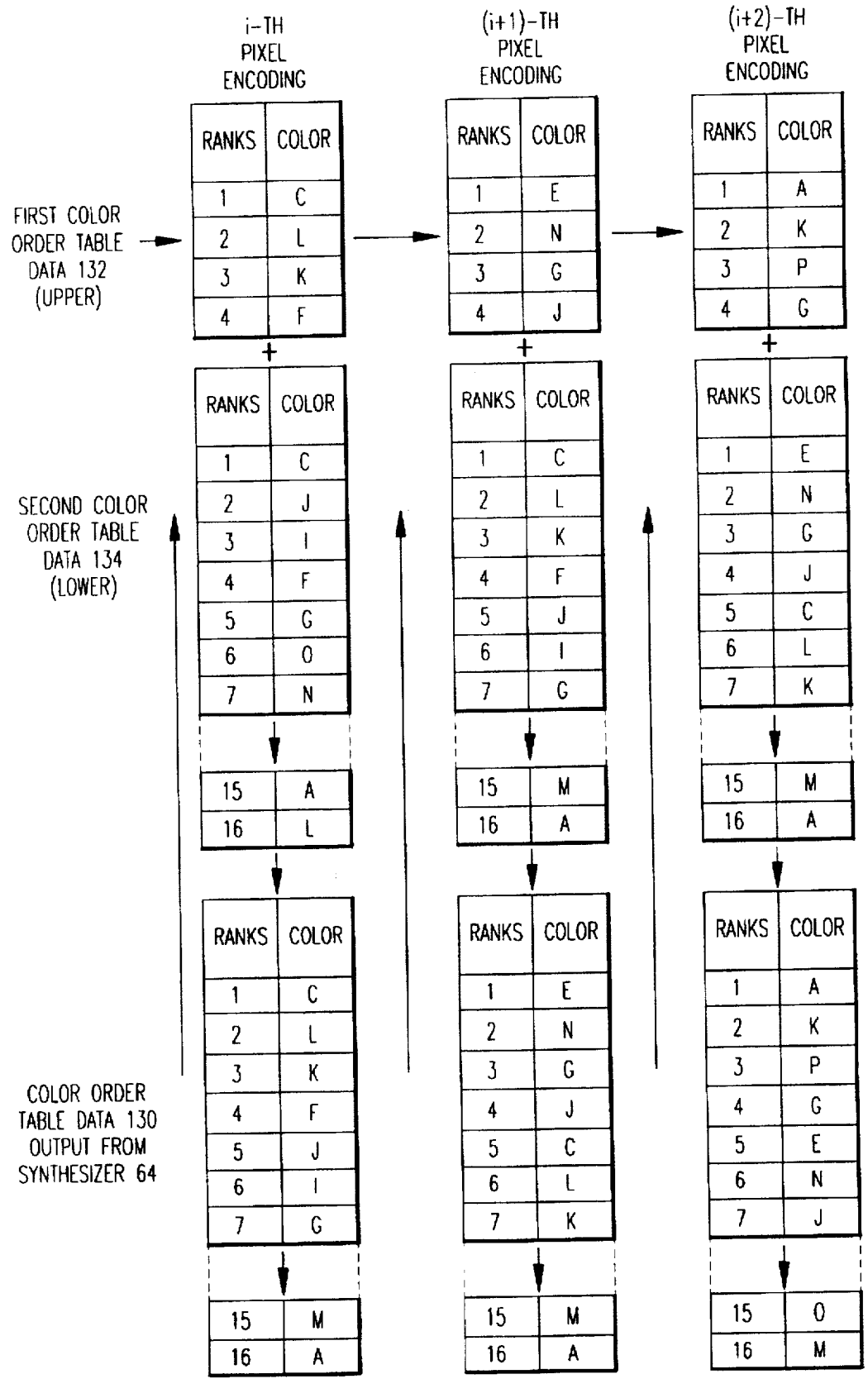

FIGS. 31A, 31B and 31C are charts illustrating a series of steps which synthesize the final color order table from the first and second color order tables, the synthesized color order table being used as a second color order table for processing the next data.

FIG. 32 is a diagram illustrating a circuit of performing the operation of FIG. 31.

FIG. 33 is a chart illustrating a modification of the first color order table.

FIG. 34 is a chart which is formed by further degenerating the color order table shown in FIG. 33.

Figure 35:
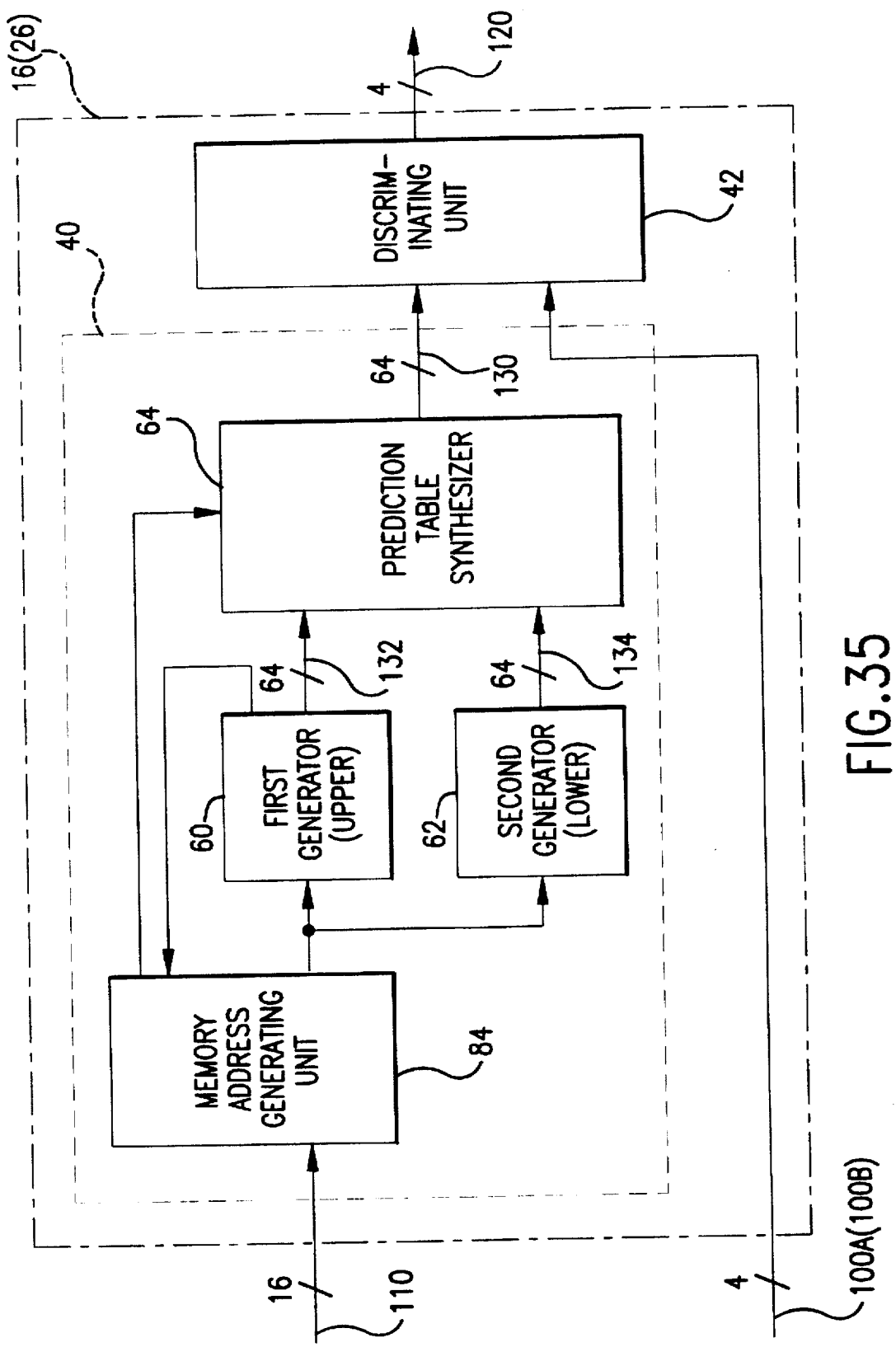

FIG. 35 is a diagram of a circuit which uses the first color order table shown in FIG. 33 or 34 to synthesize the final color order table.

FIGS. 36A, 36B and 36C are charts illustrating the first color order table shown in FIG. 33.

Figure 37:
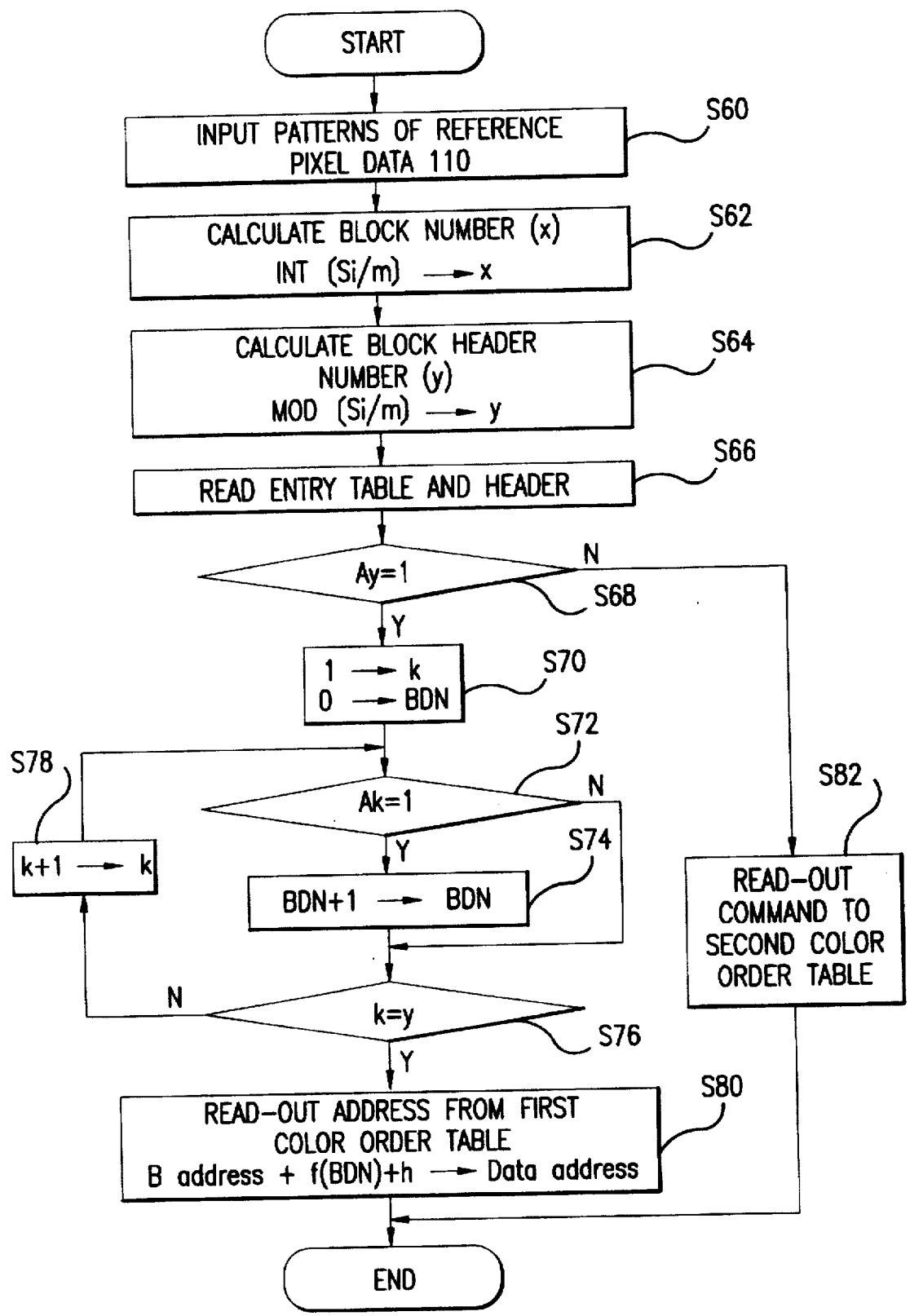

FIG. 37 is a flow chart illustrating an access to the first color order table shown in FIG. 36.

FIG. 38 is another first color order table.

FIG. 39 is a table which is obtained by further degenerating the color order table shown in FIG. 38.

Figure 40:
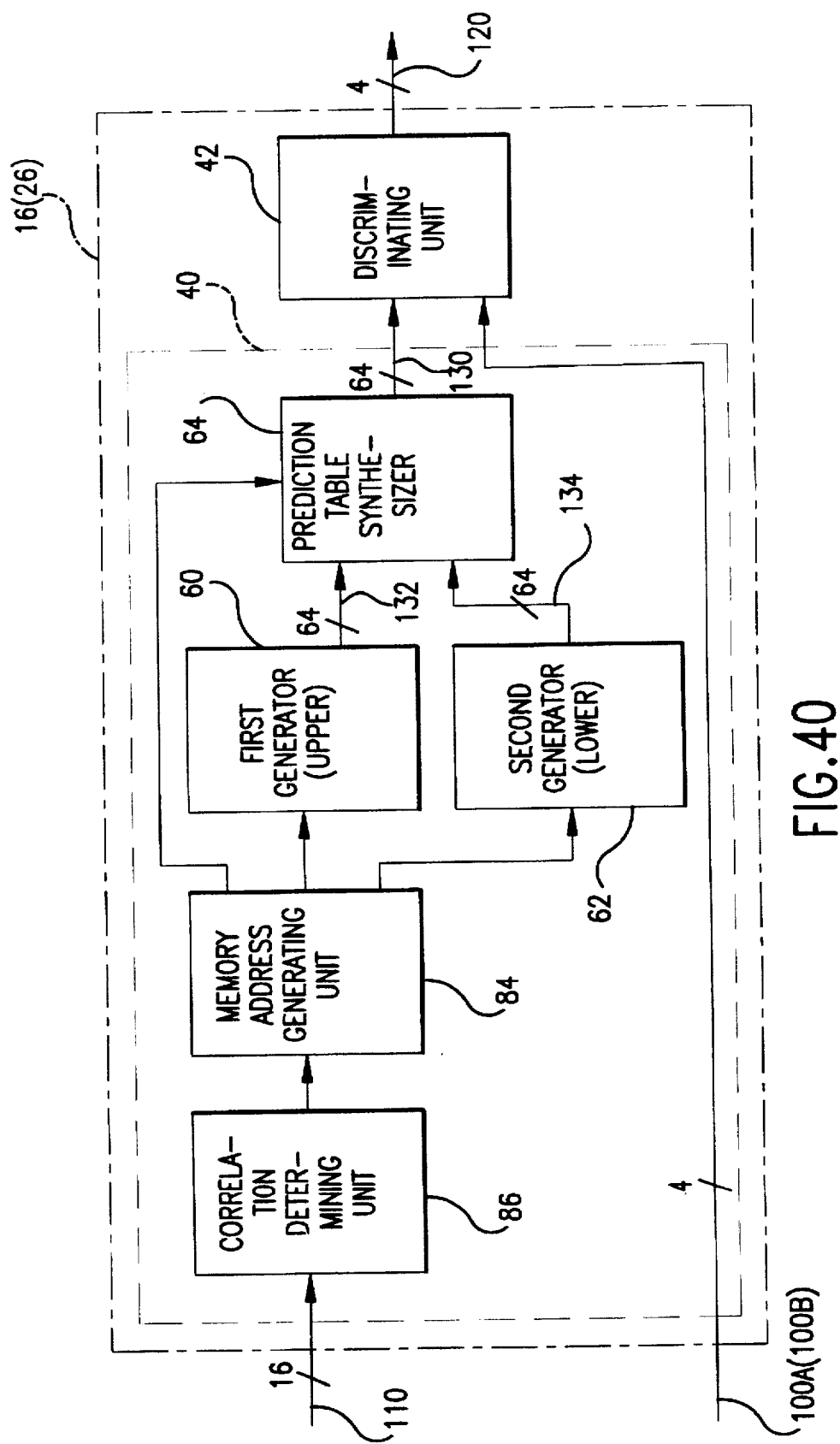

FIG. 40 is a view of a circuit which uses the first color order table shown in FIG. 38 or 39 to synthesize the final color order table.

Figure 41A:
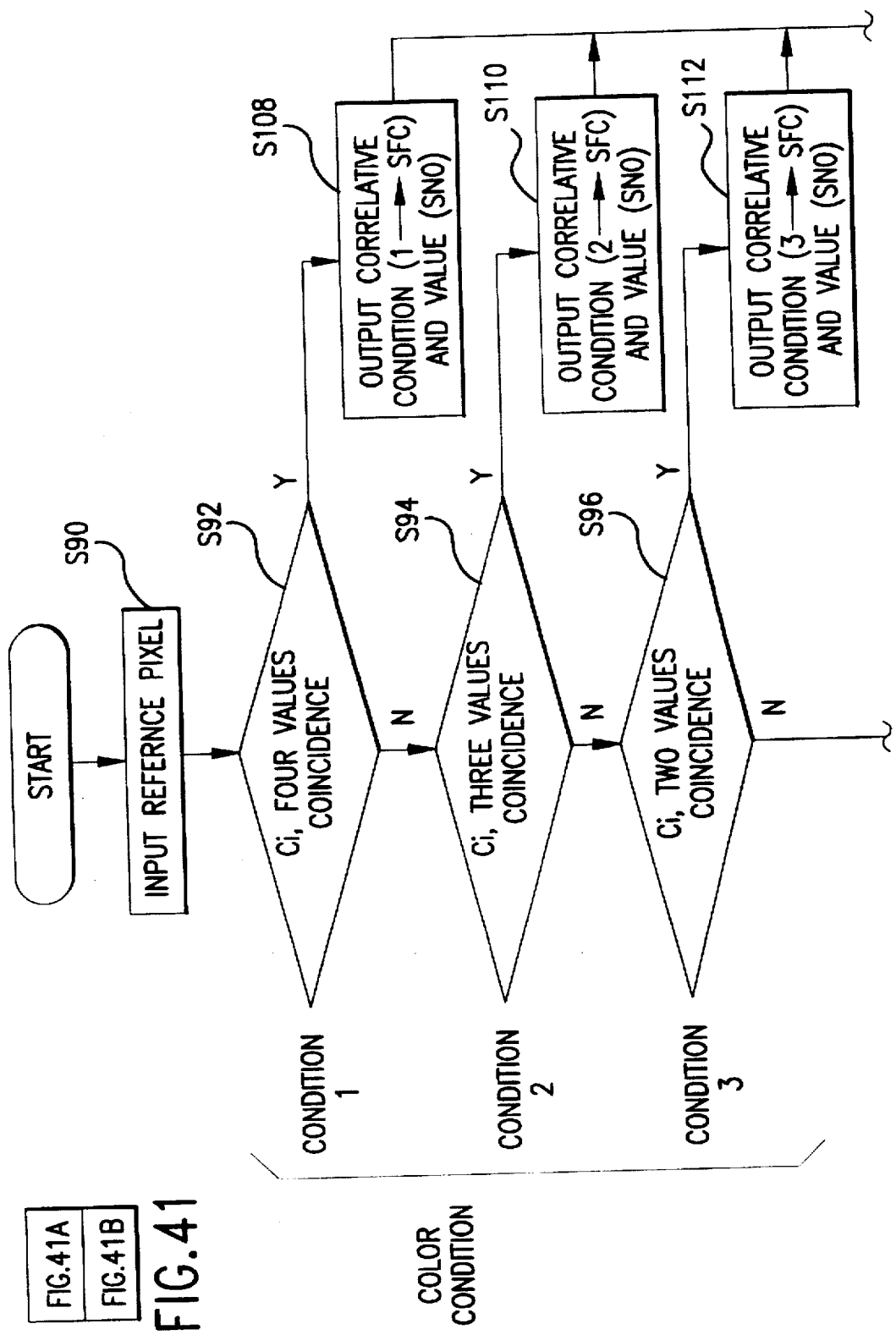
Figure 41B:
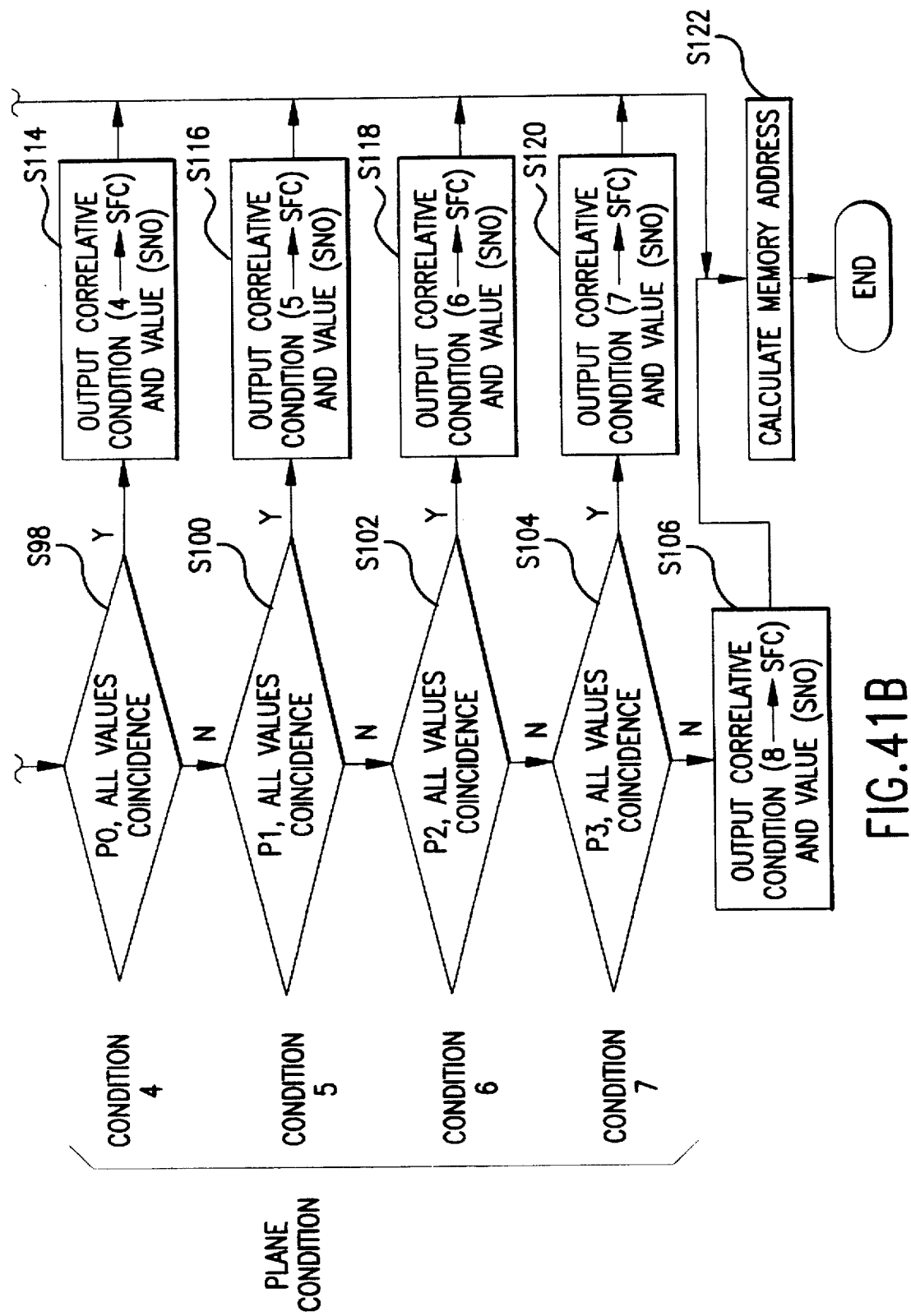

FIGS. 41A and 41B are a flow chart illustrating the operation of the correlation discriminating unit shown in FIG. 40.

Figure 42:
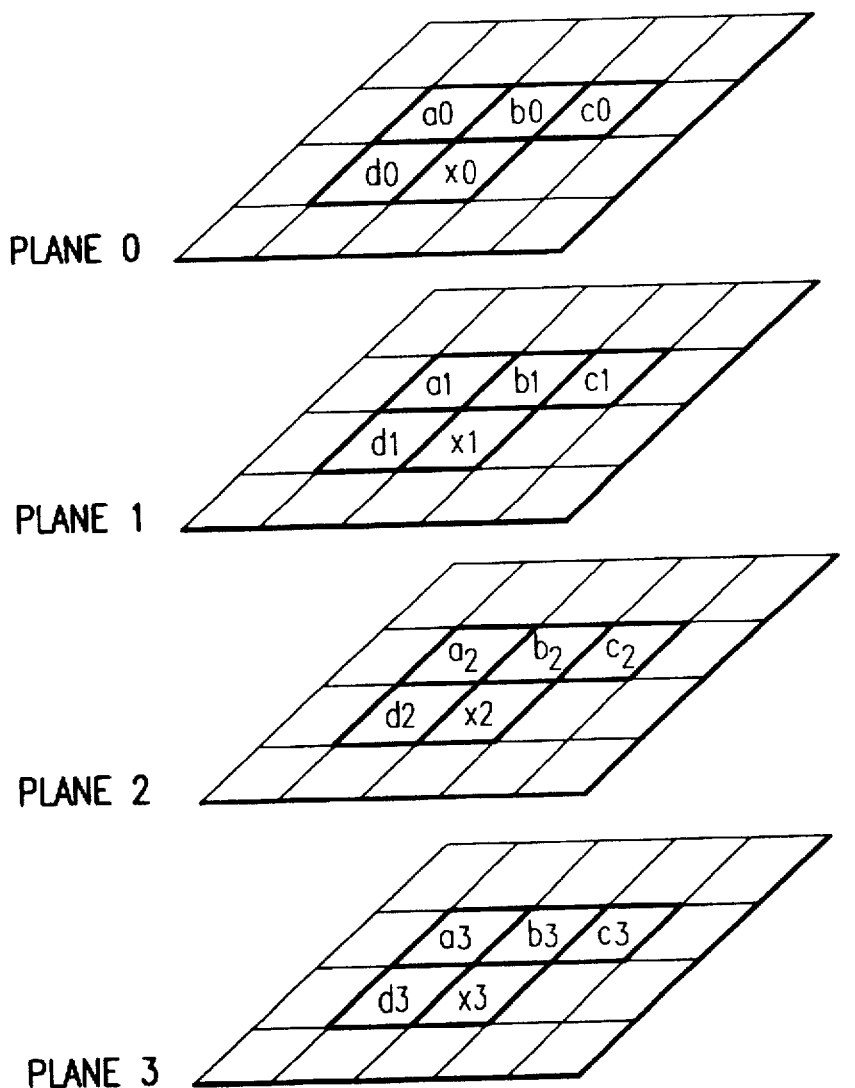

FIG. 42 is a diagram illustrating the relationship between planes into which the reference pixel data and notable pixel are disassembled.

Figure 43:
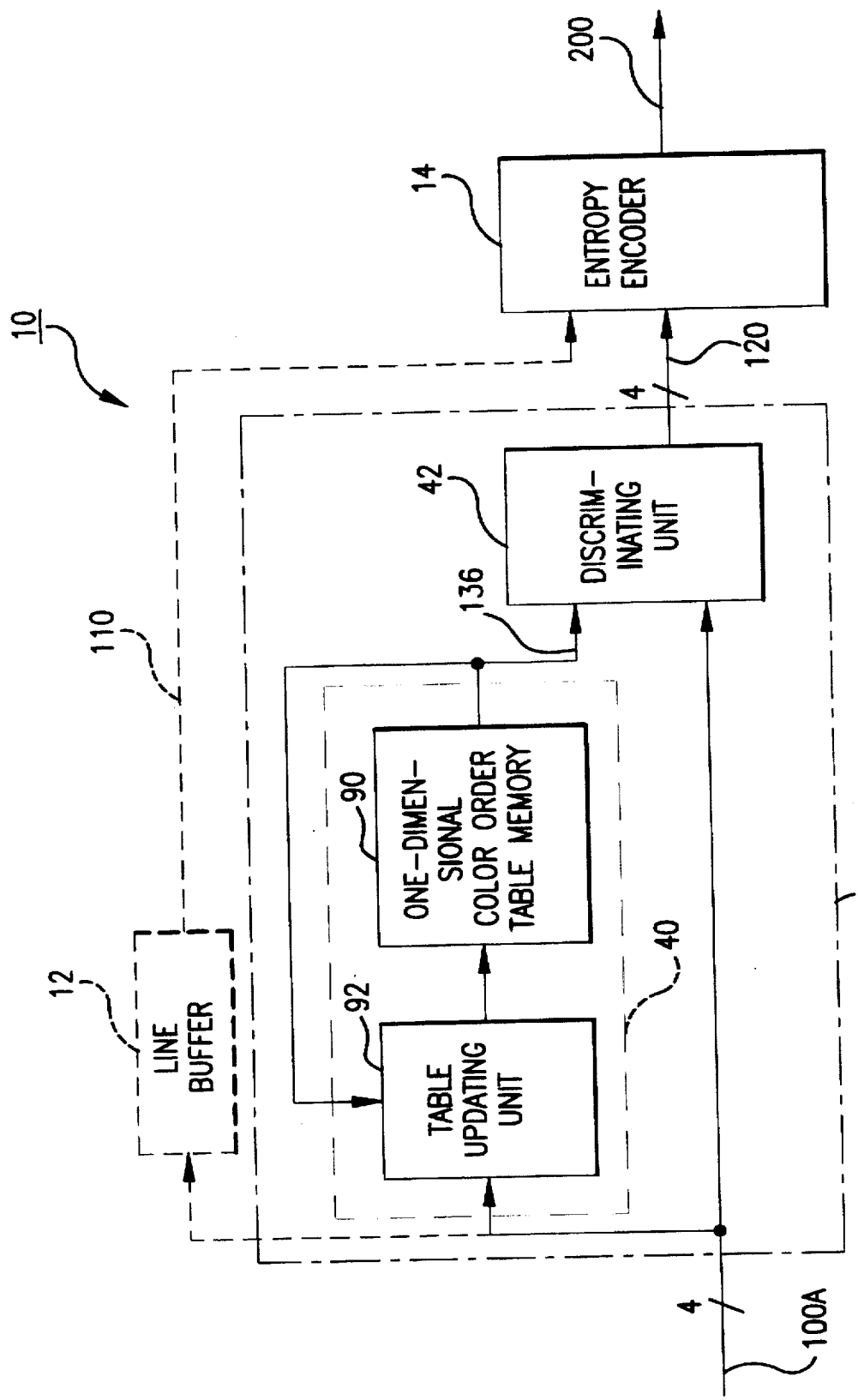

FIG. 43 is a block diagram of the fifth embodiment of a data encoding system constructed in accordance with the present invention.

Figure 44:
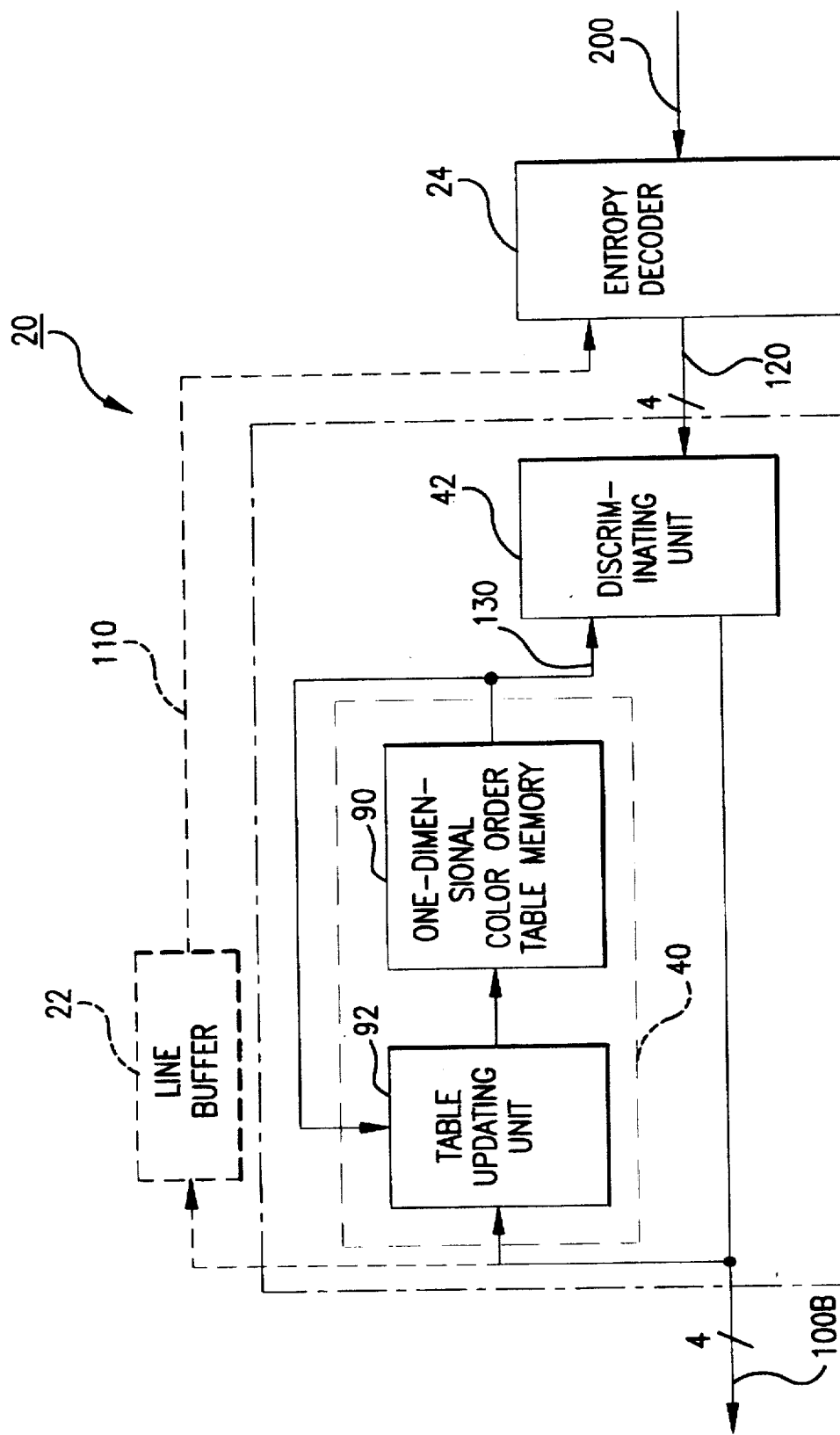

FIG. 44 is a block diagram of the fifth embodiment of a data decoding system constructed in accordance with the present invention.

Figure 45A:
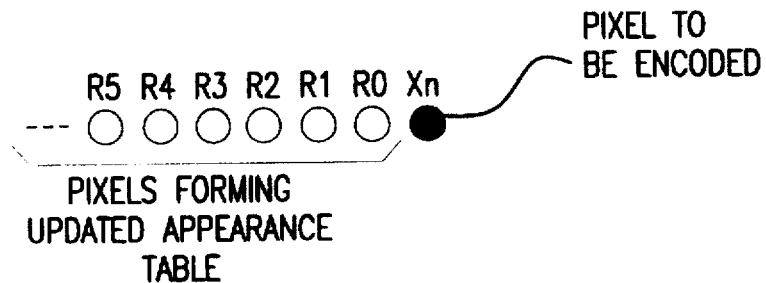
Figure 45B:
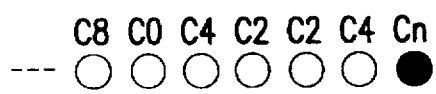

FIGS. 45A, 45B and 45C are diagrams illustrating the principle of generating a one-dimensional color order table which is used in the fifth embodiment.

Figure 46:
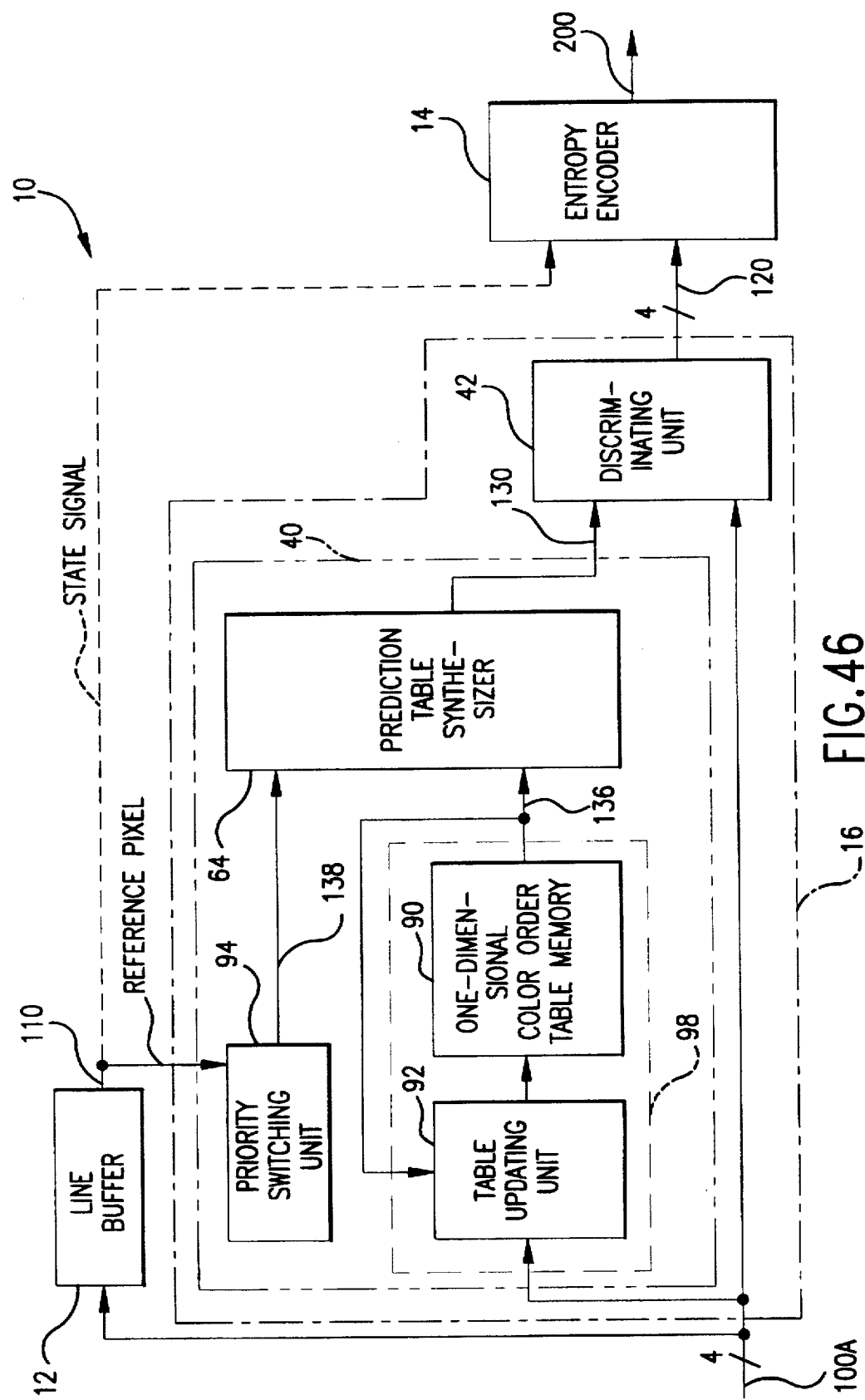

FIG. 46 is a diagram of the sixth embodiment of a data encoding system constructed in accordance with the present invention.

Figure 47:
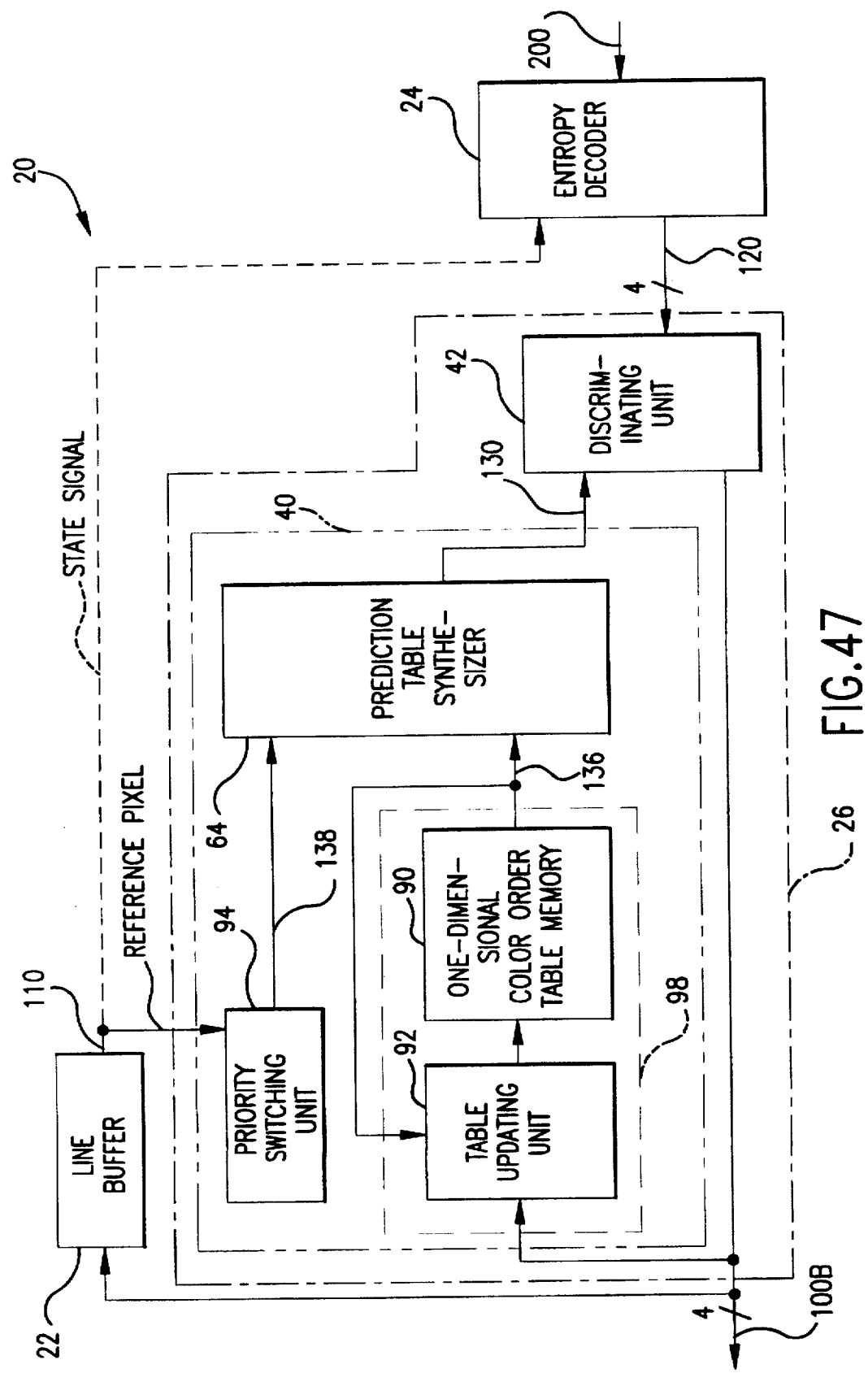

FIG. 47 a diagram of the sixth preferred embodiment of a data decoding system constructed in accordance with the present invention.

FIGS. 48A, 48B and 48C are diagrams illustrating the principle of generating a two-dimensional color order table which is used in the sixth embodiment of FIGS. 46 and 47.

Figure 49:
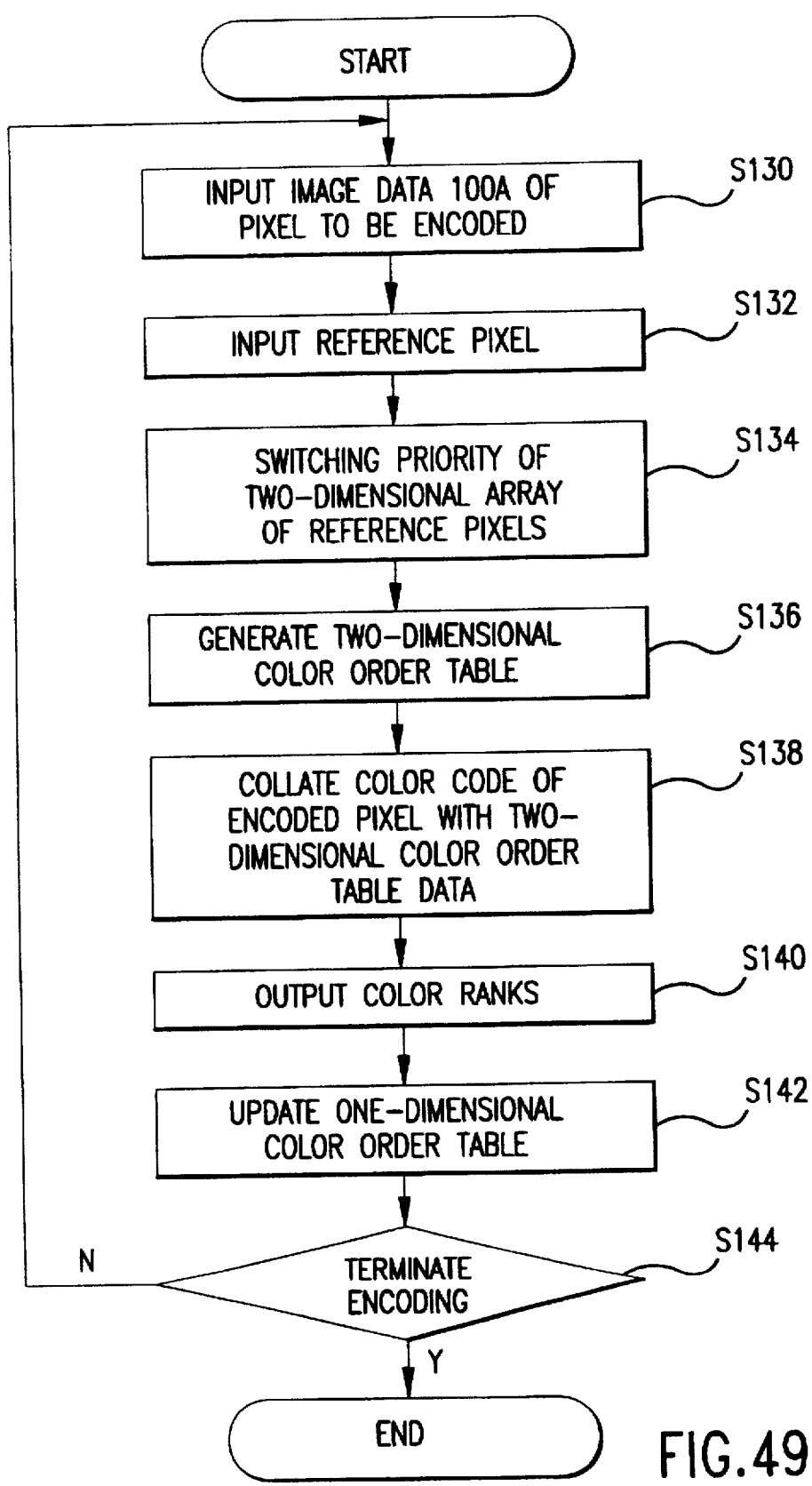

FIG. 49 is a flow chart illustrating the operation of the sixth embodiment.

Figures 50A, 50B:
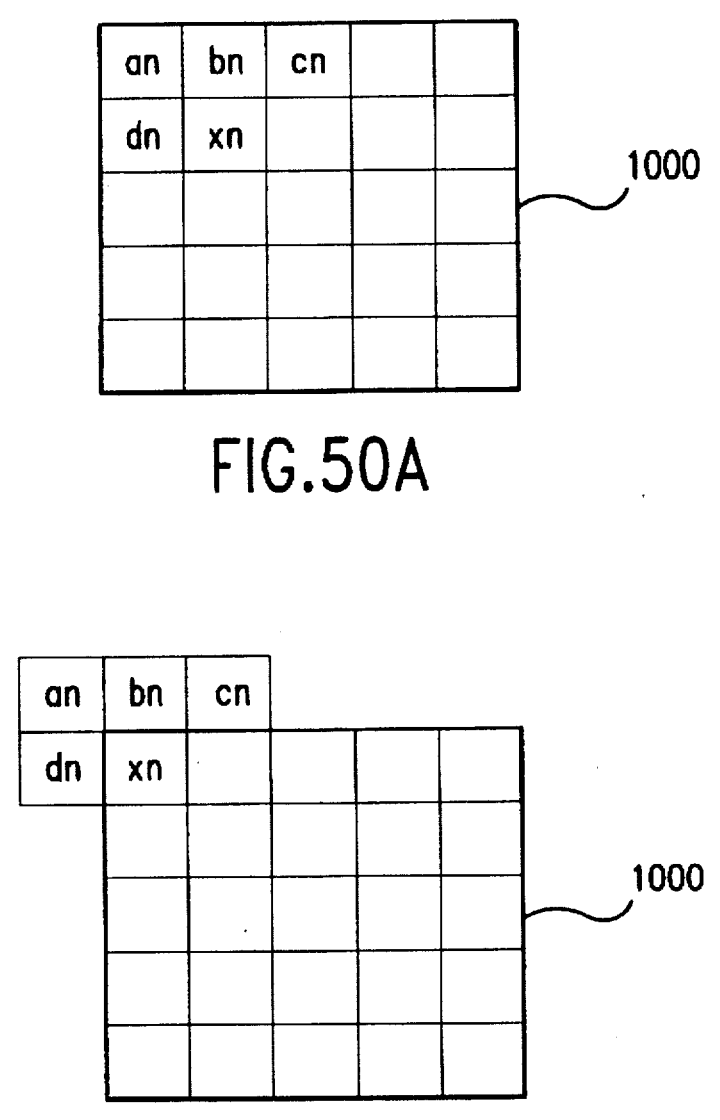

FIGS. 50A, and 50B are diagrams illustrating the relationship between a reference pixel and image data.

Figures 51, 52:
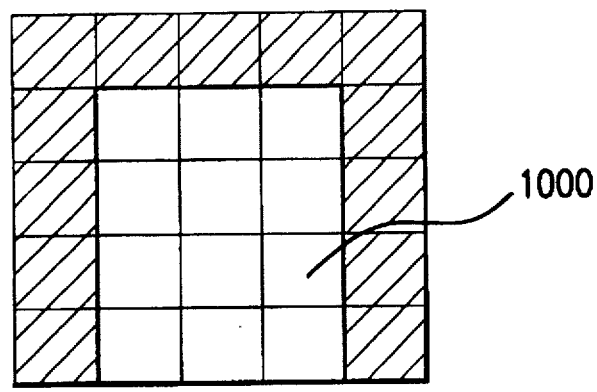

FIG. 51 is a diagram illustrating areas which can be occupied by a pixel to be encoded when part or all of the reference pixel are out of the image data.

FIG. 52 is a diagram illustrating the conventional out-of-frame value determining technique.

Figure 53:
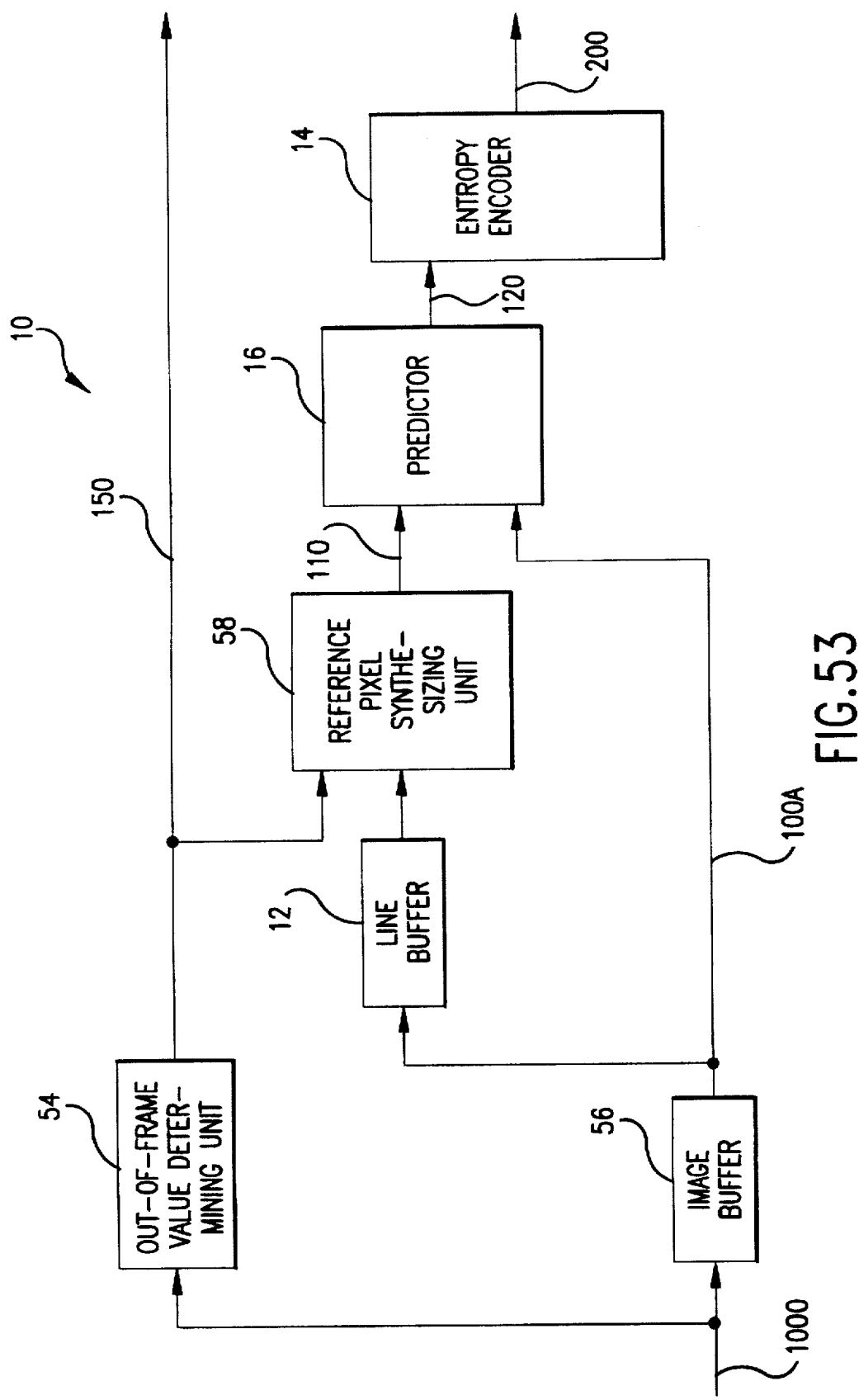

FIG. 53 is a block diagram of the seventh embodiment of a data encoding system constructed in accordance with the present invention.

Figure 54:
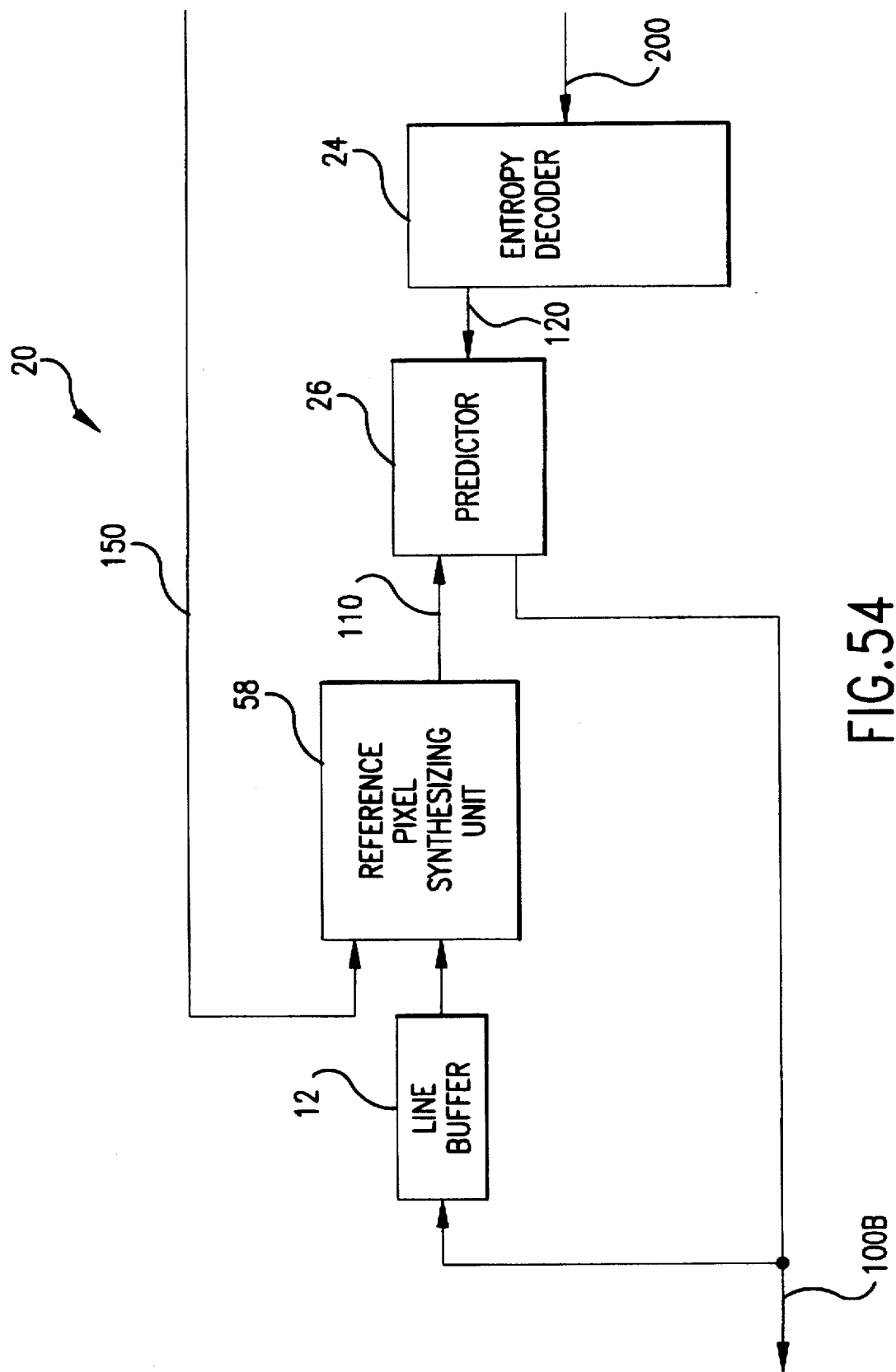

FIG. 54 is a block diagram of the seventh embodiment of a data decoding system constructed in accordance with the present invention.

16

Figure 55A:
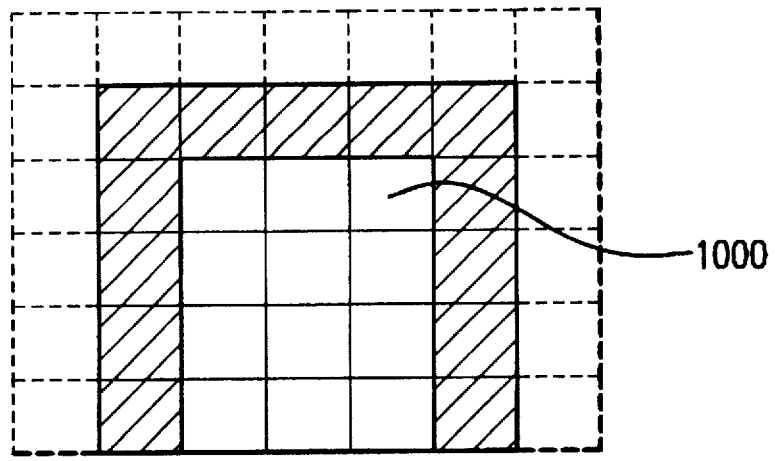
Figure 55B:
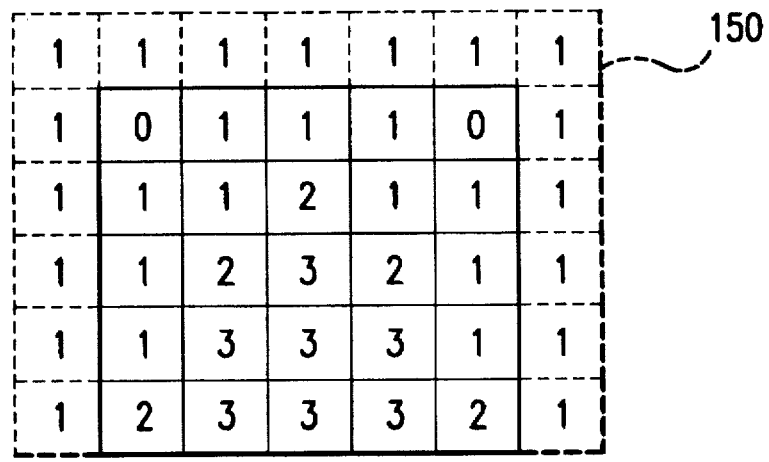

FIGS. 55A and 55B are diagrams illustrating an operation of determining an out-of-frame value by the use of the systems of the seventh embodiments.

FIGS. 56A and 56B are diagrams illustrating another operation of determining an out-of-frame value by the use of the systems of the seventh embodiment.

DETAILED DESCRIPTION OF THE PREFERRED EMBODIMENTS

The present invention will now be described in detail in connection with its preferred embodiments which are illustrated in the drawings. It is to be understood that parts similar to those of the prior art will be designated by similar reference numerals throughout the drawings.

First Embodiment

FIG. 3A shows a preferred embodiment of a data encoding system 10 constructed in accordance with the present invention while FIG. 3B shows a preferred embodiment of a data decoding system 20 which will be associated with the data encoding system 10 shown in FIG. 1A.

General Description of Data Encoding System 10

Referring to FIG. 3A, the data encoding system 10 comprises a line buffer 12, an entropy encoder 14 and a predictor 16. The data encoding system 10 is adapted to convert a data stream of color pixel data 100A into a data stream of encoded data 200.

The color pixel data 100A to be encoded is formed by four bits per pixel to provide 16 color codes. It is, however, of course that the present invention may be applied to encode n-bit color pixel data 100A.

The input color pixel data 100A is supplied to the line buffer and predictor 12, 16.

Figure 2:
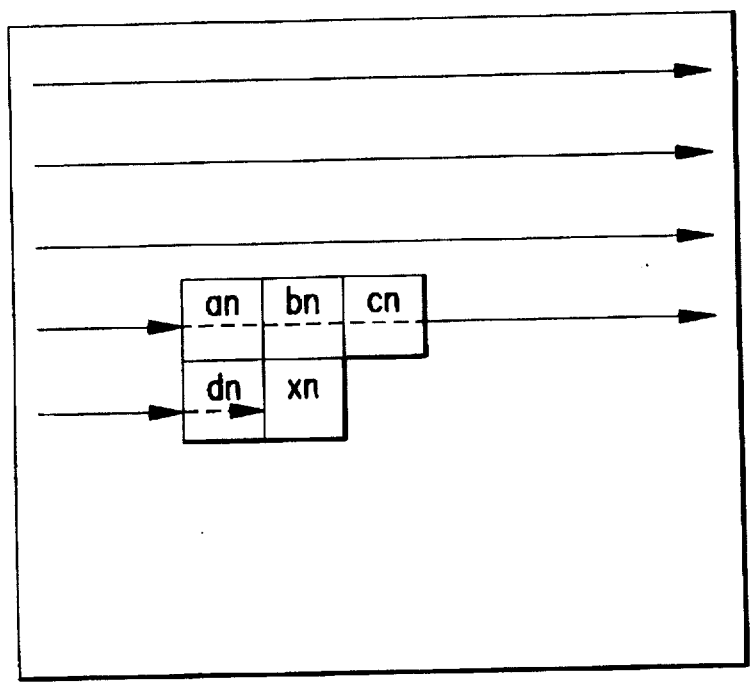
FIG. 2 is a diagram of reference pixel data for pixel data to be encoded.

The line buffer 12 functions as a reference pixel generating means. Each time color pixel data 100A to be encoded is input into the line buffer 12, the latter prepares such a Markovian model as shown in FIG. 2 from the previously input color pixel data and outputs the Markov model as reference pixel data 110. More particularly, as the color pixel data 100A of a pixel to be encoded $X_n$ is input into the line buffer 12, the latter outputs pixels $a_n$, $b_n$, $c_n$ and $d_n$ surrounding the pixel to be encoded $X_n$ toward the predictor 16 as reference pixel data 110.

The predictor 16 functions as a predicting means having a color order table in which the color ranks of color codes have been set for each pattern that can be taken by reference pixel data. The predictor 16 responds to the input color pixel data 100A and reference pixel data 110 to read the color ranking data 120 of the corresponding color code from the color order table and also to output it toward the entropy encoder 14.

The entropy encoder 14 encodes the input color ranking data 120 into encoded data 200 which is in turn output therefrom. The entropy encoder 14 may be either of arithmetic-type encoder or Huffman encoder.

General Description of Data Decoding System 20 Referring to FIG. 3B, the data decoding system 20 comprises a line buffer 22, a predictor 26 and an entropy decoder 24. The encoded data 200 from the data encoding system 10 is decoded into color pixel data 100B by the data decoding system 20 with an algorithm which is reverse to that of the data encoding system 10. Thus, the data stream of color pixel data 100A is completely the same as the data stream of color pixel data 100B.

The entropy decoder 24 receives and decodes the encoded data 200 into color ranking data 120 according to the reverse procedure as in the entropy encoder 14, the color ranking data 120 being then output toward the predictor 26.

The entropy decoder 24 must be formed to perform its operation with the reverse algorithm as in the entropy encoder 14. If the entropy encoder 14 is of arithmetic type, the entropy decoder 24 must also be of the same arithmetic type. If the entropy encoder 14 is of the Huffman type, the entropy decoder 24 must also be of the same Huffman type. Thus, the encoded data 200 will accurately be converted into the color ranking data 120 which forms a counterpart.

The line buffer 22 functions as a reference pixel generating means which is of the same structure as that of the line buffer 12. The line buffer 22 responds to the decoded color pixel data 100B from the predictor 26 to generate reference pixel data 110 for color pixel data 100B to be next decoded and outputs the generated reference pixel data 110 toward the predictor 26.

The predictor 26 functions as a predicting means which is basically of the same structure as that of the predictor 16. The predictor 26 includes the same color order table as in the predictor 16 and responds to the color ranking data 120 and reference pixel data 110 input thereinto to read the corresponding color code from the color order table and also to decode and output it as a color pixel data 100B.

Since the data decoding system 20 can perform its operation with the reverse algorithm as in the data encoding system 10, the data 200 encoded by the data encoding system 10 can be accurately decoded into the original color pixel data 100B and be output.

Particularly, the aforementioned data encoding and decoding systems 10, 20 include the predictors 16 and 26 which will be described in detail. These predictors 16 and 26 convert the input color pixel data 100A into the color ranking data 120 and the color ranking data 120 into the original color pixel data 100B. Therefore, the rate of data compression can be improved even if the number of states in each of the entropy encoder and decoder 14, 24 is only one, unlike the prior art.

More particularly, when the entropy encoding is to be performed through the arithmetic or Huffman encoding technique and if there is a great difference between the occurrence probability of code 0 or 1, the rate of data compression can be increased. This is because the entropy encoding technique allocates shorter encoding data to input data having its higher occurrence probability and longer encoding data to input data having its lower occurrence probability.

To give a large difference among code occurrence probabilities, the prior art classified and encoded input data into several states. If not classified, the input data cannot well be compressed. For example, the prior art of FIG. 1 uses the line-buffers 12 and 22 to prepare the reference pixel data which is in turn input into the entropy encoder and decoder 14, 24 as a classifying state signal. These entropy encoder and decoder 14, 24 use the state signal to classify the input data before it is encoded and decoded.

Figure 5:
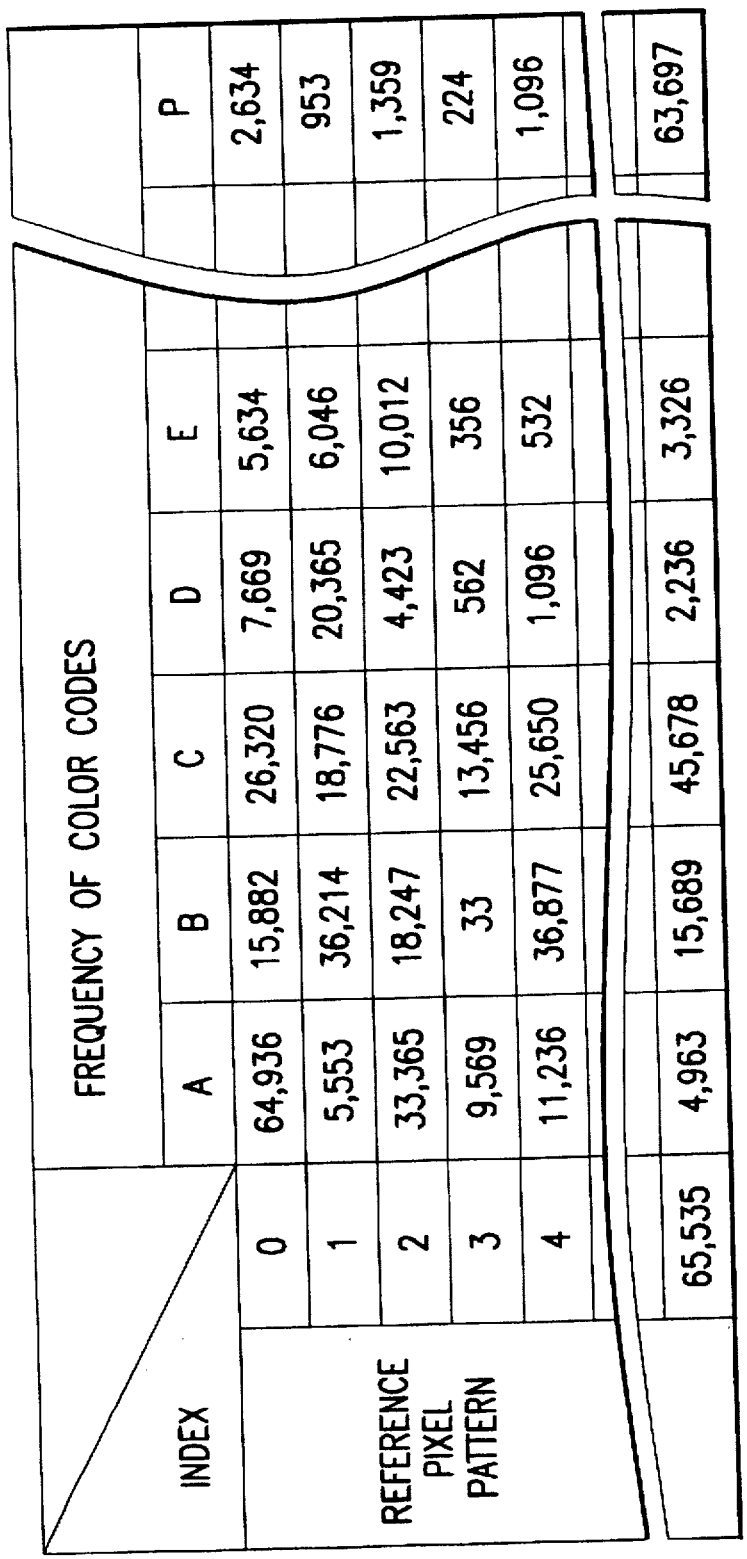
FIG. 5 is a table which is a base for a color order table.

On the other hand, the first embodiment of the present invention comprises the predictors 16 and 26 which are provided in the encoding and decoding systems 10, 20, respectively. For example, the predictor 16 may be used to convert the color pixel data 100A into the color ranking data 120 corresponding to its color code, which is in turn input into the entropy encoder 14. The entropy encoder then converts the input color ranking data 120 into the encoded data 200. The conversion of the color pixel data 100A into the color ranking data 120 means that the code occurrence probabilities can be differenciated through all the reference pixel patterns (the number of states), as shown in FIGS. 5 and 6. Even if the number of states in each of the entropy encoder and decoder 14, 24 is only one, the rate of data compression can sufficiently be increased.

In addition, the fact that the number of states in the entropy encoder and decoder 14, 24 is one means that only one state parameter table is required in the encoding and decoding. Therefore, also by reducing the state parameter table, a better rate of data compression can be provided. The state parameter table is normally stored in a memory. If this table can be reduced as in the first embodiment, the hardware of the data encoding and decoding systems 10, 20 can be reduced in size with reduction of the manufacturing cost.

The systems 10, 20 of the first embodiment can be taken such that the color image data can effectively be compressed and reproduced through a very small hardware. For example, the data encoding system 10 of the first embodiment may be formed as a software by the use of a computer or the like such that a great amount of color image data can slowly be compressed into a high dense form which is in turn written into a memory such as ROM card, RAM cassette, CDROM or the like. Such memories into which the color image data is written may be mass-produced and mounted in an image reproducing system which includes the data decoding system 20 of this embodiment. In such an image reproducing system, the data decoding system 20 of this embodiment may be formed as a hardware so that the encoded data 200 written in the memory with high density can be decoded at high speed and displayed on a display.

Particularly, the present invention can reduce the entropy decoder 24 of the data decoding system 20 in size and cost.

Thus, the image reproducing system may also be reduced in size and cost.

The respective structures of the data encoding and decoding systems 10, 20 will now be described in detail.

Line Buffers 12, 22

In the first embodiment of the present invention, the line buffers 12 and 22 are adapted to store data corresponding to n lines when an image is scanned. Although this embodiment is formed by buffers each adapted to store data corresponding to two lines, a buffer for storing data corresponding to three or more lines may be used. If the number of lines to be stored at a time is increased, the number of reference pixels can also be increased, that leads to rise of the rate of image data compression.

The generation of reference pixel in the line buffers 12 and 22 will now be described in detail. For simplicity, the encoding line buffer 12 is only described herein. It is, however, to be understood that the decoding line buffer 22 acts in the same manner.

The color pixel data 100A is input into the data encoding system 10 one line at a time according to the sequence of scan as from the top of the screen in synchronism with the horizontal scan of image data of one image, as shown in FIG. 2. The line buffer 12 stores the so input color pixel data 100A by n lines at a time to generate and output reference pixel data 110 for a pixel to be encoded $X_n$. At this time, the positional relationship between the pixel to be encoded $X_n$ and the reference pixels $a_n$–$d_n$ is as shown in FIG. 2.

Figure 4:
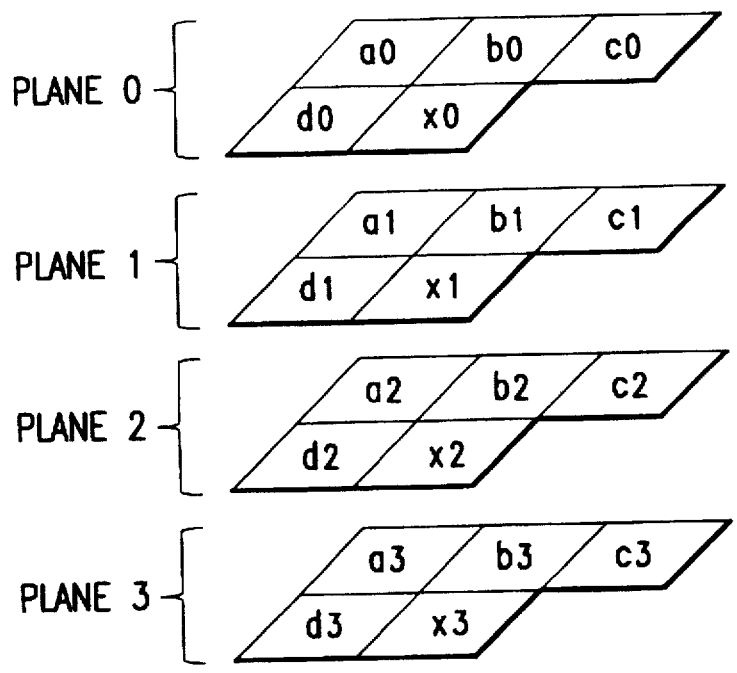
FIG. 4 is a diagram of pixel to be encoded and reference pixel data which are disassembled into plane units.

FIG. 4 shows the four-bit pixel data of FIG. 2 which is disassembled into bit plane units.

It is now assumed that $a_n$ comprises bit data $a_0$–$a_3$; $b_n$ comprises bit data $b_0$–$b_3$; $c_n$ comprises bit data $c_0$–$c_3$; $d_n$ comprises bit data $d_0$–$d_3$; and $x_n$ comprises bit data $x_0$–$x_3$. The bit data $a_n$ is in a leftward and upward position spaced away from the bit data $x_n$ by one pixel; the bit data $b_n$ is in an upward position spaced away from the bit data $x_n$ by one pixel; the bit data $c_n$ is in a rightward and upward position spaced away from the bit data $x_n$ by one pixel; and the bit data $d_n$ is in a leftward position spaced away from the bit data $x_n$ by one pixel.

When the image data is divided into four bit planes, the bit data $a_0$, $b_0$, $c_0$, $d_0$ and $x_0$ are on the plane 0; the bit data $a_1$, $b_1$, $c_1$, $d_1$ and $x_1$ are on the plane 1; the bit data $a_2$, $b_2$, $c_2$, $d_2$ and $x_2$ are on the plane 2; and the bit data $a_3$, $b_3$, $c_3$, $d_3$ and $x_3$ are on the plane 3.

Each of the line buffers 12 and 22 is adapted to output the encoded or decoded data $a_n$, $b_n$, $c_n$ and $d_n$ as the reference pixel data 110 to encode or decode the bit data $X_n$.

Although the first embodiment has been described as to the output of four pixels $a_n$, $b_n$, $c_n$ and $d_n$ as the reference pixel data for the object pixel $x_n$, the present invention may be applied to any other form or choice of various different reference pixels, if necessary.

If the object pixel $x_n$ is located in the scene of FIG. 2 at one edge, part of its reference pixel data 110 is out of the screen frame and missed. In such a case, the frame processing technique is used for previously writing the out-of-frame value located out of the screen frame into the line buffers 12 and 22 as an initial value. The initial value is normally set at zero, but may be set at any value other than zero to improve the rate of compression.

Predictors 16, 26

The predictors 16 and 26 will now be described in detail.

As described, each of the predictors 16 and 26 includes a color order table. In the first embodiment, such color order tables are prepared prior to data encoding and decoding.

First of all, the procedure of preparing the color order table will be described. In the color order table of this embodiment, an image data to be encoded is pre-scanned to obtain statistic data. At this time, there may be one or more images to be pre-scanned. Alternatively, all the image to be encoded may be pre-scanned or its part may be pre-scanned as a substitute for the data of all the scene.

The statistic data thus obtained is classified into indexes for patterns which can be taken by the reference pixels. The frequency of a color code for each index is checked to prepare a table.

FIG. 5 shows a table which is obtained in such a manner. The table has a vertical axis representing patterns which can be taken by the reference pixels for each index and a horizontal axis representing the frequency of color codes A–P. As described, the reference pixel data 110 of this embodiment is formed by four pixels as shown in FIG. 2, each of which pixels is formed by four bits. Since the reference pixel data 110 is thus formed by 16 bits, the number of patterns which can be taken by the reference pixel data 110 is equal to $2^{16}$. Therefore, the number of reference pixel patterns represented on the vertical axis as indexes will be from zero to 65535 or equal to 65536.

Since the color codes take sixteen different values, the table shown in FIG. 5 will be a frequency table having dimensions as large as 65536×16.

The table of FIG. 5 thus obtained will be studied below. For example, the data at the index "0" is aimed. It is understood herein that the frequency of the color code A is extremely higher than those of the other color codes. When the data at the index "1" is aimed, it is understood that the frequency of the color code B is extremely higher than those of the other color orders. If the color pixel data 100 is converted into the color ranking data 120 according to the frequency of that color code from the table of FIG. 5, the code probabilities can be differentiated. If the color ranking data 120 thus obtained is converted into the encoded data 200 by the encoder 14, the rate of data compression can greatly be increased.

FIG. 6 shows a table which provides color ranks by re-arranging the data of the primary table shown in FIG. 5 in the sequence of color code frequencies for each index. Such a table is a color order table.

In other words, the frequencies of 16 color codes A–P are set as color ranking data. With the index 0, for example, the ranking of color codes is as shown by A, C, B, D, E . . . .

Such a color order table has previously been prepared prior to the encoding and decoding steps. As will be described, part of the color order table may sequentially be updated during the encoding or decoding step, if necessary.

The table may be prepared as a software without any specific hardware.

Each of the predictors 16 and 26 has its memory in which the color order table prepared as described has been stored.

The predictor 16 of the data encoding system 10 reads the table data from the color order table shown in FIG. 6 by the use of an input reference pixel data 110 as an index, judges at the color ranking of the color code corresponding to input color pixel data 100A in the read table data, and outputs its color ranking data 120. It is, for example, assumed that when the reference pixel data 110 represents the index 0, the color code A is input as the color pixel data 100A. In such a case, the color order "1" will be read out from the table of FIG. 6 as the color ranking data 120 and output toward the entropy encoder 14.

If it is also assumed that with the index 4, the color code C is input as the color pixel data 100A, the color order "2" will be read out and output from the color order table as the color ranking data 120.

The predictor 26 of the data decoding system 20 is similarly adapted to use the reference pixel data 110 as an index and to output the color code corresponding to input color ranking data 120 as the color pixel data 100B. For example, if the color order "1" is input as the color ranking data 120 when the index specified by the reference pixel data 110 is 0, the corresponding color code A will be output as the decoded color pixel data 100B. Similarly, if with the index 4, "2" is input as the color ranking data 120, the corresponding color code C will be output as the color pixel data 100A.

Thus, the predictors 16 and 26 of this embodiment can be formed by memories which store the color order table with some logics.

FIGS. 7A and 7B show the details of the predictors 16 and 26.

Each of the predictors 16 and 26 comprises a color order generating unit 40 and a discriminating unit 42.

The color order generating unit 40 includes a memory for storing the color order table shown in FIG. 6. As the reference pixel data 110 is input into the color order generating unit 40, the latter outputs color order table data 130 using such input reference pixel data 110 as an index toward the discriminating unit 42. For example, when the reference pixel data 110 represents the index 0, the color order generating unit 40 outputs the color order table data 130 representing the color ranks of the color codes A–P for the index 0 toward the discriminating unit 42.

The discriminating unit 42 of the predictor 16 (the discriminating unit 42 of the system 10) responds to the color order table data 130 thus input thereinto to judge the color ranks of the input color pixel data 100A corresponding to the color code. This is then output as the color ranking data 120. For example, if the table data of the index 0 is input and when the color code of the input color pixel data 100A is C, the color order generating unit 40 judges that the color rank is "2", the result being then output as the color ranking data 120.

The discriminating unit 42 of the predictor 26 (the discriminating unit 42 of the system 20) responds to the input color order table data 130 to judge the color code corresponding to the input color ranking data 120, the result being then output as the color pixel data 100B. For example, if the color order table data 130 of the index 0 is being input and when "2" is input as the color ranking data 120, the corresponding color code C is output as the decoded color pixel data 100B.

Figure 8A:
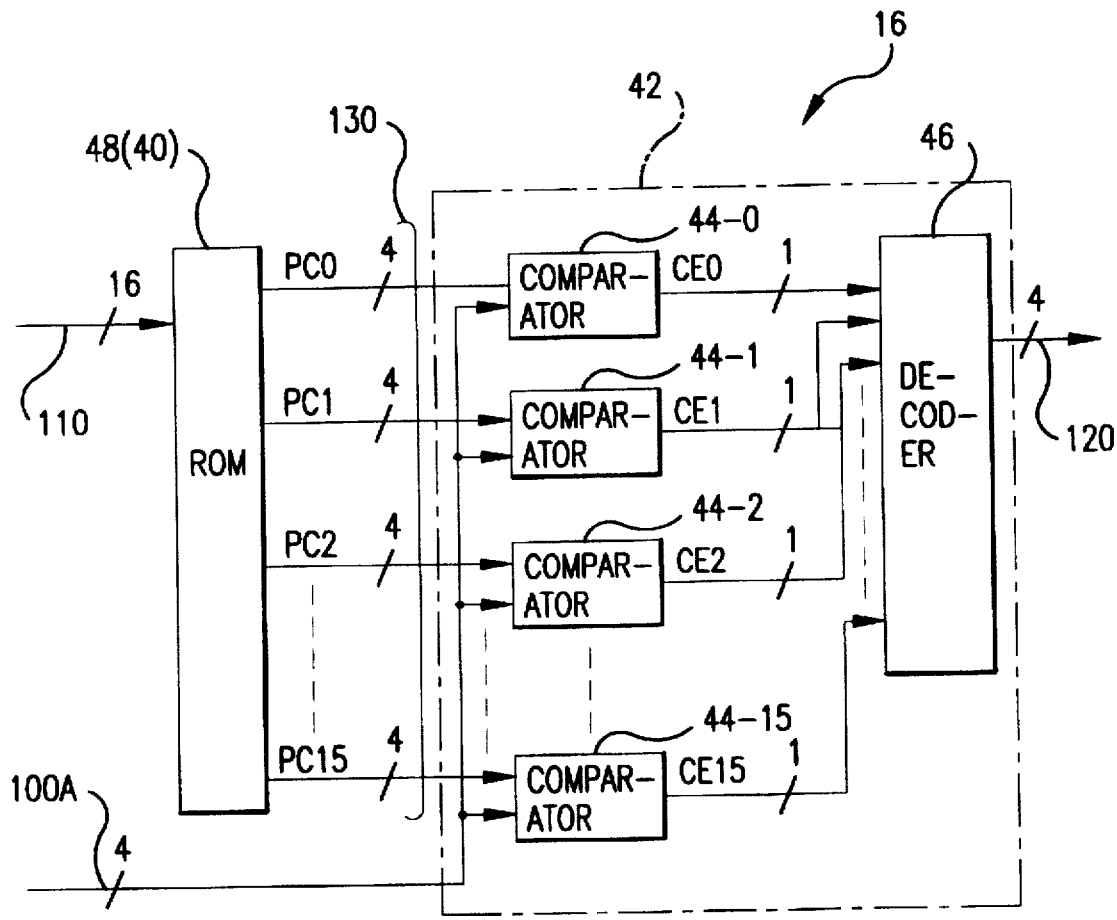
FIGS. 8A and 8B are diagrams illustrating the details of the predictor shown in FIG. 7.
Figure 8B:
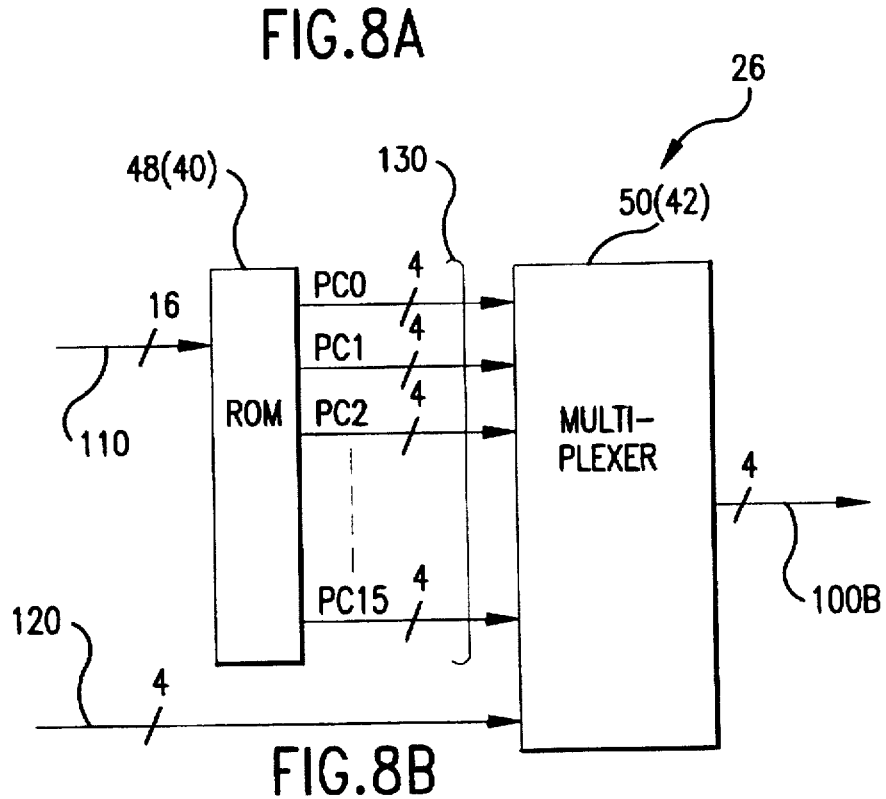

FIGS. 8A and 8B show the details of the predictors 16 and 26. The color order generating unit 40 is formed by a ROM 48 in the color order table shown in FIG. 6 has been stored. The ROM 48 has 16 output channels PC0, PC1, . . . and PC15. Color orders are sequentially assigned to the 16 output channels. When the reference pixel data 110 is input into the color order generating unit 40 as read-out address, it is used as an index to output the corresponding color order table data 130 from the respective channel. For example, if the index 0 is input into the color order generating unit 40 as read-out address, four-bit data representing A, C, B, D . . . are output from the respective channels PC0, PC1, PC2, . . . and PC15. More particularly, the color code A output from the channel PC0 represents that the color order is first. Similarly, the color code C output from the channel PC1 represents that the color order is second.

The discriminating unit 42 of the predictor 16 comprises 16 comparators 44-0, 44-1, . . . and 44-15 and a decoder 46. Each of the comparators 44-0, 44-1, . . . and 44-15 receives the output data of the corresponding channel PC0, PC1, . . . or PC15 in the ROM 48 and color pixel data 100A to be encoded. Each of the comparators 44-0, 44-1, . . . and 44-15 outputs, toward the decoder 46, H-level signal when both the input data are coincide with each other and L-level signal when both the input data are not coincide with each other. The decoder 46 judges from which comparator 44 the H-level signal is input thereinto and, on the judgment, converts the color pixel data 100A into the color ranking data 120. For example, if the H-level signal is output from the comparator 44-2, the decoder 46 converts the output color pixel data 100A into the color ranking data 120 of "3".

The discriminating unit 42 of the predictor 26 also comprises a multiplexer 50. According to the color ranking data 120, the multiplexer 50 selects a predetermined color code from the color code data output from the respective channels PC0, PC1, . . . PC15 as the table data 130, the selected color code being then output as the decoded color pixel data 100B. If "2" is input as the color ranking data 120, the multiplexer 50 outputs the color code output from the channel PC1 corresponding to the second color ranking as the color pixel data 100B.

Figure 9:
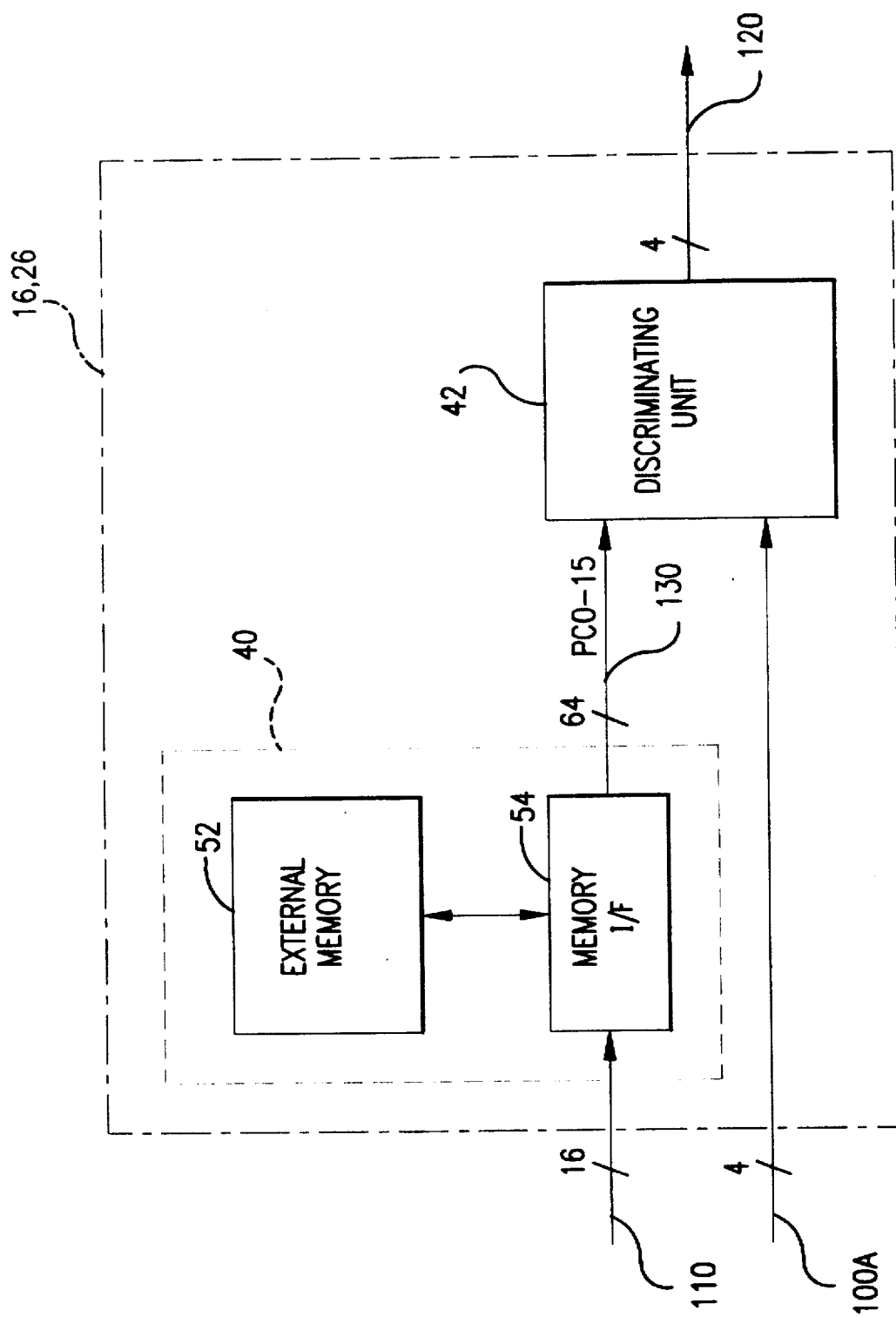
FIG. 9 is a diagram of another predictor used in the first embodiment.

FIG. 9 shows a modification of the predictor 16 or 26. Such a modification is characterized by that the color order generating unit 40 comprises an external memory 52 and a memory interface 64. The external memory 52 has stored the aforementioned color order table. The memory interface 64 uses input reference pixel data 110 as an index to read the table data corresponding to said index from the external memory 52, the read table data being then output toward the discriminating unit 42.

By storing the color order table in the external memory 52, the encoding efficiency can more be improved since the optimum table can be used depending on the image without increase of the internal memory. This modification can reduce the circuit scale in the predictor body into a level smaller than those of the predictors 16 and 26 shown in FIG. 8.

Entropy Encoder and Decoder 14, 24

The structures of the entropy encoder and decoder 14, 24 used in the systems 10 and 20 will be described below Each of the entropy encoder and decoder 14, 24 according to this embodiment includes a conversion table used to convert the occurrence probability of color ranking data 120 into the corresponding encoding word. The conversion table is used to convert a larger occurrence probability of input color ranking data into shorter encoded data and a smaller occurrence probability of input color ranking data into a longer encoded data. Thus, the average amount of information representing one encoding word, that is, entropy can be reduced to provide an increased rate of data compression.

Figure 10:
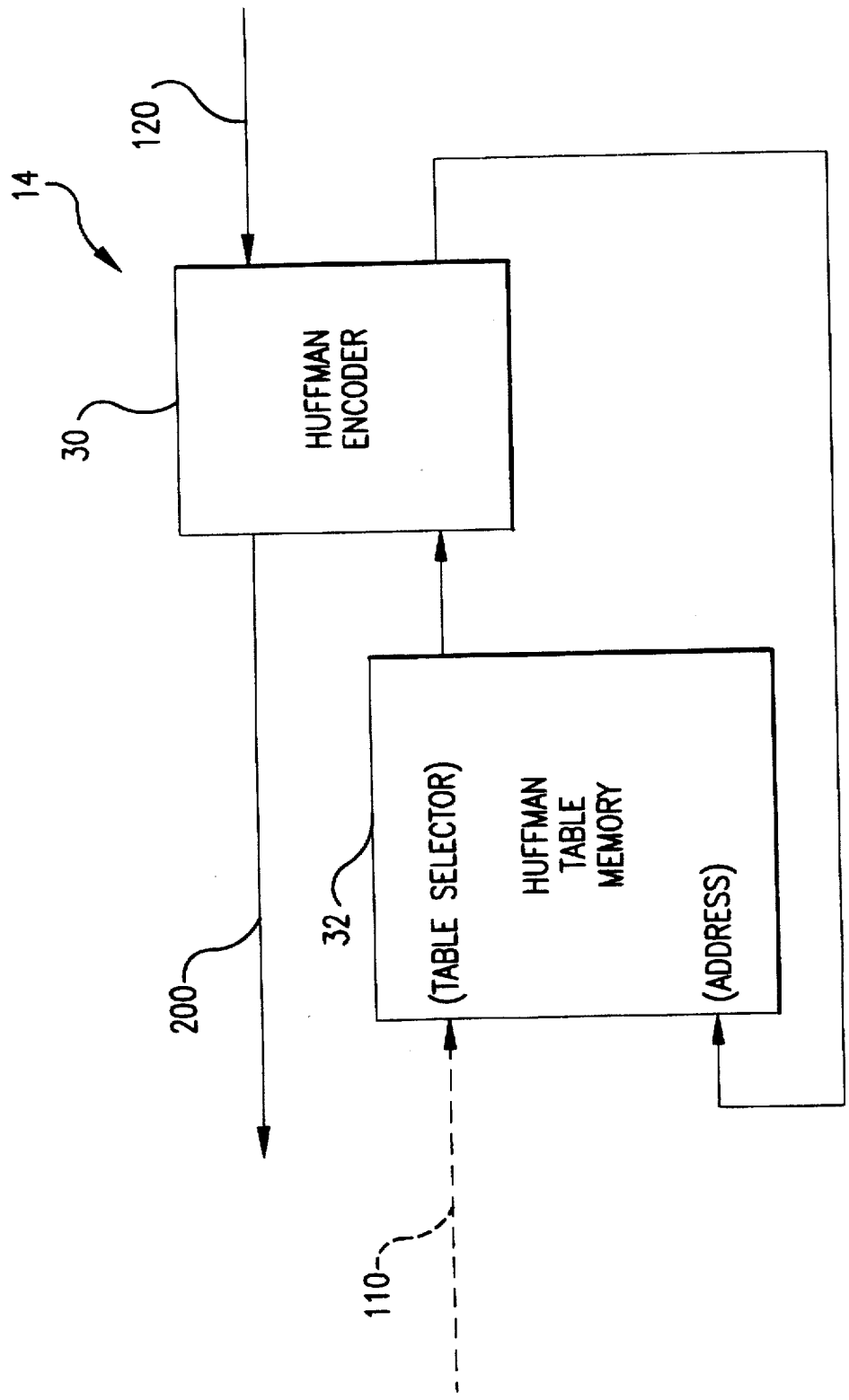
FIG. 10 is a diagram of an entropy encoder used in the first embodiment.
Figure 11:
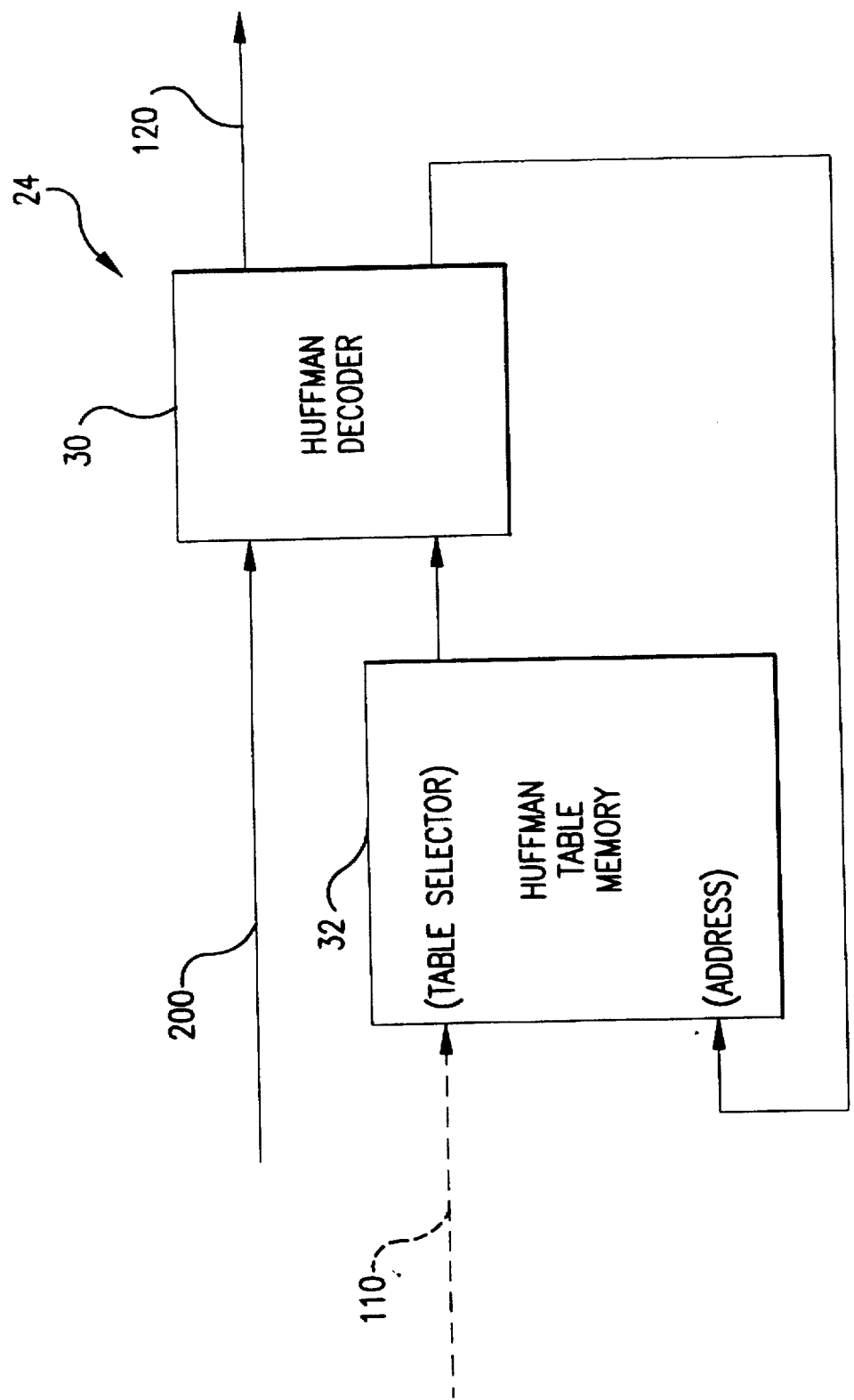
FIG. 11 is a diagram of an entropy decoder used in the first embodiment.

Each of the entropy encoder and decoder 14, 24 of this embodiment is formed by Huffman type encoder or decoder, as shown in FIG. 10 or 11.

The Huffman type entropy encoder 14 shown in FIG. 10 comprises a Huffman type encoder 30 and a Huffman table memory 32. The Huffman table memory 32 is adapted to store Huffman tables optimized depending on the code occurrence probability by the number of states which are input into the table selector terminal thereof. Since no state signal is input into the table selector in this embodiment, the number of states is set one. Thus, the table 32 may only store one optimized Huffman table for the entire data to be encoded. This results in great reduction of the memory capacity and then reduces the manufacturing cost.

FIG. 12 shows a plurality of Huffman tables 1100-1, 1100-2, . . . and so on which are stored in the Huffman table memory 32. Since no state signal is input into the table selector, the number of states is one. Therefore, one Huffman table, for example, 1100-1 may be stored in the Huffman table memory 32. This greatly reduces the amount of data.

According to the input color ranking data 120, the Huffman encoder 30 outputs an data read-out address toward the Huffman table memory 32 and receives the corresponding encoding word. The input encoding word is subjected to a given Processing operation and then converted into the encoded data 200 which is in turn output therefrom.

In such a manner, the Huffman type entropy encoder 14 of this embodiment will use a Huffman table represented by one state parameter to convert the input color ranking data 120 into the corresponding encoded data 200 which is in turn output therefrom.

The Huffman type entropy decoder 24 shown in FIG. 11 comprises a Huffman decoder 30 and a Huffman table memory 32. These Huffman decoder and table memory 30, 32 are basically the same structures as those of the Huffman encoder and table memory 30, 32 of the system 10 shown in FIG. 10. The input encoded data 200 is converted into the color ranking data 120 with the reverse algorithm to that of the entropy encoder 14.

More particularly, the Huffman decoder 30 responds to the input encoded data 200 to output a predetermined read-out address toward the Huffman table memory 32 and to receive an encoding word. The input encoding word is subjected to a given processing operation to convert it into the color ranking data 120.

It is of course that the entropy decoder 24 also has one state parameter since no state signal (reference pixel data) is used in the encoding step. As described, therefore, the Huffman table memory 32 may only store one table. This results in reduction of the memory capacity and then reduction of the manufacturing cost.

Although the entropy encoder and decoder 14, 24 have been described as to the Huffman type, they may be of any other type such as arithmetic encoding or decoding type.

The general technique of arithmetic encoding and decoding is described, in detail, in ONE IMAGE ENCODING STANDARD JBIG (international Standard ISO/IEC11544), p26–44 and p44–50. Therefore, it will simply be described herein.

Figure 13:
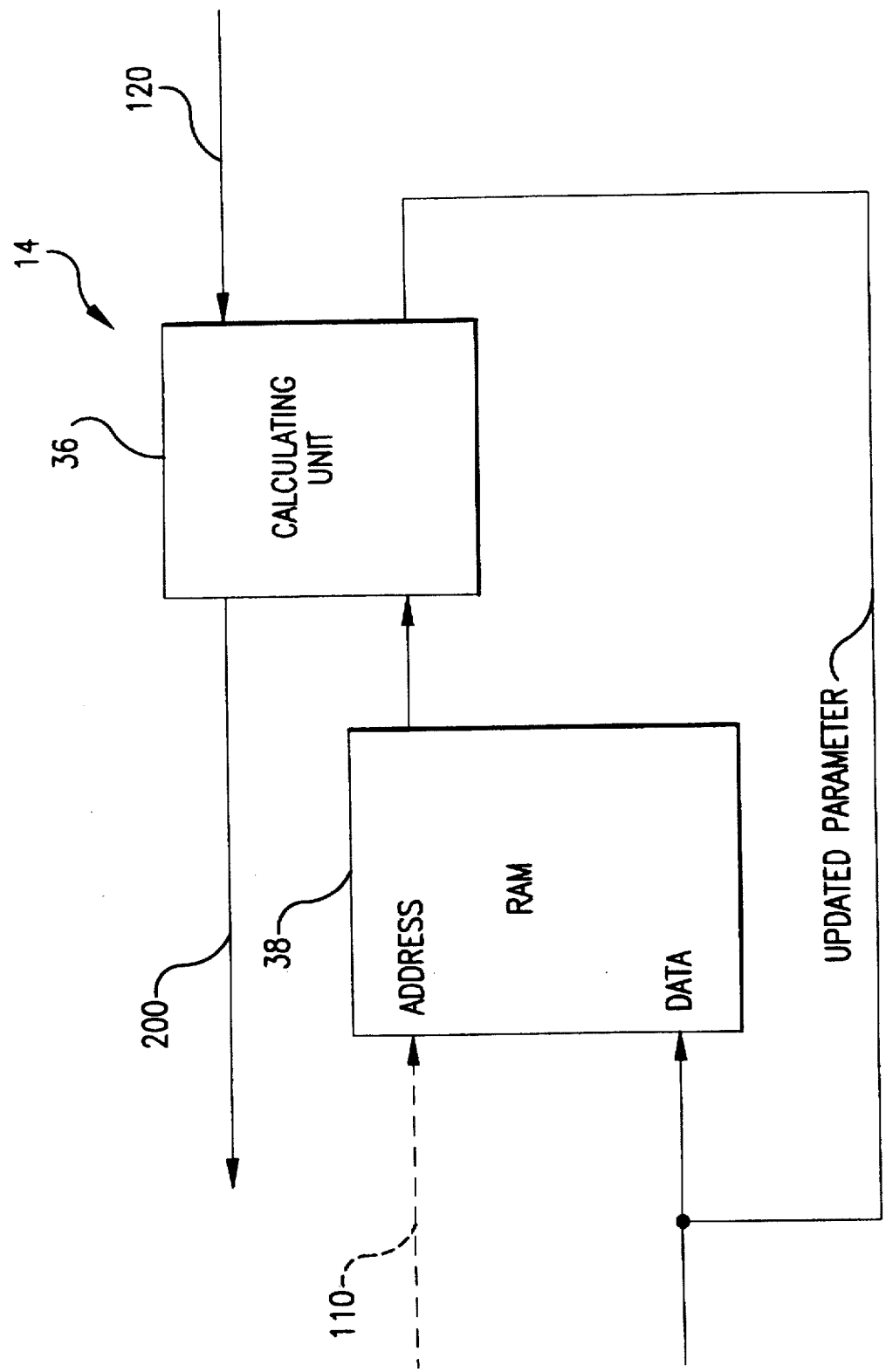
FIG. 13 is a diagram of an arithmetic encoder and decoder which are used in the first embodiment.

FIG. 13 shows an arithmetic encoding type entropy encoder 14. An arithmetic decoding type entropy encoder 24 will not be described herein since its structure is substantially the same as that of the encoder 14.

The entropy encoder 14 comprises an arithmetic processor unit 36 and a RAM 38 which functions as a state memory. The RAM 38 has been written by a state parameter table which is required to determine the code occurrence probability required by the encoding step. The state parameter is specified by an input state signal. According to the state parameter table specified by the state signal, the arithmetic processor unit 36 outputs a data obtained when the operational parameter is updated, as a read-out address. The specified RAM data is then output toward the arithmetic processor unit 36. The arithmetic processor 36 responds to the input data to convert the input color ranking data 120 into the encoded data 200.

Second Embodiment

FIG. 14A shows the second preferred embodiment of a data encoding system 10 constructed in accordance with the present invention while FIG. 14B shows a data decoding system 20 associated with the system 10 shown in FIG. 14A. Parts corresponding to those of the first embodiment are designated by similar reference numerals and will not further be described.

The systems 10 and 20 the second embodiment are characterized in that the entropy encoder 14 receives the reference pixel data 110 from the line buffer 12 as a state signal while the entropy decoder 24 receives the reference pixel data 110 from the line buffer 22 as a state signal.

Since the reference pixel data 110 is formed by 16-bit data, the number of states is equal to $2^{16}$=65536. Therefore, both entropy encoder and decoder 14, 24 will use 65536 different state parameter tables.

If the entropy encoder 14 is of a Huffman type as shown in FIG. 10, the Huffman table memory 32 will receive the reference pixel data 110 as a state signal. As shown in FIG. 12, the Huffman table memory 32 stores 65536 Huffman tables 1100-1, 1100-2, . . . which are selected by using the reference pixel data 110 as a selection signal. When a Huffman table is selected from the Huffman table memory by the reference pixel data 110, a predetermined encoding word will be read out from the Huffman table according to an read-out address which is output from the Huffman encoder 30.

If the entropy decoder 24 is of such a Huffman type as shown in FIG. 11, the Huffman table memory 32 stores 65536 different Huffman tables shown in FIG. 12 and receives the reference pixel data 110 as a state signal.

Thus, unlike the first embodiment it is possible to provide a larger difference among the code reference probabilities by increasing the number of states in the entropy encoder and decoder 14, 24 through the reference pixel data 110. The data encoding and decoding systems 10, 20 of the second embodiment can further improve the rate of data compression.

Third Embodiment

FIG. 15A shows the third preferred embodiment of a data encoding system 10 constructed in accordance with the present invention while FIG. 15B shows a data decoding system 20 associated with the system 10 shown in FIG. 15A. Parts corresponding to those of the second embodiment are designated by similar reference numerals and will not further be described.

The system 10, 20 of the third embodiment are characterized in that they include state degenerators 18 and 28 for degenerating the reference pixel data 110 output from the line buffers 12 and 22, respectively.

Each of the state degenerators 18 and 28 is adapted to degenerate the input reference pixel data 110 into a state signal 140 having less bits and to output the signal 140 therefrom toward the entropy encoder or decoder 14, 24.

In this embodiment, similarly, the reference pixel data 110 is formed by 16 bits, with the number of states being equal to $2^{16}$=65536. Since the state signal S is used as a state signal for the entropy encoder 14 in the second embodiment, the state parameter table (e.g., Huffman table) has become extremely large.

To overcome such a problem, the third embodiment uses the state degenerators 18 and 28 to degenerate the reference pixel data 110 into one-bit state signal 140 and outputs the signal 120 toward the entropy encoder or decoder 14, 24.

In such an arrangement, each of the entropy encoder and decoder 14, 24 may include a Huffman or other table corresponding to two different state signals 140. Thus, the amount of data in the entropy encoder and decoder 14, 24 can be reduced resulting in reduction of the size and cost, unlike the second embodiment. Furthermore, the rate of data compression can be improved more greatly than the first embodiment.

FIG. 16 shows a state degeneracy table which is set in each of the state degenerators 18 and 28. Degeneration is to classify the original state into the number of post-degeneration states. Through such a classification a combination of states is selected so that the entropy after classification (i.e., average amount of information representing one code) becomes minimum. An identification bit is then added to the number of post-degeneration states, that is, the number of post-classification states. This is a state signal 140.

In the degeneracy table shown in FIG. 16, 65535 different reference pixel patterns are classified into two different states of 0 and 2. Namely, the 65535 different reference pixel patterns are classified into either of the reference pixel patterns 0 or 2.

The classified reference pixel pattern number is written into the data of reference pixel patterns other than 0 and 2 is at their bit items. For example, the reference pixel patterns 1 and 3 have their bit items into which the classified reference pixel pattern number "0" is written. Thus, the reference pixel patterns 1 and 3 will be classified into the reference pixel pattern 0. Similarly, the reference pixel pattern 65535 will have its bit item into which the classified reference pixel pattern number "2" is written.

One-bit state signal 140 is applied to the reference pixel patterns 0 and 2. As the reference pixel pattern 110 classified into the reference pixel pattern 0 is input, the corresponding state signal $S_x$=0 will be output. If the reference pixel pattern S classified into the reference pixel pattern 2 is input, the corresponding state signal $S_x$=1 will be output.

In such a manner, the state degenerators 18 and 28 to degenerate the input reference pixel data 110 into a one-bit state signal $S_x$ which is in turn output toward the entropy encoder 14.

The preparation of the degeneracy table shown in FIG. 16 will be described simply.

First of all, the primary table shown in FIG. 18 is prepared by statistically measuring the occurrence probability of 16 different color codes A–P for each index with the respective reference pixel pattern as an index. Although the details of the numeral values are variable, the preparation of the table is similar to that of the table shown in FIG. 5, but will not further be described. The horizontal axis of each index includes the items of total appearance frequency, entropy and bit. The total appearance frequency shows the total number of occurrences of 16 color codes (frequency of A–P). The item of entropy shows a data representing how much of information or bits per code in average is required to represent each of the color codes A–P. The item of bit shows the theoretical limit of compressible bits.

Figure 17:
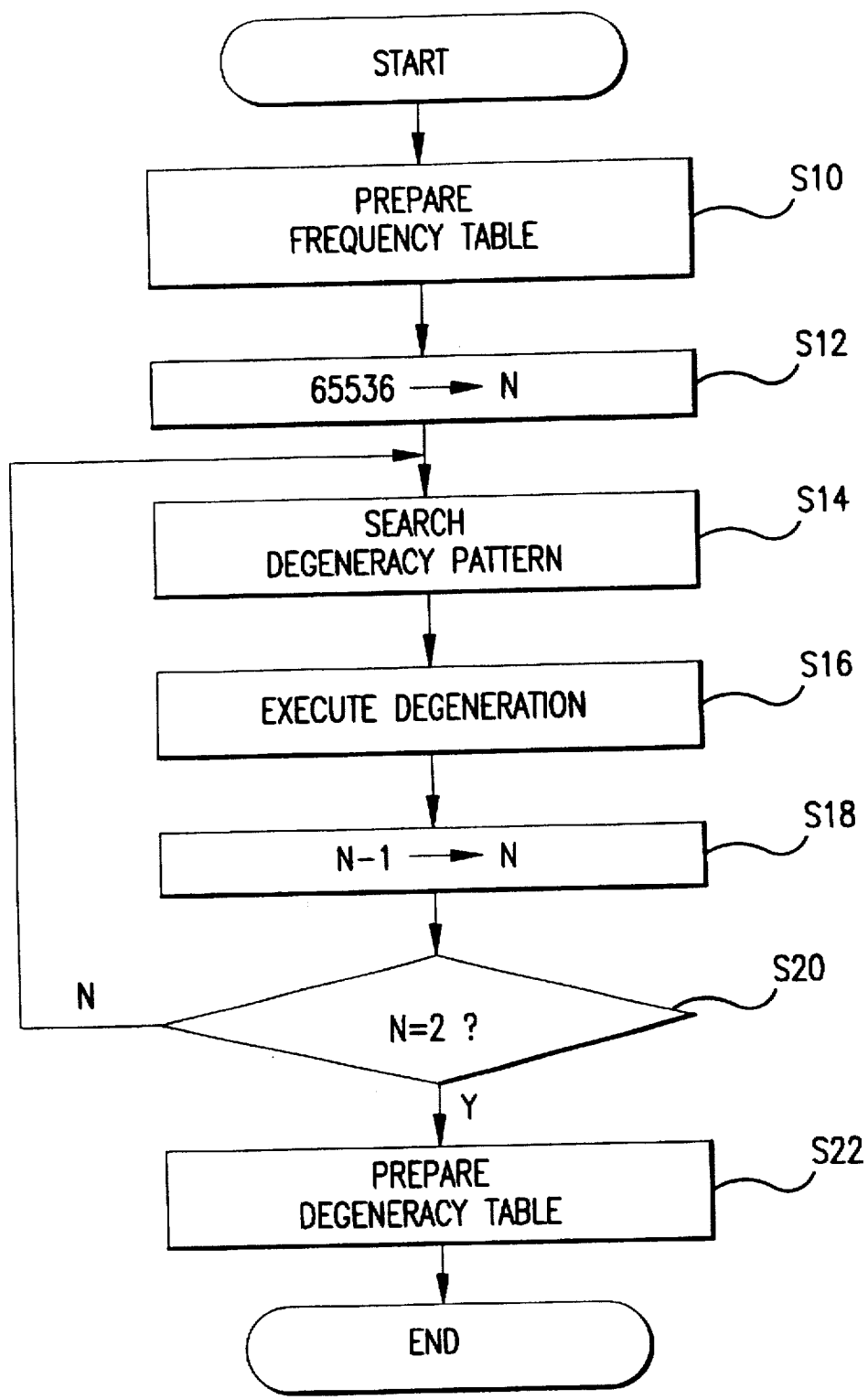
FIG. 17 is a flow chart illustrating a process of generating the degeneracy table shown in FIG. 16.

FIG. 17 is a flow chart representing a series of steps for preparing the degeneracy table shown in FIG. 16 from the table shown in FIG. 18.

At step S10, first, the frequency table or preliminary table shown in FIG. 18 is prepared.

At step S12, N is then set 65535.

At step S14, a combination of reference pixel patterns providing the minimum entropy, that is, a degeneracy pattern is searched. For example, if a combination of reference pixel patterns 0 and 1 is searched as one providing the minimum entropy as shown in FIG. 19A, these two reference pixel patterns are degenerated into one reference pixel pattern at step S16, as shown in FIG. 16B. In other words, if the combination of reference pixel patterns 0 and 1 is searched as one providing the minimum entropy, two reference pixel patterns shown in FIG. 16A will be degenerated into one reference pixel pattern 0 as shown in FIG. 16B.

After the degeneration has been carried out, N is decremented by one at step S18. Thus, N will represent the number of indexes remaining in the table of FIG. 18 without being classified (i.e., the number of reference pixel patterns).

Such a series of steps S14–S18 are repeated until N becomes equal to 2. If it is detected at step S20 that N becomes equal to 2, the frequency table shown in FIG. 18 will be degenerated into two different numbers of states. At the next step S22, therefore, the degeneracy table shown in FIG. 16 which is degenerated into these two different numbers of states is prepared.

In such a manner, the degeneracy table of FIG. 16 which includes a combination of reference pixel patterns providing the best rate of compression and has the number of states equal to 2 is prepared from the frequency table shown in FIG. 18. Such a degeneracy table can be used to degenerate the reference pixel data 110 into the state signal $S_x$ which is in turn provided to the entropy encoder 14, so that the number of states in the entropy encoder 14 will greatly be reduced to reduce in size and cost and also to realize a higher rate of data compression. The number of states N after degeneration may be set at any value other than 2, if necessary.

Particularly, the degeneracy table shown in FIG. 16 is formed to degenerate the data of the primary table shown in FIG. 18 for each index so that its entropy is made minimum. Therefore, the degeneracy table can be used to increase differences among the color code occurrence probabilities; Although the rate of data compression is somewhat lowered in the third embodiment, the rate of data compression can be increased more than the second embodiment.

The degeneracy table used in the state degenerators 18 and 28 is not limited to the type of FIG. 16, but may take any other form, if necessary.

For example, a degeneracy table specifying the relationship between the combined pattern of color codes for the reference pixel data 110 and the degenerated data may be set and used to convert the combined pattern of color codes for the input reference pixel data 110 into a degenerated data.

Figures 20A, 20B:
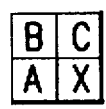
FIGS. 20A and 20B are charts illustrating a degeneracy table which is formed through a technique different from that of FIG. 11.

FIG. 20 shows degeneration steps through such a technique. For simplicity, there will be described a case where a Markov model formed by three pixels a, b and c is used for the pixel to be encoded X as a reference pixel pattern, as shown in FIG. 20A.

If the reference pixel is formed by three pixels as shown in FIG. 20A, combined patterns of its color codes are five, as shown in FIG. 20B. More particularly, there are five patterns, that is, a pattern in which all the color codes of the three pixels are coincide with one another; three patterns in each of which only two color codes are coincide with each other; and a pattern in which all the color codes of the three pixels are different from one another.

When the table shown in FIG. 20B is used as a degeneracy table in the state degenerator 18 or 28, the states of $2^{12}$ patterns which can inherently be taken by the combinations of three pixels can be degenerated into five states $S_x$, shown in FIG. 20B. Notwithstanding, the reference pixel data 110 can effectively be degenerated to reduce the number of states in the entropy encoder 14 greatly.

Fourth Embodiment

The fourth embodiment of the present invention will be described below.

The predictors 16 and 26 used in the previous embodiments use the color order table shown in FIG. 6. The color order table has the number of indexes equal to $2^{18}=65535$ since it utilizes the reference pixel data 110 formed by 16 bits as an index. 16 color codes are assigned to each index while four bits are assigned to each color code to represent its order. When the color order table is to be stored in the ROM, therefore, the memory capacity will be 65535×64=4 Mega bits.

The fourth embodiment can reduce the memory size in the color order generating unit 40 for storing the color order table and at the same time realize an increased encoding efficiency.

Figure 22:
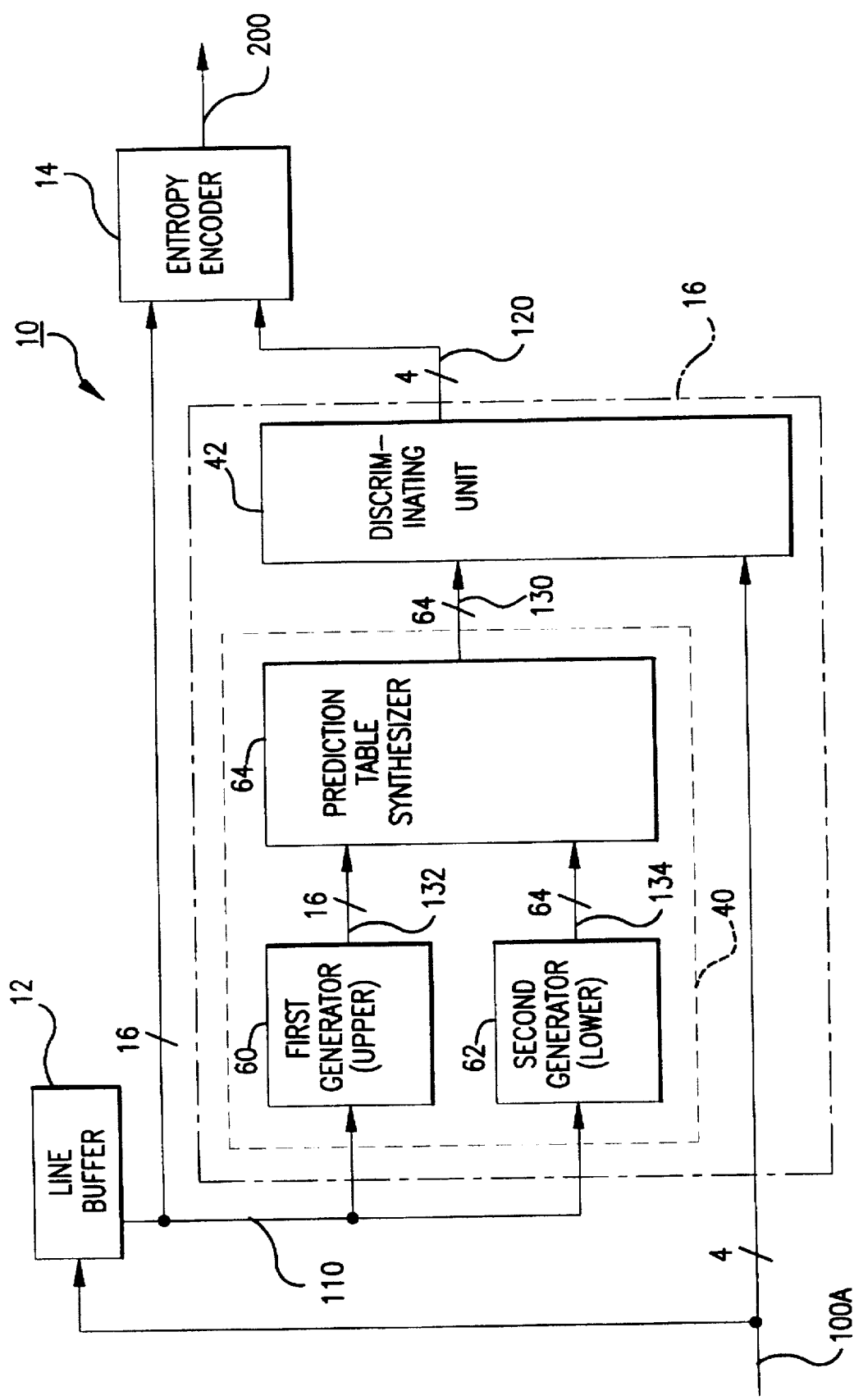
FIG. 22 is a block diagram of the fourth embodiment of a data encoding system constructed in accordance with the present invention.
Figure 23:
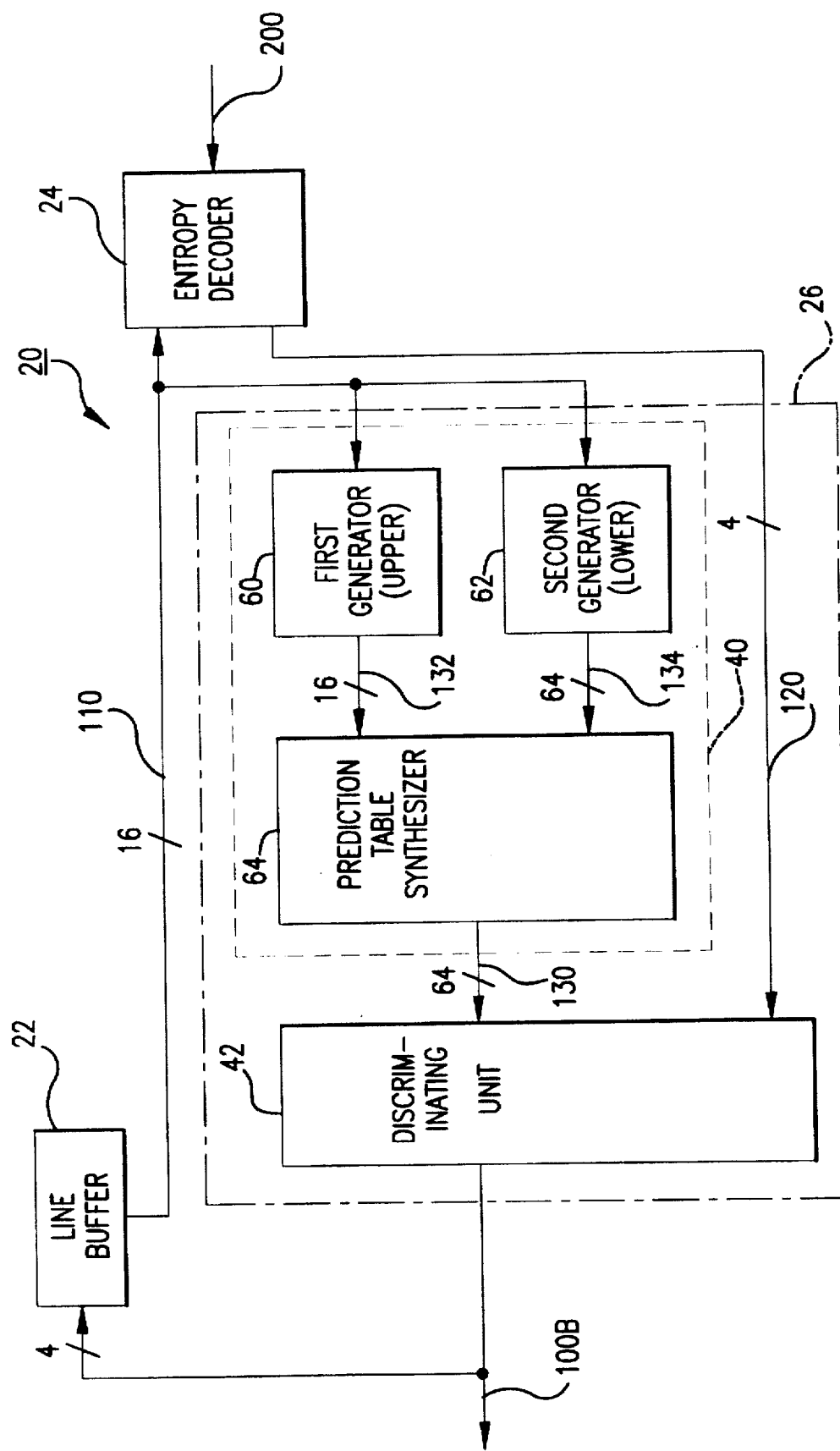
FIG. 23 is a block diagram of the fourth embodiment of a data decoding system constructed in accordance with the present invention.

FIG. 21 shows a color order table prepared by the use of a technique similar to that of the table shown in FIG. 6. In the color order table, the item of frequency on the horizontal axis represents the frequency of reference pixel pattern S through all the image data to be encoded. The appearance number used in the data is the relative appearance number divided into high, middle and low. The appearance number 0 means that no reference pixel pattern S appears in the image data to be encoded. In FIG. 21, no reference pixel pattern 3 appears at all. FIG. 22 shows the fourth preferred embodiment of a data encoding system 10 constructed in accordance with the present invention. FIG. 23 shows a data decoding system 20 associated with the data encoding system 10 of FIG. 22.

Each of the data encoding and decoding systems 10, 20 is characterized in that the color order generating unit 40 comprises a first generator unit 60, a second generator unit 62 and a prediction table synthesizer unit 64.

The first generator unit 60 has stored the table of FIG. 25 as a first color order table. The first color order table is formed by color order table data until the upper m (m=4 in FIG. 25) from the color order table of FIG. 21 for each index. The color order table is ordered starting from the highest frequency, so that the frequency equal to or lower than (m+1) is extremely low. Even if the other color codes are assigned and encoded to the color order table starting a lower frequency, the entire encoding efficiency will be less degraded. The first color order table shown in FIG. 25 has stored the table data until the upper m=4 for each index and can be thus reduced to a table size equal to about 4/16 times the color order table shown in FIG. 21.

The second generator 62 has stored the table of FIG. 26 as a second color order table. The second color order table uses the frequency of color codes as color orders. More particularly, an image to be encoded is pre-scanned to form a data on which the frequency of each color code is statistically measured to provide a color order therefor. It is therefore to be understood that the first and second color order tables are different from those of FIGS. 21 and 25 in that the frequency of color code is not set for each index.

When a reference pixel data 110 is input from the line buffer 12 into the first generator 60, the latter uses it as an index to read the color order table data of said index from the first color order table of FIG. 25 as a first data 132 which is in turn output toward the prediction table synthesizer 64.

Each time color pixel data 100A is input into the second generator 62, the latter outputs the second color order table data 134 of FIG. 26 toward the prediction table synthesizer 64 as a second data. In this embodiment, the second data is output in synchronism with the input of the reference pixel data.

The prediction table synthesizer 64 uses the first data input thereinto as upper color order data and also data obtained by removing the color code data included in the first data from the second data as lower color order data. The upper and lower data are combined to synthesize color order table data 130 for representing the relationship between each color is code and its color ranking data.

Figure 27:
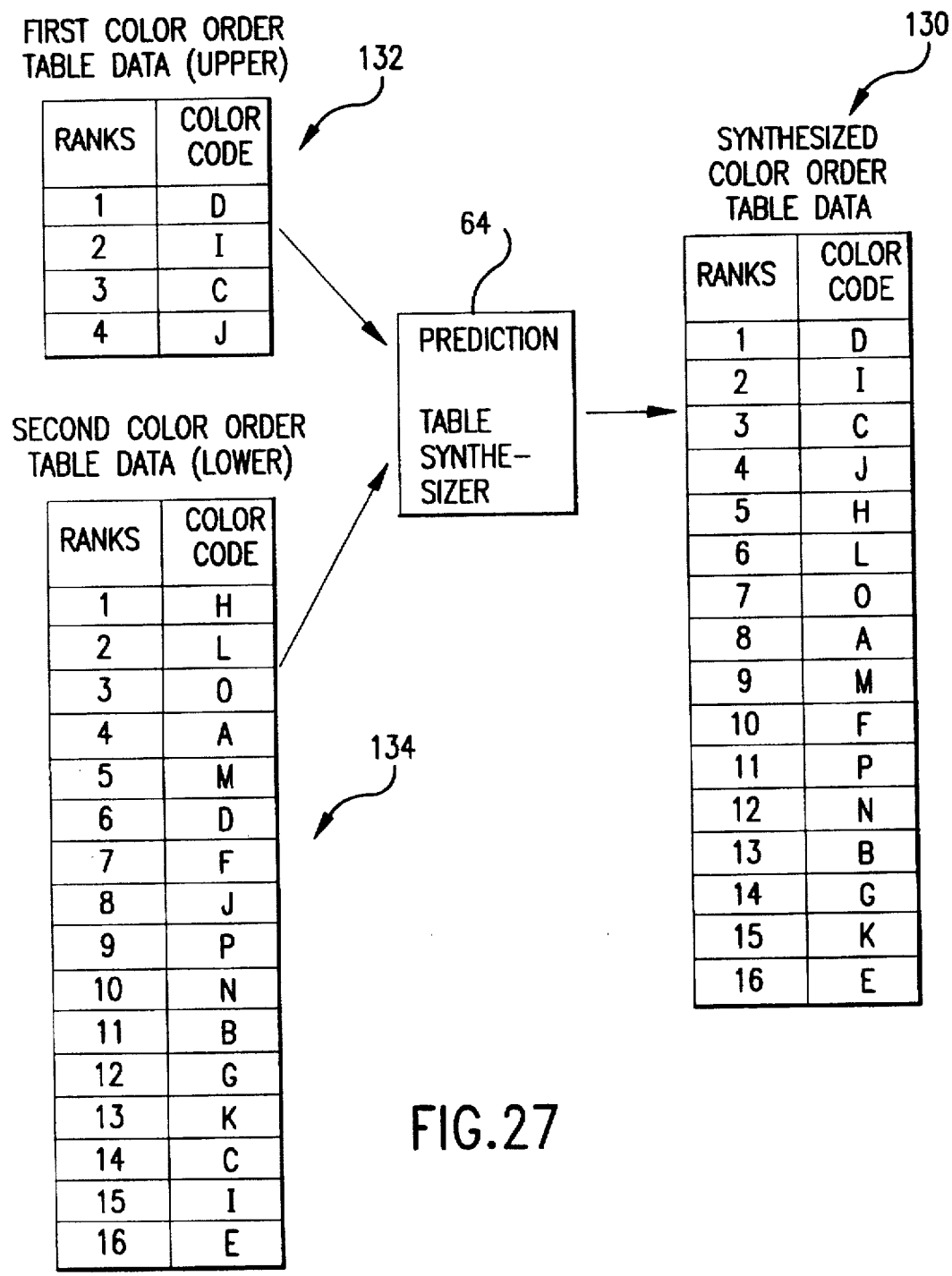
FIG. 27 is a diagram illustrating the principle of using the first and second color order tables to synthesize the final color order table.

FIG. 27 shows the procedure of synthesizing a series of such color order table data 130.

It is, for example, now assumed that color pixel data 110 representing an index "1" is input into the first generator 60. The first generator 60 then outputs a color order data 132 corresponding to the index 1 toward the prediction table synthesizer 64 as upper data.

Further, the second generator 62 outputs the table data 134 itself shown in FIG. 26 toward the prediction table synthesizer 64.

The prediction table synthesizer 64 directly uses the upper color order data 132 until m=4 as upper color orders in the synthesizing table. The color code, data included in the upper data 132 are removed from the color order table data 134 which are input as lower data to form the fifth to sixteenth lower color order data. Thus, the color order table data 130 will be synthesized and output.

The color order table data 130 thus synthesized and output is compared with the color order table data shown in FIG. 21. The color order table data shown in FIG. 18 is obtained by pre-scanning all the image data to be encoded. If such color order table data is used to encode the input color pixel data, the encoding efficiency will theoretically be best. However, this embodiment only uses the upper color order data in the table data of FIG. 21 and utilizes the color order table data of FIG. 26 as lower color order data. Studying the color order table data shown in FIG. 21, it is understood that for all the indexes, the frequency of upper order color codes is extremely high while the frequency of lower color codes is very low. Even if the color codes which are different from those of the table of FIG. 21 are assigned to color ranks having lower frequencies to prepare color order table data as in this embodiment, therefore, the degradation of the encoding efficiency due to such table data can extremely be low.

Particularly, the encoding efficiency when the synthesized color order table data is used can be less degraded since the table data based on the frequency of color codes obtained by the pre-scan of all the image data as shown in FIG. 26 is used in the lower color order table.

Figure 24:
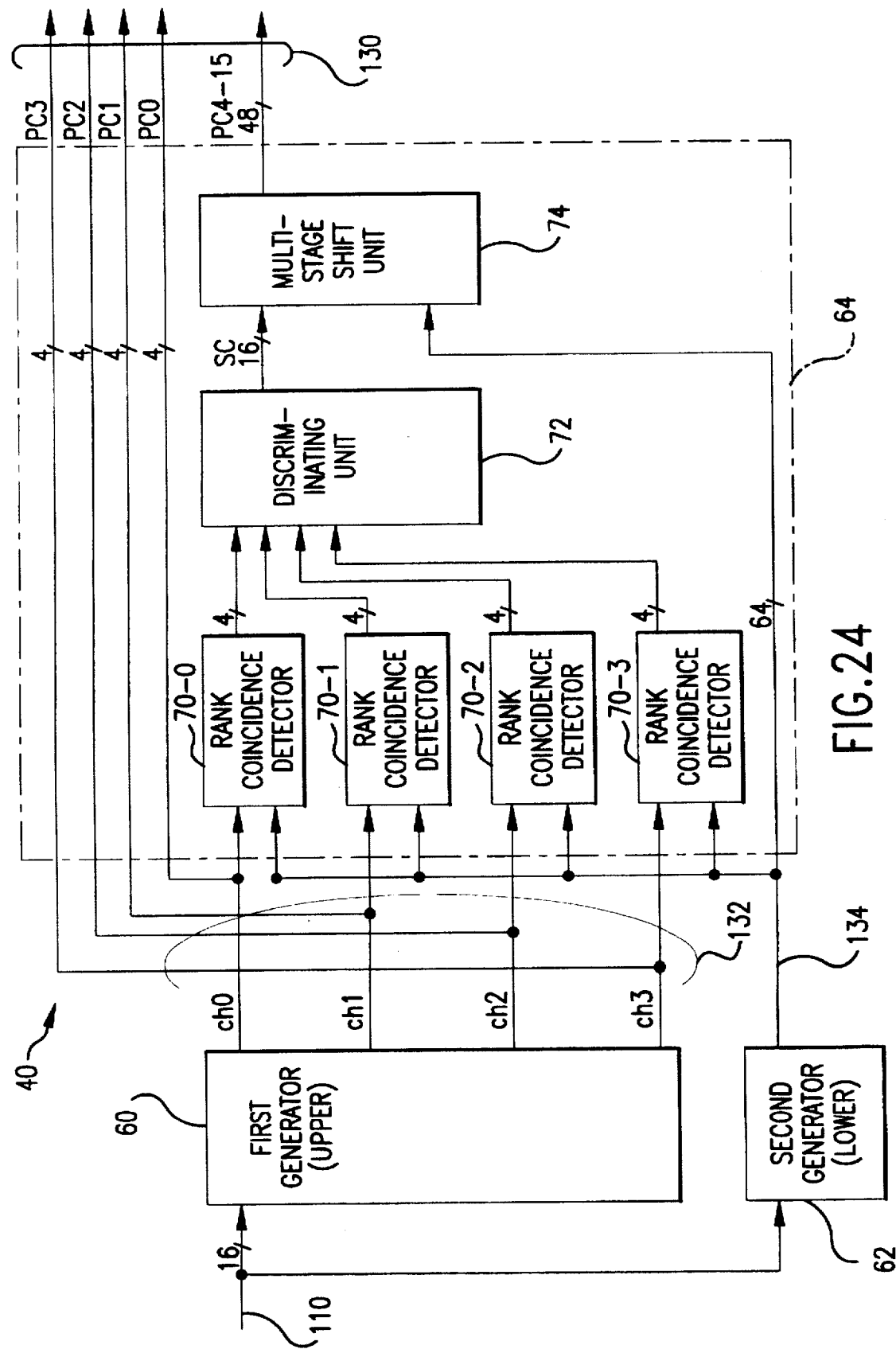
FIG. 24 is a block diagram of the details of a color order generating unit which is used in the fourth embodiment.

FIG. 24 shows the details of the color order generating units 40 shown in FIGS. 22 and 23.

In this embodiment, the first generator 60 has four output channels CH0, CH1, . . . and CH3 whose color orders correspond to 1–4, respectively. As the reference pixel data 110 is input into the first generator 60 as an index, each of the output channels CH0–CH3 outputs a color code whose color rank is either of 1–4.

The second generator 62 outputs the table data shown in FIG. 26 each time the reference pixel data 110 is input thereinto.

The prediction table synthesizer 64 outputs the color order table data output from the four channel output terminals of the first generator 60 as color order table data representing the color ranks 1–4. The prediction table synthesizer 64 further comprises four order coincidence detectors 70-0 to 70-3 which correspond to the four output terminals of the first generator 60, respectively. Each of the detectors 70-0 to 70-3 compares the color order table data 132 output from the first generator 60 with the color order table data 134 output from the second generator 62 to output color code data included in both the color order table data toward a discriminating unit 72.

The discriminating unit 72 then outputs the result of coincidence detection toward a multi-stage shift unit 74.

The multi-stage shift unit 74 responds to this result of coincidence detection to remove color code data included in the table data from the first generator 60 from the table data output from the second generator 62, with the remaining data being then output the table data of color ranks 5–16.

Thus, the prediction table synthesizer 64 can synthesize and output the color order table data 130 having their color ranks 1–16 each time the reference pixel data 110 is input into the prediction table synthesizer 54.

Figure 28:
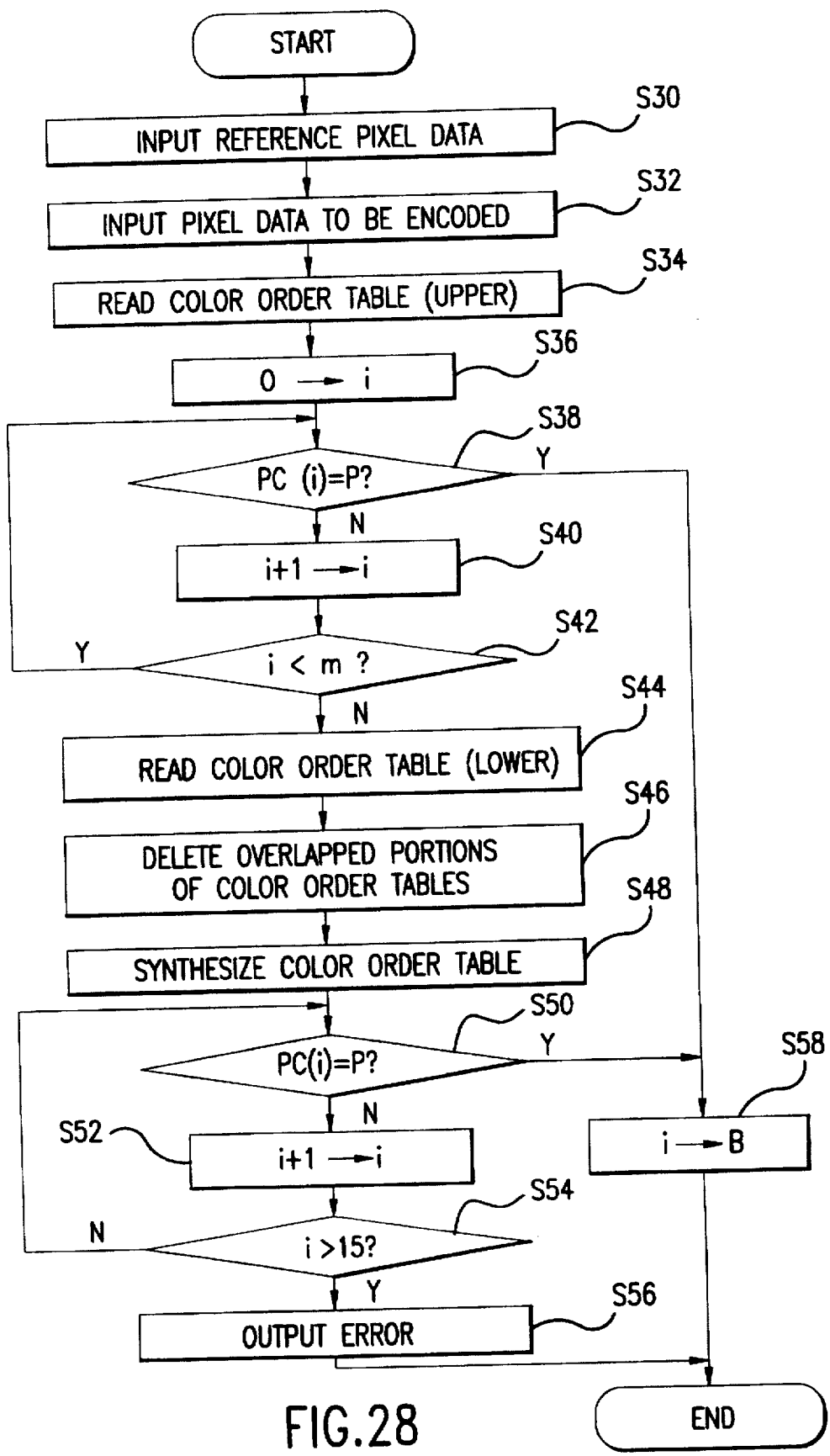
FIG. 28 is a flow chart illustrating the synthesization of color order table which is shown in FIG. 27.

FIG. 28 shows a flow chart illustrating the operation of the color order generating unit 40 of FIG. 24 which is constructed as a software.

As reference pixel data 110 and color pixel data 100A to be encoded are input (steps S30 and S32), the reference pixel data 110 is used as an index to read the first to fourth table data 132 from the first table data shown in FIG. 25, which are in turn directly output therefrom as the first to fourth color order table data output from the prediction Table synthesizer 64 (step S34).

The discriminating unit 42 responds to the upper four bit data thus output to first set i at zero (step S36) and then to judge whether or not the input color pixel data 100A is coincide with a color code data representing the uppermost color rank (step S38). If the coincidence is judged, the color rank of the color pixel data in question will be output as color ranking data (step S58).

If it is judged that the coincidence is not detected, i is incremented by one (step S40) and the step S38 is then repeated. Such an operation will be repeated until the value i becomes 3 (step S42). If it is judged that the color code of the input color pixel data is coincide with that of the upper color order data output from the first generator 60 during such a procedure, the color rank of that color code is output as color ranking data (step S58).

If it is judged that there is no color code coincide with the upper color order data, the lower color order table data 134 is read out from the second generator 62 (step S44). The portion of the lower order table data 134 superimposed by the color order table data from the first generator 60 is then removed (step S46). The color order table data 130 is then synthesized from the outputs of the first and second generators 60, 62 (step S48).

The color order table data 130 so synthesized is used to determine whether or not the color codes having their color ranks 5–16 are coincide with the color code of the input color pixel data 100A (steps S50, S52 and S54). If the coincidence is detected, the color ranks of those color codes are output as color ranking data 120 (step S58). If the coincidence is not detected, an error signal will be output (step S56).

Such a software can also provide the advantage and function which are similar to those of the color order generating unit 40 shown in FIG. 24.

In such a manner, the color order table data used can greatly be reduced to reduce the entire circuitry in size and cost irrespectively of the software or hardware shown in FIG. 24 or 28.

The second color order table shown in FIG. 26 is a fixed table which is formed on the frequency of color code for all the image data to be encoded and generally used for all the patterns of the reference pixel data 110. Depending on the type of image, it may be preferred that the second color order table is formed exclusively for a particular reference pixel pattern. In such a case, a plurality of color order tables are provided. When a given reference pixel pattern is input, the data of the second color order table inherent to the input reference pixel pattern may be output. Thus, the prediction error for the input color code can be reduced to provide a better rate of image data compression.

Modification

The previous embodiments have been described as to the second generators 62 of the systems 10 and 20 which are used as second fixed color order tables shown in FIG. 26. However, this embodiment is characterized in that the second color order table utilizes the local property of an image to update the color rank of each color code sequentially. Thus, the contents of the second color order table can suitably be switched to appropriate data depending on the state of image to reduce its prediction error.

The encoding system which predicts its output from its input as in the predictors 16 and 26 of the previous embodiments tends to increase the rate of data compression as the correlation between the color signal of the input color pixel data 100A and the upper color signal output from the color order table is stronger. When the contents of the second color order table is updated to appropriate data depending on this state as in the previous embodiments, the prediction error can be reduced to provide an extremely high rate of image data compression.

FIG. 29 shows a procedure illustrating the updating of table in the second generator 62 according to this embodiment. Each time color pixel data 100A is input into the second generator 62, the latter is adapted to prepare the newest appearance table for carrying the color rank of a code corresponding to the input color pixel data in the second color order table up to the first rank.

Figures 29A, 29B, 29C:
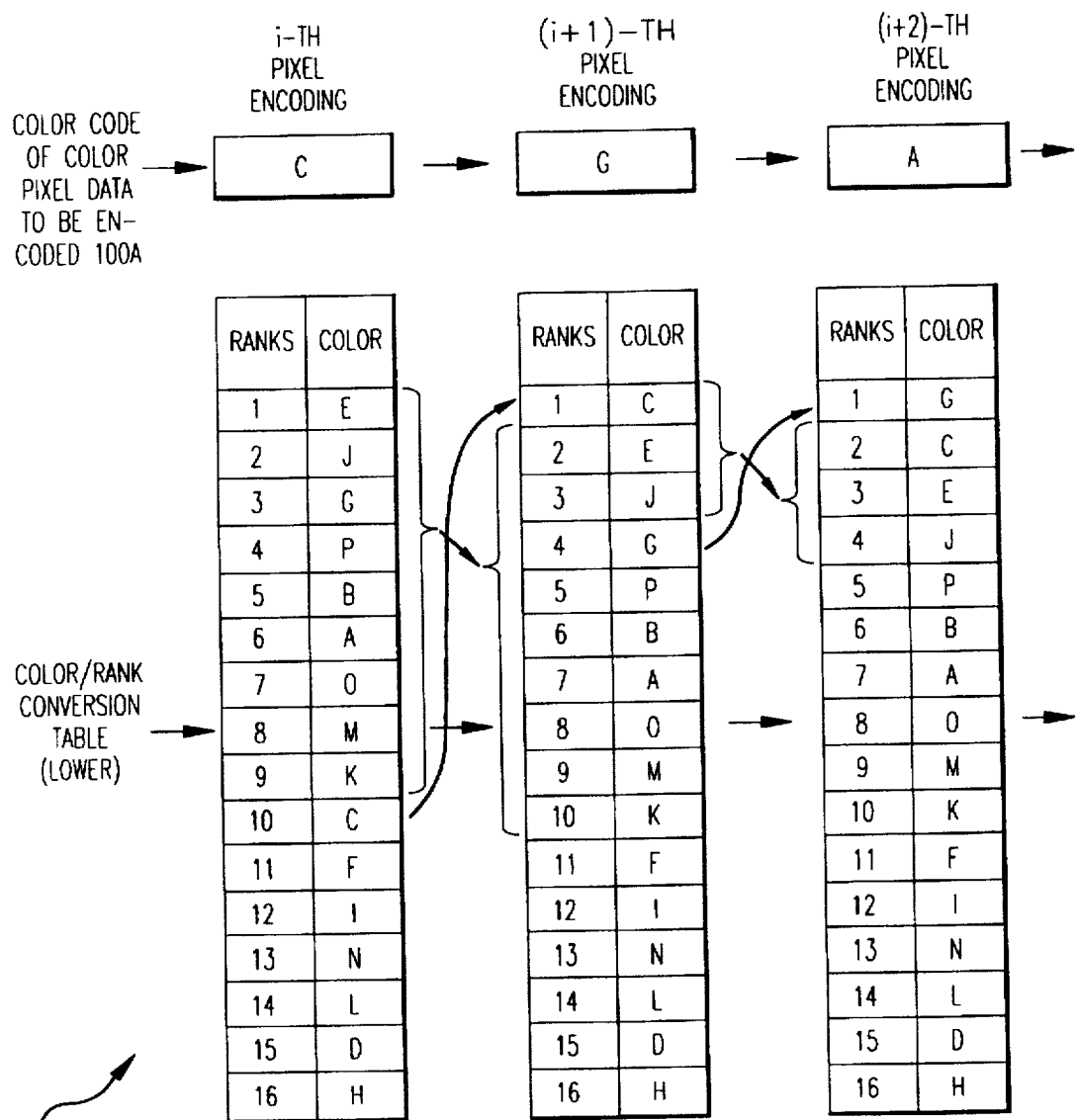
FIGS. 29A, 29B and 29C are diagrams illustrating a series of steps which sequentially update the second color order table in response to the color code of input color pixel data.

If the i-th pixel is to be encoded, it is, for example, assumed that the second color order table is set as shown in FIG. 29A. when a color code C is input as the i-th pixel, the color order table will be updated to carry the color rank of the color code C up to the first rank as shown in FIG. 29B, the first to ninth color code ranks shown in FIG. 29A being sequentially carried down by one. Thus, the second color order table will be updated into such data as shown in FIG. 29C.

Each time color pixel data 100A to be encoded is input into the second generator 62, the contents of the second color order table will well reflect the local property of an image since the contents of the second color order table in the second generator 62 is sequentially updated. If the second color order table sequentially updated is used to synthesize the encoding or decoding color order table by the prediction table synthesizer 64, the prediction error can be reduced.

Figure 30:
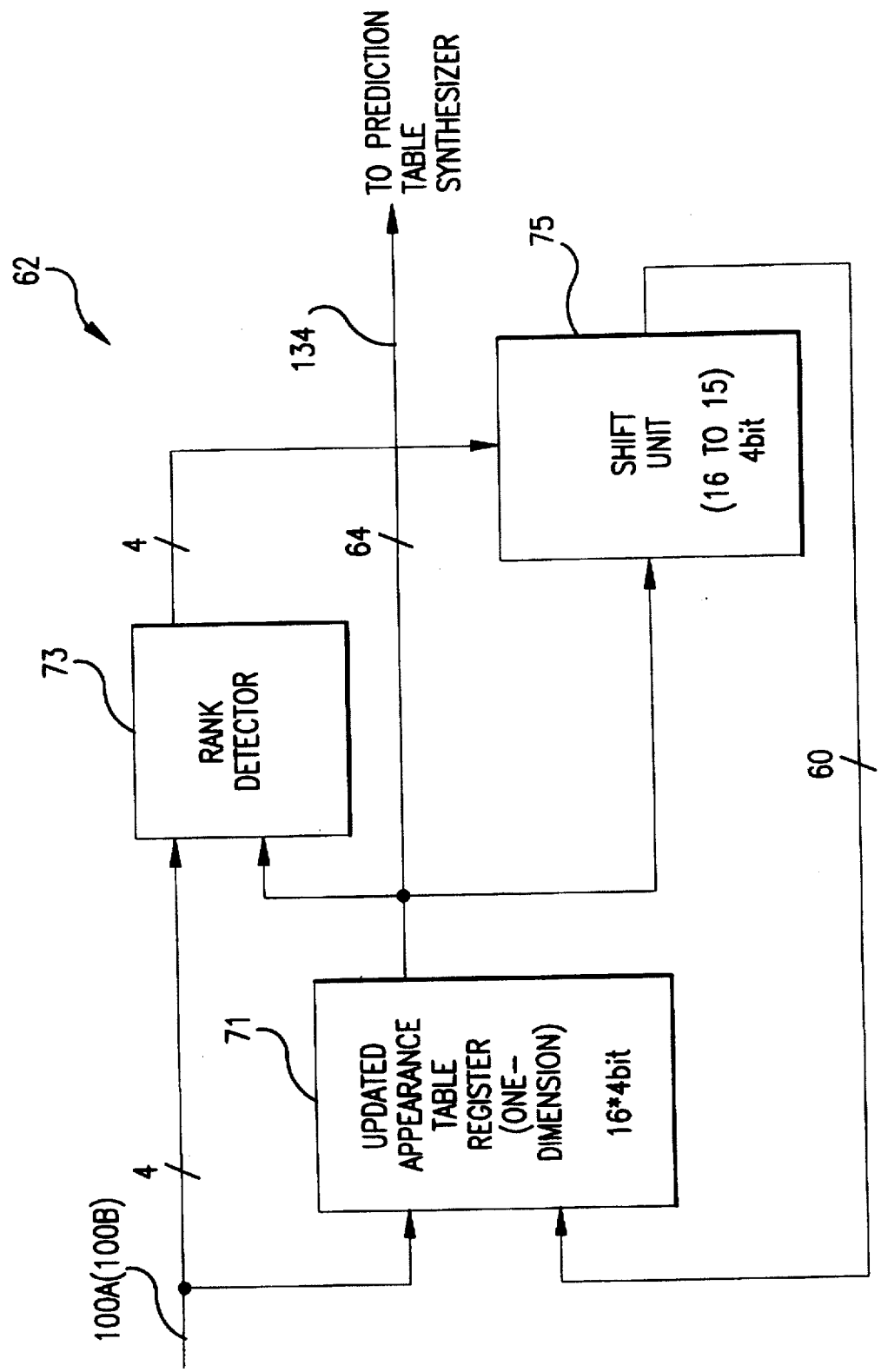
FIG. 30 is a diagram illustrating a circuit which is used to perform the updating operation shown in FIG. 29.

FIG. 30 shows the details of the second generator 62 in this embodiment.

The second generator 62 comprises an updated appearance table register unit 70, an order coincidence detector unit 72 and a shift unit 74.

The updated appearance table register 70 may have stored such a second color order table as shown in FIG. 29A. The second color order table is prepared by assigning the first to sixteenth color ranks to 16 color codes A–P, as described. As a color code C is input into the updated appearance table register 70 as the color pixel data 100 of the i-th pixel as shown in FIG. 29A, the updated appearance table register 70 outputs the data 134 of the second color order table shown in FIG. 29A toward the prediction table synthesizer 64 and at the same time toward the order coincidence detector 72 and shift unit 74.

The order coincidence detector 72 determines at which color rank, the color code C of the input color pixel data 100A is located in the second color order table data 134 so input. The detected rank is then output toward the shift unit 74. Since the input color code is C, it is determined that the color code C is in the second color order table at the tenth rank. The result is then output toward the shift unit 74.

The shift unit 74 responds to the input data to cancel the contents of the tenth color code C from the second color order table of FIG. 29A stored in the updated appearance table register 70, the upper first to ninth color ranks being then carried down by one. This empties the first code area at which the color code C detected with respect to its coincidence is set. In such a manner, the contents of the updated appearance table register 70 will be updated to such table data as shown in FIG. 29B.

The second generator 62 repeats such a table updating operation called "updated appearance table preparation". Therefore, the contents of the second color order table are sequentially updated on the color codes of the newest color pixel data at all times. When such a table is used, the data compression can be improved.

Although the embodiments of FIGS. 29 and 30 have been described as to the data encoding, the present invention may similarly be applied to the data decoding by using the decoded color pixel data 100B in place of the color pixel data 100A which is input into the updated appearance table register 70 and detector 72.

Another Modification

Another modification of the second generator 62 will be described below.

The modification of the second generator 62 is characterized in that the contents of the second color order table is sequentially updated into the contents of a table data synthesized and output by the prediction table synthesizer 64.

Similarly, this can cause the updated contents of the second color order table to be reflected by the local property of the image. Thus, the prediction error can be reduced.

FIG. 32 shows the details of a color order generating unit 40 which is formed by such a technique. The second generator 62 comprises a ROM 76, a multiplexer 80 and a register 82.

An initial value of the second color order table data has been set in the ROM.

The multiplexer 80 selectively outputs the contents of the second color order table data stored in the ROM 76 toward the register 82 prior to the actual color rank conversion. Thus, the second color order table stored in the ROM 76 will initially be set in the register 82.

The structures and operations of the first generator 60 and prediction table synthesizer 64 in the color order generating unit 40 are basically the same as in FIG. 22; but will not further be described.

FIG. 31 shows a series of operations in the color order generating unit 40 shown in FIG. 32.

As the i-th pixel is to be encoded or decoded, it is now assumed that the reference pixel data 110 of that pixel is input. As shown in FIG. 31A, the first generator 60 outputs the first color order table data 132 toward the prediction table synthesizer 64 while the register 82 outputs the second color order table data 134 toward the prediction table synthesizer 64. The prediction table synthesizer 64 then combines the first and second color order table data 132 and 134 so input to form synthesized color order table data 130 which is in turn output toward the color order generating unit 40. The synthesized color order table data 130 is then input into the register 82 through the multiplexer 80 to update the contents of the second color order table data. In other words, the contents of the second color order table data 134 in the register 82 will be updated directly into the contents of the synthesized color order table data 130 from the prediction table synthesizer 64.

If the next (i+1)-th pixel is to be encoded or decoded and when reference pixel data 110 is input, the first generator and register 60, 82 similarly output the first and second color order table data 132, 134 as shown in FIG. 31B toward the prediction table synthesizer 64. The prediction table synthesizer 64 combines the first and second color order table data 132, 134 to form synthesized color order table data 130 which is in turn output toward the discriminating unit 42 and also fed back to the resister 82 through the multiplexer 80. In such a manner, the contents of the second color order table data 134 will be updated into the contents of the synthesized color order table data 130 from the prediction table synthesizer 64.

Similarly, the color order table data 130 is also synthesized for the (i+2)-th pixel, as shown in FIG. 31C.

Other Modification

There will now be described the other modification of the color order generating unit 40 which can reduce the size of the first color order table used in the first generator 60 with an improved encoding efficiency.

It has been described that there is a variability in the frequency of reference pixel pattern in the color order table of FIG. 21. It is believed that such a variability depends on the property of an image to be processed. Even when the general image data is considered, however, it has been confirmed that the frequency of reference pixel pattern is variable.

If the frequency of a reference pixel pattern for an image to be processed is equal to zero, the efficiency of encoding the color rank will not be degraded even though the color order table data of such a reference color pattern is deleted.

Further, even when the table data of a reference pixel pattern having its small frequency is deleted and replaced by a color order table data having such ranks as shown in FIG. 26, it has been that the influence to the encoding efficiency is very low. Although it is predicted that such a replacement degrades the efficiency of encoding the color rank, its influence would be extremely low since the frequency of that reference pixel pattern is low.

FIG. 33 shows a first color order table usable in this embodiment. The first color order table is formed by deleting the table data of reference pixel patterns having their zero and small frequencies from the color order table shown in FIG. 21. Where an image data having four reference pixels and is being formed by data of four bits per pixel was actually measured with respect to a rate at which all the reference pixel patterns therein are occupied by reference pixel patterns having their large and middle frequency, it has been found that the rate was equal to about 20% of all the reference pixel patterns. When the first color order table as shown in FIG. 33 is prepared from the color order table shown in FIG. 21, therefore, all the amount of data can be reduced as small as up to about 20%.

FIG. 34 shows a color order table obtained by deleting the color code data of lower orders (which are equal to or lower than the fifth rank) from the first color order table shown in FIG. 33. When such a color order table is used as the first color order table, the amount of data can be reduced $4/16$ or $1/4$ times that of the color order table shown in FIG. 33.

The memory size of the first generator 60 can greatly be reduced if the color order tables shown in FIGS. 33 and 34 are used as the first color order table.

If the first color order table shown in FIG. 34 is used, the frequencies of color codes having their ranks equal to or lower than the fifth rank are those of the second color order table as shown in FIG. 26, for example.

If the table shown in FIG. 33 or 34 is used as the first color order table, however, the input reference pixel data 110 cannot be used directly as a read-out address for the table. In the color order table as shown in FIG. 25, the reference pixel data 110 can be used directly as a read-out address since the reference pixel data 110 corresponds to an index in the table with the rate of 1:1. On the other hand, in the table as shown in FIG. 33 or 34, the reference pixel data 110 does not necessarily correspond to the read-out address for the table with the rate of 1:1 since the indexes are thinned out.

FIG. 35 shows a predictor 16 or 26 which is formed in consideration with such a problem.

In this embodiment, the color order generating unit 40 comprises a memory address generating unit 84 in addition to the first and second generators 60, 62 and the prediction table synthesizer 64.

The first generator 60 includes the table shown in FIG. 33 or 34 as a first color order table. It is now assumed that the table of FIG. 33 is set as the first color order table.

The second generator 62 includes the table of FIG. 2B as a second color order table. The second color order table may be replaced by the second color order table of the second or third modification, if necessary.

According to the same technique as described, the prediction table synthesizer 64 synthesizes a new color order table 130 from the data 132 and 134 output from the first and second generators 60, 62, the new color order table being then output toward the discriminating unit 42.

This embodiment is characterized in that the memory address generating unit 84 outputs a table data reading signal toward the first and second generators 60, 62 each time reference pixel data 110 is input.

FIG. 36 shows an access system corresponding to the first color order table shown in FIG. 33.

The access system will be described below.

As shown in FIG. 36A, the color order table of FIG. 21 before the degeneration step is first divided into n blocks. It is now assumed that the number of reference pixel patterns in each block is equal to m. The following relationship is established between the number of reference pixel patterns Sn and the numerals n and m.

$$Sn = 2^{a*b} = n*m \quad (1)$$

where a is the number of bits forming a pixel; and b is the number of pixels forming a reference pixel data 110. FIG. 36A shows the first color order table of FIG. 33 which comprises items of entry table, header and data. The entry table at the forefront of the color order table has stored block addresses each indicating the head address of each block, as shown in FIG. 36B.

As shown in FIG. 36A, each of the n divided blocks comprises a header and data. The header has stored information relating to whether or not there is data. Each of the headers includes h information areas in each of which one-byte information or eight header information parts Ay have been stored.

The header information part Ay=1 is a pattern in which the frequency of pattern of the input reference pixel data 110 is large or middle, and means that its table data is present in the first color order table of FIG. 33.

The header information part Ay=0 is a pattern in which the frequency of pattern of the input reference pixel data 110 is small or zero, and means that its table data is not present in the first color order table of FIG. 33. When the number of header information parts Ay=1 is detected from one to m, therefore, the number of effective reference pixel patterns in each block can be calculated. The number of effective reference pixel patterns between A1 and Ay can also be determined similarly by calculating the number of header information parts A=1 between A1 and Ay.

When a reference pixel is an Si pattern and if it is considered that its pattern is in the block X at the i-th order, the following relationship is established between Si and x, y.

$$Si = m*x + y \quad (2)$$

where x and y are represented by the following formulas:

$$x = \text{INT}[Si/m] \quad (3)$$

$$y = \text{MOD}[Si/m] \quad (4)$$

where INT indicates that only the bracketed integer is displayed; and MOD means that the remainder of the bracketed integer is displayed.

FIG. 37 shows a flow chart illustrating a procedure through which the access system of FIG. 36 is used to synthesize new color order table data from the first and second color order tables.

When reference pixel data 110 is input (step S60), first, the memory address generating unit 84 responds to the reference pixel pattern Si to calculate an access block number X for the first color order table by using said third formula (step S62). At the same time, the memory address generating unit 84 uses said fourth formula to calculate a header number y in the block X (step S64).

Thus, an access address to the first color order table will be determined.

The memory address generating unit 84 then reads the y-th header information part Ay in the first color order table of FIG. 36 stored in the first generator 60 at the x-th block (step S66) and determines whether or not the read information part is Ay=1 (step S68). If it is determined that it is Ay≠1, it is determined that the table data having the index specified by the reference pixel pattern Si is not present in the first color order table. Thus, the memory address generating unit 84 instructs the second generator 62 to read the second color order table data 134. At the same time, the memory address generating unit 84 controls the prediction table synthesizer 64 so that the color order table data stored in the second generator 62 is selectively output toward the discriminating unit 42 (step S82).

If it is determined at step S68 that Ay is equal to one, a read-out address to the first color order table begins to be calculated. More particularly, when Ay=1, it means that table data corresponding to the pattern Si of the input reference pixel data 110 is present in the first color order table.

At the subsequent steps S70, S72, 374, 376 and S78, therefore, a read-out address to the first color order table is calculated.

At step S70, k is set to be equal to one while BDN incremented at each header information part A=1 is set zero.

It is then determined whether or not the first header information part A1 is equal to one (step S72). If it is determined that A1=1, the value BDN is incremented by one (step S74) while the value k is also incremented by one (step S78). If it is determined that the value A1 is not equal to one, the value BDN is not incremented, but only the value k is incremented by one.

It is then determined whether or not the header information part A2 is equal to one (step S72). Only if A2=1, the value BDN is incremented by one.

A series of such steps are repeated until the value k becomes y. Thus, the value BDN will indicate the number of effective header information parts within the y header information parts between A1 and Ay. In other words, the value BDN will indicate the number of effective reference pixel data among the first to k-th reference pixel data in the x-th block.

When k=y (step S76), the memory address generating unit 84 calculates the data read-out address to the first color order table according to the following formula and causes color order table data indicated by the calculated address to be output from the first generator 60. At the same time, the memory address generating unit 84 provides a control command for selectively outputting the output of the first generator 60 toward the prediction table synthesizer 64 or discriminating unit 42 (step SS8).

$$B \text{ address } x + f(\text{BDN}) + h'' \rightarrow \text{Data address} \quad (5)$$

where h represents the number of bytes of the data forming the header information. More particularly, the address calculating formula is represented by a sum of the head address (B Address x) of the x-th block, the amount of data h in the header information and f (BDN). The value f (BDN) can be represented by a product of the effective index BDN in the x-th block times the magnitude of a data area corresponding to each index. In such a manner, the first color order table of FIG. 33 from which the indexes having their zero and small S frequencies are removed can positively be accessed.

According to the color order generating unit 40 of this embodiment, new color order table data used in the color order conversion can effectively be synthesized from the first color order table and the second color order table of FIG. 26 even if the degenerated table shown in FIG. 33 is used as the first color order table.

If the first color order table data shown in FIG. 33 is replaced by the further degenerated table data of FIG. 34, the color order generating unit 40 may be formed as follows:

When the memory address generating unit 84 outputs the read-out address to the first generator 60, the former similarly outputs the data read-out address to the second generator 62. At this time, the prediction table synthesizer 64 combines the table data 132 output from the first generator 132 with the table data 134 output from the second generator 62 to synthesize and output new color order table data 130 in the manner similar to that of the predictor table synthesizer 64 in the systems 10 and 20 shown in FIGS. 22 and 23.

Thus, the memory capacity used to store the first color order table data can be further reduced to reduce the manufacturing coat.

Although this embodiment has been described as to the second color order table fixed as shown in FIG. 26, the present invention may be applied, for example, to the data updating type table as shown in FIG. 29 or 31.

Other Modification

The color order tables of FIGS. 33 and 34 are formed by degenerating the table of FIG. 21 based on the frequency of each reference pixel pattern. However, such color order tables may be formed by degenerating the first color order table through any other technique.

A technique of utilizing the correlation between reference pixels to reduce the amount of data in the first color order table will be described below.

FIG. 38 shows a first color order table formed through such a technique. The color order table is normally formed by predicting what color code is produced from the reference pixel data 110 as a pixel to be encoded, the predicted color codes being ranked. If there is a strong correlation between reference pixels, therefore, the probability of prediction can be increased to improve the encoding efficiency on the contrary, if there is not a strong correlation between reference pixels and when the color codes of pixels to be encoded are randomly produced, the probability of prediction is lowered. With a relatively low correlation between reference pixels, the reduction of encoding efficiency can extremely be small even if color rank having frequency of color code different from the actual one is applied to a pixel to be encoded.

FIG. 38 shows a table formed by deleting table data having their lower indexes with respect to the correlation between reference pixels from the color order table Shown in FIG. 21

FIG. 39 shows a table obtained by deleting table data of color codes having their color ranks equal to or lower than the fifth rank from the color order table of FIG. 38. The table of FIG. 39 can be further reduced in size, than that of FIG. 38.

When the table shown in FIG. 38 or 39 is used as the first color order table of the first generator shown in FIG. 35, therefore, the same advantage and function as in the previous embodiments can be attained.

It has been found that the degenerated table on the correlation between reference pixels as shown in FIGS. 38 and 39 has a law with respect to the degeneration procedure, unlike the degenerated table on the appearance number as shown in FIGS. 33 and 34. More particularly, the appearance number can be determined only by pre-scanning the entire scene while the correlation between reference pixels can be obtained simply by comparing the reference pixels with one another.

If the table as shown in FIG. 38 or 39 is used as the first color order table stored in the first generator 62, the read-out address to the first and second generators 60, 62 can be generated by such a circuit as shown in FIG. 40.

Referring to FIG. 40, the color order generating unit 40 comprises a correlation determining unit 86 in addition to the first and second generators 60, 62, the prediction table synthesizer 64 and the memory address generating unit 84. The first and second generators 60, 62 and prediction table synthesizer 64 are similar to those of FIG. 35, but will not further be described herein.

The correlation determining unit 86 determines the degree of correlation between the reference pixels forming the input reference pixel data 110, the result being then output toward the memory address generating unit 84.

FIG. 42 illustrates the reference pixels $a_n$, $b_n$, $c_n$ and $d_n$ which are disassembled into plane units. In this embodiment, each of the reference pixels $a_n$, $b_n$, $c_n$ and $d_n$ is formed by four bits. Therefore, each pixel is disassembled into four planes per bit unit. For example, one reference pixel $a_n$ may be disassembled into four plane data $a_0$, $a_1$, $a_2$ and $a_3$.

FIG. 41 shows a flow chart illustrating a procedure of utilizing such data to determine the correlation between the input reference pixels.

When reference pixel data 110 is input (step S90), first, the correlation determining unit 86 determines whether or not the color codes of all the four pixels $a_n$, $b_n$, $c_n$ and $d_n$ forming the reference pixel data 110 are coincide with one another (step S92), whether or not three of the reference pixels $a_n$, $b_n$, $c_n$ and $d_n$ are coincide with one another (step S94) and whether or not two of the reference pixels $a_n$, $b_n$, $c_n$ and $d_n$ are coincide with each other (step S96).

It all the color codes coincide with one another, SFC=1 is then output as a correlation condition while a correlation value SNO representing a position at which the color codes coincide with one another is output (step S108).

If it is determined that three color codes coincide with one another, SFC=2 is output as another correlation condition while SNO representing a position at which these color codes coincide with one another is also output (step S110).

If it is determined that two color codes coincide with each other, SFC=3 is output while a correlation value SNO representing a position at which they coincide with each other is output (step S112).

If it is determined that there is no coincidence at either of the steps S92, 94 or 96, no coincidence between the color codes will be between the four reference pixels. In such a case, the correlation between plane conditions is carried out at steps S98–S104.

It is determined at step S98 whether or not all the value of reference pixels in the plane 0 coincide with one another. If the coincidence is determined, SFC=4 is output as a correlation condition while a correlation value SNO representing a position at which they coincide with one another is output (step S114).

The similar judgment is also carried out with respect to the other planes 1, 2 and 3 at steps S100, S102 and S104. If YES is determined at either of these steps, the output of the correlation conditions and values is carried out at steps S116, S118 and S120.

If NO is determined at all the steps S92–S104, the correlation condition SFC=8 is output and at the same time the correlation value SNO representing that the correlation condition is not fulfilled is output (step S105), since the input reference pixel data 110 does not fulfill both the color and plane conditions.

When each data shown at the steps S108–S120 is input from the corrrelation determining Unit 86 into the memory address generating unit 84, the latter responds to this input data to calculate a read-out address to the first color order table in the following manner, the calculated read-out address being then output toward the first generator 60. At this time, the memory address generating unit 84 also outputs a control command of selecting the output of the first generator 60 toward the prediction table synthesizer 64.

When data shown at step S106 is input from the correlation determining unit 86 into the memory address generating unit 84, the latter outputs a command of reading the second color order table toward the second generator 62 and at the same time a control command of selecting the output of the second generator 62 toward the prediction table synthesizer 64.

A procedure of setting an address to the first color order table in the memory address generating unit 84 will be described below.

As described, the value SFC output from the correlation determining unit 86 can take eight patterns of SFC=1-8.

The value SNO output from the correlation determining unit 86 represents the positional information of color codes or plane data which coincide with one another between the reference pixels. For example, SFC=2 represents that three color codes coincide with one another. Information may be considered with respect to color codes which coincide with one another; color codes which do not coincide with one another; and at which position the color codes coincide with one another. For example, when the color codes of three pixels coincide with one another, the color patterns thereof are 16 and the other not-coincide pixels will have (16-1=15) combinations of their colors. Further, there are four combinations of non-coincide positions. Therefore, the number of all the combinations will be 16×15×4. If only the positional information of coincide color codes has been defined as SNO, the number of possible patterns will only be four.

The number of patterns which can be taken by SNO for each SFC pattern can be represented by the following table where the total number of patterns is a value obtained by accumulating the number of patterns for each SNO.

| Color of Patterns | Code of Reference Pixel | Possible Patterns taken by SNO | Total Number |
|---|---|---|---|
| Four Values Coincidence | (SFC = 1) | 1 | 1 |
| Three Values Coincidence | (SFC = 2) | 4 | 5 |
| Two Values Coincidence | (SFC = 3) | 9 | 14 |
| Plane 0 All Values Coincidence | (SFC = 4) | 1 | 15 |
| Plane 1 All Values Coincidence | (SFC = 5) | 1 | 16 |
| Plane 3 All Values Coincidence | (SFC = 6) | 1 | 17 |
| Plane 4 All Values Coincidence | (SFC = 7) | 1 | 18 |
| Others | (SFC = 8) | 1 | 19 |

When SFC=1 is output, all the four codes coincide with one another. The number of SNO patterns is one. With SFC=2, the number of patterns which can be taken by the positional information of SNO is four, as described. With SFC=3, the combination patterns of positional information at which two color codes coincide with each other is equal to nine.

Where the first color order table has been divided into blocks one for each pattern and an address set for each divided block has been stored in the first generator 60, the first color order table can accurately be accessed according to the input values of SFC and SNO.

The combination patterns of SFC and SNO output from the correlation determining unit 86 are 16 as will be apparent from the above table. An address has been set in the first color order table in correspondence to each of 15 patterns except the pattern of SFC=8. The corresponding address to the first color order table is accessed according to the combinations of input data SFC and SNO.

When four codes coincide with one another, for example, the address of the pattern 1 is accessed. When three codes coincide with one another (SFC=2), access may be performed to an address set for one of the second to fifth patterns according to the value of SNO. When all the values in the plane 3 coincide with one another (SFC=6), access may be made to an address in the seventeen pattern.

If addresses to the first color order table have been set according to the combinations of SFC and SNO in such a manner, the first generator 60 can positively be accessed to read the corresponding color order table data according to the output of the corrrelation determining unit 86.

Although it has been described that the value of SNO is the positional information of coincide codes or planes, the present invention may be applied to any other form in which the first color order table is more finely accessed by causing the positional information of not-coincide color codes or plane data or the color information of coincide color codes to be contained in the value of SNO.

Even by such a technique, the color order table 130 used in the determining of color rank can effectively be synthesized from the first degenerated color order table data 132 and the second color order table data 134.

Fifth Embodiment

The first to third embodiments have been described as to the fixed color order table while the fourth embodiment has been described as to the case when the data updating type table is used in a portion of the color order table. The present invention will be described as to an example in which the entire color order table is sequentially updated depending on the input color pixel data.

FIG. 43 shows the fifth preferred embodiment of data encoding system 10 according to the present invention while FIG. 44 shows the fifth preferred embodiment of a data decoding system 20 according to the present invention. In these figures, parts corresponding to those of the previous embodiments are designated by similar reference numerals, but will not further be described herein.

In each of the systems 10 and 20, the color order generating unit 40 comprises a one-dimensional color order table memory 90 and a table updating unit 92.

The one-dimensional color order table memory 90 has stored such a color order table 136 as shown in FIG. 45C. Each time color pixel data 100A is input, the one-dimensional color order table memory 90 outputs the stored color order table 136 toward the discriminating unit 42.

The discriminating unit 42 determines which rank of color code of the color order table data 136 input from the one-dimensional color order table memory 90 coincides with the color code of input color pixel data 100. The determined color rank of the color code is then output as a color ranking data 120.

On terminating the color rank judgment, the table updating unit 92 then begins to update the one-dimensional color order table memory 90.

Each time the color pixel data 100A is input into the table updating unit 92, the latter prepares the updated appearance table for carrying the color order of the color code corresponding to the input color pixel data in the color order table 136 up to the first rank.

The preparation of the updated appearance table is carried out in the same manner as the table updating operation of FIGS. 29A, 29B and 29C, but will not further be described herein.

If it is assumed that the input pixels for an image to be encoded $X_n$ are R0, R1, . . . as shown in FIG. 45A and that the color codes input as the data of these pixels is such an array of color codes as shown in FIG. 45B, the color order table 136 stored in the memory 90 is as shown in FIG. 45C. More particularly, the most recently input color code C4 is set at the first color rank; the color code C2 input immediately before the color code C4 is set at the second color rank; and the color code C0 input immediately before the color code C2 is set at the third color rank. If the same color code is repeatedly produced, its color rank is set according to the most recently produced color code.

The color order table stored in the one-dimensional color order table memory 90 is sequentially updated according to the color codes of the input color pixel data. Therefore, a color order table flexibly accommodating itself to the local property of an image can be formed with very small prediction error.

The systems of FIGS. 43 and 44 do not use the reference pixel data 110 as a read-out address to the color order table, unlike the systems 10 and 20 of FIG. 3. Therefore, the table size can more greatly be reduced than the previous embodiments. In addition, the principle of the fifth embodiment does not require the line buffers 12 and 22 functioning as reference pixel generating means.

If the reference pixel data 110 is used as a state signal for the entropy decoder 44 as in the second embodiment, however, the line buffers 12 and 22 may be provided, as shown by one-dot chain line, to output their output reference pixel data 110 toward the entropy encoder and decoder 14, 24 as state signals.

It is also of course that there may be provided state degenerators 18 and 28 for degenerating the reference pixel data 110 output from the line buffers 12 and 22 to form a degenerated signal $S_x$ which is in turn supplied to the entropy encoder and decoder 14, 24.

Sixth Embodiment

The embodiment shown in FIGS. 43 to 45 has been described as to the updated appearance table for the color order table which is prepared according to the one-dimensional pixel data on one horizontal scan line. The sixth embodiment will be described as to the two-dimensional preparation of the updated appearance table according to pixel data on a plurality of scan lines.

FIG. 46 shows a data encoding system 10 according to the sixth embodiment while FIG. 47 shows a data decoding system 20 associated with the system 10 of FIG. 46. Parts corresponding to those of the previous embodiments are designated by similar reference numerals, but will not further be described herein.

Each of the systems 10 and 20 comprises a line buffers 12 or 22 functioning as reference pixel generating means. Each of the line buffers 12 and 22 prepares two-dimensional reference pixel data 110 for color pixel data to be processed according to the color pixel data 100A or 100B, the prepared two-dimensional reference pixel data being then output toward the predictor 16 or 26. As shown in FIG. 48A, the sixth embodiment is adapted to output $R_0$, $R_1$, $R_2$ and $R_3$ as two-dimensional reference pixel data 110 for a pixel to be processed $X_n$.

The reference pixel data 110 may be used as a state signal for the entropy encoder or decoder 14, 24, if necessary. In such a case, the state degenerators 18 and 28 may degenerate the reference pixel data 110 into a state signal which is in turn output toward the entropy encoder and decoder 14, 24.

The predictors 16 and 26 are characterized in that the color order generating unit 40 comprises a one-dimensional color order generating unit 98 defined by the one-dimensional color order table memory 90 and the table updating unit 92, and a prediction table synthesizer 64.

The one-dimensional color order generating unit 98 has the same advantage and function as in the color order generating unit 40 of FIGS. 43 and 44, but will not further be described herein.

The prediction table synthesizer 64 uses the reference pixel data 110 input from the line buffer 22 as first data 138 for specifying upper color order data and also data output from the one-dimensional color order table memory 90 as second data 136 to synthesize two-dimensional color order table data 130 which is in turn output toward the discriminating unit 42.

In other words, the prediction table synthesizer 64 sets color rank at the color code of each of the pixels defining the two-dimensional reference pixel data 110, the set color order being then used as the first data 138 for specifying the upper color order table data. The details thereof will be described with reference to FIGS. 48A and 48B.

FIG. 48A shows a pixel $R_n$ which has been encoded for the subject pixel $X_n$.

FIG. 48B shows an array of color codes input for each pixels of FIG. 48A.

As described, the line buffer 12 outputs the reference pixel data 110 formed by four pixels $R_0$, $R_1$, $R_2$ and $R_3$. The prediction table synthesizer 84 sets the priorities to the four pixels in the described order of $R_0$, $R_1$, $R_2$ and $R_3$, which priorities are used as the first color order data 138 for specifying the upper color order data. In FIGS. 48A and 48B, there are input color order data having color ranks which are set in the described order of $C_4$, $C_3$, $C_6$ and $C_5$.

The prediction table synthesizer 64 forms lower color order data by removing the color code data included in the first data 138 from the one-dimensional color order table data 136 output from the one-dimensional color order table memory 90. More particularly, the prediction table synthesizer 64 removes the color codes $C_4$, $C_3$, $C_6$ and $C_5$ included in the first data 138 from the one-dimensional color order table data 136 of FIG. 45C output from the memory 90 to form lower color order data.

The upper color order data so formed is then combined with the lower color order data to synthesize two-dimensional color order table data 130 shown in FIG. 48C which is in turn output toward the discriminating unit 42.

By preparing the updated appearance table for the object pixel $X_X$ from the two-dimensional image data in such a manner, the color order table can have a further reduced prediction error.

It is preferred that the color order generating unit 40 of the sixth embodiment comprises a priority switching unit 94 for changing the priority set at each of the pixels defining the two-dimensional reference pixel data 110 in response to a given switching command. Thus, the color order table can have a further reduced prediction error.

Under such a color order switching condition, for example, an image to be encoded may be pre-scanned to predetermine the priority pattern of a reference pixel providing a better rate of compression. Alternatively, a switching command may be output by calculating the number of color code coincidences during the encoding and decoding steps.

FIG. 49 shows a flow chart illustrating the operation of the data encoding system 10 shown in FIG. 46. The flow chart of the operation of the data decoding system 20 shown in FIG. 47 is substantially the same as in FIG. 49, but will not further be described herein.

When color pixel data 100A to be encoded is input (step S130), the line buffer 12 outputs the reference pixel data 110 of a pixel to be encoded toward the priority switching unit 94 (step S134).

The priority switching unit 94 responds to the input switching control signal to set the priorities of the four pixels defining the input reference pixel data 110 and re-arranges the reference pixel data according to the set priorities to form data 138 which is in turn output toward the prediction table synthesizer 64. As shown in FIG. 48B, for example, if the priority color orders are set in the described order of $R_1$, $R_0$, $R_2$ and $R_3$, the first color ranking data 138 are output toward the prediction table synthesizer 64 in the described order of $C_4$, $C_3$, $C_6$ and $C_5$. If the color ranks are set in the described order of $R_0$, $R_1$, $R_2$ and $R_3$, the reference pixel data are re-arranged into the described order of $C_3$, $C_4$, $C_6$ and $C_5$ and then output toward the prediction table synthesizer 64 (step S134).

The prediction table synthesizer 64 thus prepares the two-dimensional color order table data 130 from the first data 138 and the second data 136 input from the one-dimensional color order table memory 90, the prepared data 130 being then output toward the discriminating unit 42 (step S136).

The discriminating unit 42 collates the input two-dimensional color order table data 130 with the color code of the input color pixel data 100A to convert the color pixel data 100A into the corresponding color ranking data 120 which is in turn output (steps S138 and S140).

The table updating unit 92 then responds to the input color pixel data 100A to prepare the updated appearance table for updating the contents of the one-dimensional color order table in the table memory 90, as described in detail in connection with FIG. 45 (step S142).

A series of Such steps are repeated for all the pixels to be encoded. If it is determined that the encoding process is terminated (step S144), the series of steps will also be terminated Seventh Embodiment The previous embodiments generally suppose the case where all the reference pixels $a_n$, $b_n$, $c_n$ and $d_n$ (for the object pixel $X_n$ are contained in the image data 1000 for one image, as shown in FIG. 50A.

As shown in FIG. 50B, however, if part of the reference pixels project outside from the image data 1000 for one image, there will be no pixel to be referred to within the projecting pixel portions. In such a case, the prior art sets the reference pixels in the projecting portions (out-of-frame values) zero to form the reference pixel data 110.

More particularly, if the reference pixels $a_n$, $b_n$, $c_n$ and $d_n$ are set for the object pixel $X_n$ as shown in FIGS. 50A and 50B and when part or all of the reference pixels project outside from the image data 1000, the subject pixel $X_n$ must be located in a Position hatched in FIG. 51. The area into which the reference pixels project from the image data 1000 is shown by broken line in FIG. 52. Thus, an initial value 0 has been set in the broken-line area as an out-of-frame value for the reference pixel pattern.

If the out-of-frame value of the reference pixel has previously been fixed to a fixed Value "0", however, the correlation between the pixel to be encoded $X_n$ and the reference pixel will be reduced and lower the rate of compression, when the pixels surrounding the image data 1000 are to be encoded.

The data encoding and decoding systems 10, 20 of the seventh embodiment are characterized in that the out-of-frame value used to form the reference pixel data 110 is optimized according to the actual image data.

FIG. 53 shows a data encoding system 10 of the seventh embodiment while FIG. 54 shows a data decoding system 20 associated with the system 10 Of FIG. 53.

In addition to various parts as described in connection with the previous embodiments, the data encoding system 10 comprises an out-of-frame value determining unit 54, an image buffer 56 and a reference pixel synthesizing unit 58.

The out-of-frame value determining unit 54 determines one out-of-frame value on N image data 1000 and then outputs the out-of-frame value toward the reference pixel synthesizer 58. The out-of-frame value determining unit 54 outputs an out-of-frame value data 150 toward any external unit in synchronism with the output of an encoded data 200 from the entropy encoder 14.

The image buffer 56 sequentially stores the input N image data 1000 while the out-of-frame value determining unit 54 determines the out-of-frame value for the N image data 1000. As the out-of-frame value determining unit 54 has determined the out-of-frame value for the N image data, it outputs the color pixel data 100A to be encoded as in the previous embodiments toward the N-th image data 1000-N starting from the first image data 1000-1.

The line buffer 12 responds to the so input color pixel data 100A to prepare reference pixel data which is in turn output toward the reference pixel synthesizer 58 The reference pixel synthesizer 58 responds to the input data from the line buffer 12 to determine whether or not the reference pixels for the pixel to be encoded $X_n$ is included in the image data 1000 as shown in FIG. 50A or whether or not part or all of the reference pixels are out of the image data 1000 as shown in FIG. 50B. In the case of FIG. 50A, the reference pixel data 110 from the line buffer 12 is output directly toward the predictor 16.

Where part or all of the reference pixels are out of the image data 1000 as shown in FIG. 50B, the out-of-frame value from the out-of-frame value determining unit 54 is set at the projecting pixel part to form the reference pixel data 110 consisting of $a_n$, $b_n$, $c_n$ and $d_n$ which is in turn output toward the predictor 16.

The predictor 16 responds to the input reference pixel data 110 to convert the color code of the color pixel data 100A output from the image buffer 56 into the corresponding color ranking data 120 which is in turn output toward the entropy encoder 14.

FIG. 55 shows a case where the number of image data 1000 for setting the out-of-frame value is set to be equal one. In such a case, as shown in FIG. 55A, the value of a color code having the highest frequency among the color codes included in the hatched portion is set as an out-of-frame value. Since the color code 1 has the highest frequency. In this example color code as an out-of-frame value is set.

FIG. 56 shows a case where N is set to be equal to 256. In FIG. 56A, a pixel area referred for setting an out-o-frame value for the 256 image data 1000 is shown by hatching.

FIG. 56B shows a detailed arrangement of color codes for each pixel data. The data of color codes shown in FIG. 56A among the 256 image data shown in the shaded area of FIG. 56B are statistically measured to detect a color code having the highest frequency. In this example, the color code 1 has the highest frequency.

Thus, the out-of-frame value determining unit 54 sets 1 as the out-of-frame value for all the 256 image data.

The determination of out-of-frame value is repeated as one unit per N Image data 1000.

By using the optimum out-of-frame value 150 for each image data 1000 to form the reference pixel data 110 in such a manner, the correlation between the pixel to be encoded 100A and the reference pixel data 110 can be increased to improve the rate of image data compression.

In the data decoding system 20 of FIG. 54, the out-of-frame value 150 is input into the reference pixel synthesizer 58 in synchronism with the input to the entropy decoder 24.

The reference pixel synthesizer 58 uses the same technique as in the reference pixel synthesizer 58 of the system 10 to prepare the reference pixel data 110 which is in turn output toward the predictor 26.

In such a manner, the encoded data 200 effectively compressed can effectively be decoded to output the color pixel data 100B.

In the data encoding system 10 of the seventh embodiment, if the, number of pixels forming one image data 1000 is relatively small, the amount of data in the out-of-frame value output with the encoded data 200 may be more than the amount of the encoded data 200 reduced by improving the rate of image compression, since the out-of-frame value data 150 is output together with the encoded data 200. In such a case, the entire image compression efficiency can be improved by determining one out-of-frame value for a plurality of image data or 256 image data and using the determined out-of-frame value as a common out-of-frame value throughout 256 image data 1000. If the data compression is to be carried out effectively, it is desirable that the number of image data handled by a single out-of-frame value is set to provide the highest rate of compression throughout the system.

The present invention is not limited to the aforementioned embodiments, but may be applied with various modifications and changes within the scope of the invention.

We claim:

1. A data encoding system for encoding color pixel data to be input and outputting encoded data, comprising:

reference pixel generating means which outputs reference pixel data for said color pixel data to be input on the basis of previously input color pixel data;

predictor means having a color order table which sets color ranks of color codes for every reference pixel pattern, reads and outputs multi-bit color ranking data of a color code corresponding to said color pixel data to be input and said reference pixel data from said color order table, wherein said predictor means comprises:

(i) color order generating means which stores the color order table, uses input reference pixel data as an index to read the color order table data of said index from said color order table, and outputs said color order table data, wherein said color order generating means comprises:

(a) first generator means which stores color order table data of at least one index in said color order table whose frequency is equal to or higher than a given level as a first color order table, reads first data representing the relationship between each color code and its multi-bit color ranking data from said first color order table, and outputs said first data when an index corresponding to input reference pixel data is present in said first color order table;

(b) second generator means which stores color order table data representing the rank of frequency of each color code in a given image area as a second color order table, and outputs the second color order table data as second data each time the color order table data is input; and (c) prediction table synthesizer means which uses the first data as data representing the relationship between each color code and its multi-bit color ranking data when said first data is output, and said second data as data representing the relationship between each color code and its multi-bit color ranking data when said first data is not output, in order to synthesize and output color order table data representing each color code and its multi-bit color ranking data, and (ii) discriminating means which outputs multi-bit color ranking data corresponding to color code of input color pixel data, on the basis of said color order table data output from said color order generating means; and entropy encoding means which converts said multi-bit color ranking data into encoded data, and outputs said encoded data.

2. A data decoding system for decoding encoded data to be input into color pixel data and outputting the color pixel data, comprising:

reference pixel generating means which outputs reference pixel data for successive color pixel data to be decoded on the basis of previously decoded color pixel data;

entropy decoding means which converts said encoded data to be input into multi-bit color ranking data, and outputs said multi-bit color ranking data; and predictor means having a color order table which sets the color ranks of color codes for every reference pixel pattern, reads and outputs color pixel data representing a color code which corresponds to said multi-bit color ranking data and said reference pixel data from said color order table, wherein said predictor means comprises:

(i) color order generating means which stores said color order table, uses input reference pixel data as an index to read the color order table data of said index from said color order table, and outputs said color order table data, wherein said color order generating means comprises:

(a) first generator means which stores color order table data of at least one index in said color order table whose frequency is equal to or higher than a given level as a first color order table, reads first data representing the relationship between each color code and its multi-bit color ranking data from said first color order table, and outputs said first data when an index corresponding to induct reference pixel data is present in said first color order table;

(b) second generator means which stores color order table data representing the rank of frequency of each color code in a given image area as a second color order table, and outputs the second color order table data as second data each time the multi-bit color ranking data is input; and (c) prediction table synthesizer means which uses the first data as data representing the relationship between each color code and its multi-bit color ranking data when said first data is output, and said second data as data representing the relationship between each color code and its multi-bit color ranking data when said first data is not output, in order to synthesize and output color order table data representing each color code and its multi-bit color ranking data; and (ii) discriminating means which outputs a color code corresponding to input multi-bit color ranking data as color pixel data, on the basis of said color order table data output from said color order generating means.

3. A data encoding system as defined in claim 1, wherein said color order generating means comprises:

an external memory which stores said color order table; and a memory interface which uses the input reference pixel data as an index to read the color order table data of said index from said external memory, and outputs said color order table data.

4. A data decoding system as defined in claim 2, wherein said color order generating means comprises:

an external memory which stores said color order table; and a memory interface which uses the input reference pixel data as an index to read the color order table data of said index from said external memory, and outputs the color order table data.

5. A data encoding system as defined in claim 1, wherein said first generator means stores color order table data for each index in said color order table as the first color order table, and uses the input reference pixel data as an index to read and output first data representing the relationship between each color code and its color rank from said first color order table; and said prediction table synthesizer means uses said first data as an upper color order data and data obtained by removing the color code data in said first data from said second data as lower color order data to synthesize and output color order table data representing the relationship between each color code and its multi-bit color ranking data.

6. A data decoding system as defined in claim 2, wherein said first generator means stores color order table data for each index in said color order table as the first color order table, and uses the input reference pixel data as an index to read and output first data representing the relationship between each color code and its color rank from said first color order table; and said prediction table synthesizer means uses said first data as upper color order data and data obtained by removing the color code data in said first data from said second data as lower color order data to synthesize and output color order table data representing the relationship between each color code and its multi-bit color ranking data.

7. A data encoding system as defined in claim 1, wherein said first generator means stores upper color order table data for every index as the first color order table, reads first data representing the relationship between each color code and its multi-bit color ranking data from said first color order table on the basis of input reference pixel data, and outputs said first data in said color order table;

said prediction table synthesizer means uses the first data as upper color order data and data obtained by removing the color code data in the first data from the second data as lower color order data when the first data is output, in order to synthesize and output color order table data representing the relationship between each color code and its multi-bit color ranking data.

8. A data decoding system as defined in claim 2, wherein said first generator means stores upper color order table data for every index as the first color order table, reads first data representing the relationship between each color code and its multi-bit color ranking data from said first color order table on the basis of input reference pixel data, and outputs said first data in said color order table;

said prediction table synthesizer means uses the first data as upper color order data and data obtained by removing the color code data in the first data from the second data as lower color order data when the first data is output, in order to synthesize and output color order table data representing the relationship between each color code and its multi-bit color ranking data.

9. A data encoding system as defined in claim 1, wherein said first generator means stores color order table data of at least one index corresponding to a reference pixel pattern whose correlation degree is equal to or higher than a given level as the first color order table in said color order table, in order to read and output first data representing the relationship between each color code and its multi-bit color ranking data from the first color order table when the index corresponding to the input reference pixel data is present in the first color order table; and wherein said second generator means outputs the data of said second color order table as second data in synchronism with the input of said color pixel data.

10. A data decoding system as defined in claim 2, wherein said first generator means stores color order table data of at least one index corresponding to a reference pixel pattern whose correlation degree is equal to or higher than a given level as the first color order table in said color order table, in order to read and output first data representing the relationship between each color code and its multi-bit color ranking data from the first color order table when the index corresponding to the input reference pixel data is present in the first color order table; and wherein said second generator means outputs the data of said second color order table as second data in synchronism with the input of said multi-bit color ranking data.

11. A data encoding system as defined in claim 9, wherein said second generator means forms the second color order table as a fixed table.

12. A data decoding system as defined in claim 10, wherein said second generator means forms the second color order table as a fixed table.

13. A data encoding system as defined in claim 9, wherein said second generator means raises the color rank of the color code corresponding to the input color pixel data in the second color order table to the first rank each time the color pixel data is input.

14. A data decoding system as defined in claim 10, wherein said second generator means raises the color rank of the color code corresponding to the input color pixel data in the second color order table to the first rank each time the color pixel data is input.

15. A data encoding system as defined in claim 9, wherein said second generator means updates the data of the second color order table into a data representing the relationship between each color code and its multi-bit color ranking data, which is synthesizer and output from the prediction table synthesizing means.

16. A data decoding system as defined in claim 10, wherein said second generator means updates the data of the second color order table into data representing the relationship between each color code and its multi-bit color ranking data, which is synthesizer and output from the prediction table synthesizing means.

17. A data encoding system for encoding color pixel data to be input and for outputting encoded data, comprising:
predicting means having a color order table which sets the color ranks of color codes, reads and outputs multi-bit color ranking data of a color code corresponding to the input color pixel data from said color order table; and
entropy encoding means which converts the multi-bit color ranking data into encoded data and outputs the encoded data,
said predicting means raises the color rank of a color code corresponding to the input color pixel data in said color order table into the first rank each time the color pixel data is input, and wherein said predicting means comprises:
one-dimensional color order generating means having a one-dimensional color order table which sets the color ranks of color codes, outputs the data of said color order table each time color pixel data is input, and also raises the color rank of a color code corresponding to input color pixel data in said one-dimensional color order table into the first rank, and
discriminating means which outputs multi-bit color ranking data corresponding to the color code of the input color pixel data, on the basis of the color order table data output from said one-dimensional color order generating means.

18. A data decoding system for decoding input encoded data into color pixel data and for outputting the decoded data, comprising:
entropy decoding means which converts input encoded data into multi-bit color ranking data and outputs the multi-bit color ranking data; and
predicting means having a color order table which sets the color ranks of color codes, reads a color code corresponding to input multi-bit color ranking data as color pixel data from said color order table, and outputs said color code from said predicting means,
said predicting means raises the color rank of a color code corresponding to the output color pixel data in said color order table into the first rank each time the color pixel data is output, and wherein said predicting means comprises:
one-dimensional color order generating means having a one-dimensional color order table which sets the color ranks of color codes, outputs the data of said color order table each time multi-bit color ranking data is input and also raises the color rank of a color code corresponding to decoded color pixel data in said one-dimensional color order table into a first rank; and
discriminating means which outputs a color code corresponding to the input multi-bit color ranking data as color pixel data, on the basis of the color order table data output from said one-dimensional color order generating means.

19. A data encoding system as defined in claim 17, further comprising reference pixel generating means for outputting two-dimensional reference pixel data for said color pixel data to be input on the basis of previously input color pixel data, and wherein said one-dimensional color order generating means outputs the data of said color order table as second data each time color pixel data is input, and wherein said predicting means further comprises:
prediction table synthesizing means which sets color rank for the color codes of each of pixels defining the two-dimensional reference pixel data and which uses said color rank as first data for specifying an upper color order and data obtained by removing the color code data in the first data from the second data as third data for specifying a lower color order, in order to combine said first and third data to synthesize and output two-dimensional color order table data representing the relationship between each color code and its color rank; and
wherein said discriminating means outputs the multi-bit color ranking data corresponding to the color code of the input color pixel data, on the basis of the two-dimensional color order table data output from said prediction table synthesizing means.

20. A data decoding system as defined in claim 18, further comprising reference pixel generating means for outputting two-dimensional reference pixel data for the color pixel data on the basis of previously decoded color pixel data, and wherein said one dimensional color order generating means outputs the data of said color order table as second data each time multi-bit color ranking data is input, and wherein said predicting means further comprises:
prediction table synthesizing means which sets color ranks for the color codes of each of pixels defining the two-dimensional reference pixel data and which uses said color ranks as first data for specifying an upper color order and data obtained by removing the color code data in the first data from the second data as third data for specifying a lower color order, in order to combine said first and third data to synthesize and output a two-dimensional color order table data representing the relationship between each color code and its color rank; and
wherein said discriminating means outputs the color code corresponding to the input multi-bit color ranking data as color pixel data, on the basis of the two-dimensional color order table data output from said prediction table synthesizing means.

21. A data encoding system as defined in claim 19, wherein said predicting means includes priority switching means responsive to a given switching command to change the color rank set for each of the pixels defining the two-dimensional reference pixel data.

22. A data decoding system as defined in claim 20, wherein said predicting means includes priority switching means responsive to a given switching command to change the color rank set for each of the pixels defining the two-dimensional reference pixel data.

23. A data encoding system as defined in claim 1, wherein said entropy encoding means sets a conversion table for the multi-bit color ranking data and encoded data for each of state parameters depending on the state of reference pixel data, and uses said conversion table for input reference pixel data to convert input multi-bit color ranking data into encoded data and to output the encoded data.

24. A data encoding system as defined in claim 23, wherein said entropy encoding means sets a conversion table representing the probability of multi-bit color ranking data generation for each of state parameters depending on the state of reference pixel data, and uses said conversion table for input reference pixel data to convert input multi-bit color ranking data into encoded data depending on its generative probability and to output the encoded data.

25. A data decoding system as defined in claim 2, wherein said entropy decoding means sets a conversion table for the multi-bit color ranking data and encoded data for each of state parameters depending on the state of reference pixel data, and uses said conversion table for input reference pixel data to convert input encoded data into multi-bit color ranking data and to output the multi-bit color ranking data.

26. A data decoding system as defined in claim 25, wherein said entropy decoding means sets a conversion table representing the probability of multi-bit color ranking data generation for each of state parameters depending on the state of reference pixel data, and uses the conversion table for input reference pixel data to convert input multi-bit encoded data into color ranking data and to output the multi-bit color ranking data.

27. A data encoding system as defined in claim 1, further comprising degenerating means for degenerating input reference pixel data to output degenerated date, and wherein said entropy encoding means sets a conversion table for each state parameter depending on the state of said degenerated data, and uses said conversion table for input degenerated data to convert input multi-bit color ranking data into encoded data and to output the encoded data.

28. A data decoding system as defined in claim 2, further comprising degenerating, means for degenerating input reference pixel data to output degenerated data, and wherein the entropy decoding means sets a conversion table for each state parameter depending on the state of said degenerated data, and uses said conversion table for input degenerated data to convert input encoded data into multi-bit color ranking data and to output the multi-bit color ranking data.

29. A data encoding system as defined in claim 27, wherein said degenerating means includes a degeneracy table which performs conversion between the reference pixel data and the degenerated data, converts input reference pixel data into degenerated data and outputs the degenerated data, said degeneracy table being generated by arranging a preliminary table representing data obtained by statistically measuring the generative probability of a color code for every index using reference pixel patterns as indexes, and by classifying the indexes in the preliminary table into degenerated data having a predetermined number of degenerations to make the average amount of information about one color code minimum so that the relationship between each index and the degenerated data will be defined.

30. A data decoding system as defined in claim 28, wherein said degenerating means includes a degeneracy table which performs conversion between the reference pixel data and the degenerated data, converts input reference pixel data into degenerated data and outputs the degenerated data, said degeneracy table being generated by arranging a preliminary table representing data obtained by statistically measuring the generative probability of a color code for every index using reference pixel patterns as indexes, and by classifying the indexes in the preliminary table into degenerated data having a predetermined number of degenerations to make the average amount of information about one color code minimum so that the relationship between each index and the degenerated data will be defined.

31. A data encoding system as defined in claim 27, wherein said degenerating means includes a degeneracy table which performs conversion between a combined color code of reference pixel data and the degenerated data, converts a combined color code of the input reference pixel data into degenerated data and outputs the degenerated data.

32. A data decoding system as defined in claim 28, wherein said degenerating means includes a degeneracy table which performs conversion between a combined color code of reference pixel data and the degenerated data, converts a combined color code of the input reference pixel data into degenerated data and outputs the degenerated data.

33. A data encoding system for encoding color pixel data to be input and outputting encoded data, comprising:

reference pixel generating means for outputting reference pixel data for said color pixel data to be input on the basis of previously input color pixel data;

predictor means, having a color order table which sets color ranks of color codes for every reference pixel pattern, for reading and outputting color ranking data of a color code corresponding to said color pixel data to be input and said reference pixel data from said color order table;

entropy encoding means for converting said color ranking data into encoded data and outputting said encoded data;

an out-of-frame value determining means for determining a common out-of-frame value to N image data, wherein N is an integer number equal to or more than one, from the pixel values on the peripheral areas of the N image data;

an image buffer which accumulates the input N image data until the out-of-frame value is determined by said out-of-frame value determining means; and a reference pixel synthesizing means for outputting the output data from said reference pixel generating means as reference pixel data when all the reference pixels for color pixel data to be encoded are within the image frame, or outputting reference pixel data by combining said out-of-frame value which is used as the value of a reference pixel located out of the frame and the output data of said reference pixel generating means which is used as the value of a reference pixel located within the frame when part or all of the reference pixels are out of the image frame, said out-of-frame value being output in correlation with said encoded data.

34. A data decoding system for decoding encoded data to be input into color pixel data and outputting the color pixel data, comprising:

reference pixel generating means for outputting reference pixel data for successive color pixel data to be decoded on the basis of previously decoded color pixel data;

entropy decoding means for converting said encoded data to be input into color ranking data and outputting said color ranking data;

predictor means, having a color order table which sets the color ranks of color codes for every reference pixel pattern, for reading and outputting color pixel data representing a color code which corresponds to said color ranking data and said reference pixel data from said color order table; and a reference pixel synthesizing means for receiving an output out-of frame value, wherein said reference pixel synthesizing means outputs the output data from said reference pixel generating means as reference pixel data when all the reference pixels for color pixel data to be decoded are within the image frame, or outputs reference pixel data by combining said out-of-frame value which is used as the value of a reference pixel located out of the frame and the output data of said reference pixel generating means which is used as the value of a reference pixel located within the frame, when part or all of the reference pixels are out of the image frame.

35. The data encoding system of claim 1, wherein the entropy encoding means outputs a variable-length word based on the multi-bit color ranking data.

36. The data encoding system of claim 1, wherein the predictor means outputs multi-bit color ranking data based only on the color pixel data to be input and the reference pixel data from the reference pixel generating means.

* * * * *